(12) United States Patent
Margis et al.

(10) Patent No.: US 8,037,500 B2
(45) Date of Patent: *Oct. 11, 2011

(54) PORTABLE MEDIA DEVICE AND METHOD FOR PRESENTING VIEWING CONTENT DURING TRAVEL

(75) Inventors: Paul Anthony Margis, Irvine, CA (US); James Allen Haak, Irvine, CA (US); Christopher Brian Lundquist, Snohomish, WA (US); Steven Lee Sizelove, Woodinville, WA (US); Henry Sugito Osias, Bellevue, WA (US); Karen Marie Pascarella Werner, Lynnwood, WA (US); John Andrew Johnson, Seattle, WA (US); Drew Calvin Bamford, Seattle, WA (US); Sebastian Maximilian Johannes Petry, Seattle, WA (US); Stefan Pannenbecker, Düsseldorf (DE); Scott Bright, Kirkland, WA (US); Ross Collins, Seattle, WA (US); Brian Piquette, Seattle, WA (US); Mark Taylor, Seattle, WA (US); Christoph E. Mack, Seattle, WA (US); Rand W. Lee, Seattle, WA (US); Gregory Singleton, Issaquah, WA (US); Skooks Pong, Bothell, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/349,382

(22) Filed: Jan. 6, 2009

(65) Prior Publication Data

US 2009/0228908 A1 Sep. 10, 2009

Related U.S. Application Data

(62) Division of application No. 11/154,749, filed on Jun. 15, 2005.
(60) Provisional application No. 60/580,099, filed on Jun. 15, 2004.

(51) Int. Cl.
*H04N 7/18* (2006.01)
(52) U.S. Cl. .............................. 725/75; 725/74; 725/76
(58) Field of Classification Search .................... 725/74, 725/75, 76, 81, 77, 86, 87, 100, 103, 105, 725/131, 139
See application file for complete search history.

(56) References Cited

U.S. PATENT DOCUMENTS 3,037,812 A 6/1962 Monroe
(Continued)

FOREIGN PATENT DOCUMENTS

JP 2002183625 A 6/2002
(Continued)

OTHER PUBLICATIONS

Ibenthal A. et al: Multimedia Im Fahrzeug: Dienste Und Technik, Mar. 2000, Fernseh Und Kinotechnik, Vde Verlad GMBH. Berlin, De, pp. 100-105, XP000966339 ISSN: 0015-014.
(Continued)

*Primary Examiner* — William Trost, IV
*Assistant Examiner* — John Schnurr
(74) *Attorney, Agent, or Firm* — Orrick, Herrington & Sutcliffe LLP

(57) ABSTRACT

A portable media device for use in cooperation with passenger entertainment systems installed in vehicles, such as automobiles and aircraft, and methods for manufacturing and using same. The portable media device is configured to communicate with one or more content sources, which provide viewing content and which may be proximate to, and/or remote from, the portable media device. Preferably being configured to wirelessly communicate with the content sources, the portable media device can select content from any available content source and can download and present the selected content in any conventional manner. The selected content can be streamed to the portable media device for contemporaneous presentation and/or stored by the portable media device for viewing at any time, including after disembarking the vehicle once travel is completed. As desired, the portable media device likewise can be configured to transmit appropriate upload content to the content sources.

53 Claims, 25 Drawing Sheets

U.S. PATENT DOCUMENTS

| | | | |
|---|---|---|---|
| 4,584,603 A | 4/1986 | Harrison |
| 4,866,515 A | 9/1989 | Tagawa et al. |
| 4,897,714 A | 1/1990 | Ichise et al. |
| 5,177,616 A | 1/1993 | Riday |
| 5,295,089 A | 3/1994 | Ambasz |
| 5,311,302 A | 5/1994 | Berry et al. |
| 5,469,363 A | 11/1995 | Saliga |
| 5,555,466 A | 9/1996 | Scribner et al. |
| 5,568,484 A | 10/1996 | Margis |
| 5,596,647 A | 1/1997 | Wakai et al. |
| 5,617,331 A | 4/1997 | Wakai et al. |
| 5,640,002 A | 6/1997 | Ruppert et al. |
| 5,701,582 A | 12/1997 | DeBey |
| 5,709,448 A | 1/1998 | Jennings et al. |
| 5,760,819 A | 6/1998 | Sklar et al. |
| 5,790,175 A | 8/1998 | Sklar et al. |
| 5,790,423 A * | 8/1998 | Lau et al. ............... 700/94 |
| 5,790,787 A | 8/1998 | Scott et al. |
| 5,835,127 A | 11/1998 | Booth et al. |
| 5,857,869 A | 1/1999 | Parcel et al. |
| 5,889,268 A | 3/1999 | Swartz |
| 5,889,775 A | 3/1999 | Sawicz et al. |
| 5,953,429 A | 9/1999 | Wakai et al. |
| 5,959,596 A | 9/1999 | McCarten et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,058,288 A | 5/2000 | Reed et al. |
| 6,135,549 A | 10/2000 | Demick et al. |
| 6,151,497 A | 11/2000 | Yee et al. |
| 6,154,186 A | 11/2000 | Smith et al. |
| 6,249,913 B1 | 6/2001 | Galipeau et al. |
| 6,390,920 B1 | 5/2002 | Infiesto et al. |
| 6,499,027 B1 | 12/2002 | Weinberger |
| 6,529,706 B1 | 3/2003 | Mitchell |
| 6,559,812 B1 | 5/2003 | McCarten et al. |
| 6,598,227 B1 | 7/2003 | Berry et al. |
| 6,637,484 B1 | 10/2003 | Kraft |
| 6,661,353 B1 | 12/2003 | Gopen |
| 6,757,712 B1 | 6/2004 | Bastian et al. |
| 6,796,495 B2 | 9/2004 | Stahl et al. |
| 6,807,538 B1 | 10/2004 | Weinberger et al. |
| 6,899,390 B2 | 5/2005 | Sanfrod et al. |
| 6,990,338 B2 | 1/2006 | Miller et al. |
| 7,036,889 B2 | 5/2006 | Sanfrod et al. |
| 7,100,187 B2 | 8/2006 | Pierzga et al. |
| 7,124,426 B1 | 10/2006 | Tsuria et al. |
| 7,177,638 B2 | 2/2007 | Funderburk et al. |
| 7,280,825 B2 | 10/2007 | Keen et al. |
| 7,333,863 B1 * | 2/2008 | Lydecker et al. ............... 700/94 |
| 7,454,203 B2 | 11/2008 | Levitan |
| 7,483,696 B1 | 1/2009 | Mitchell |
| 7,496,361 B1 | 2/2009 | Mitchell et al. |
| 2001/0037250 A1 | 11/2001 | Lefkowitz |
| 2002/0059584 A1 | 5/2002 | Ferman et al. |
| 2002/0094829 A1 | 7/2002 | Ritter |
| 2002/0095680 A1 | 7/2002 | Davidson |
| 2002/0178451 A1 | 11/2002 | Ficco |
| 2003/0003899 A1 | 1/2003 | Tashiro et al. |
| 2003/0023456 A1 | 1/2003 | Dilollo et al. |
| 2003/0107248 A1 | 6/2003 | Sanford et al. |
| 2003/0148736 A1 | 8/2003 | Wright et al. |
| 2004/0077308 A1 | 4/2004 | Sanford et al. |
| 2004/0098745 A1 | 5/2004 | Marston et al. |
| 2004/0167967 A1 | 8/2004 | Bastian et al. |
| 2004/0183346 A1 | 9/2004 | Sanford et al. |
| 2005/0044564 A1 | 2/2005 | Stopniewicz |
| 2005/0055228 A1 | 3/2005 | Boyer, Jr. et al. |
| 2005/0098593 A1 | 5/2005 | Schedivy |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0202785 A1 | 9/2005 | Meyer |
| 2005/0216938 A1 | 9/2005 | Brady et al. |
| 2005/0256616 A1 | 11/2005 | Rhoads |
| 2006/0032979 A1 | 2/2006 | Mitchell et al. |
| 2006/0088001 A1 | 4/2006 | Reitmann et al. |
| 2006/0174285 A1 | 8/2006 | Brady, Jr. et al. |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0270373 A1 | 11/2006 | So |
| 2006/0277589 A1 | 12/2006 | Margis et al. |
| 2006/0293190 A1 | 12/2006 | Watson et al. |
| 2007/0044126 A1 | 2/2007 | Mitchell |
| 2008/0124054 A1 | 5/2008 | Bonar |
| 2008/0127278 A1 | 5/2008 | Bonar |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| JP | 2002184157 A | 6/2002 |
| JP | 2003199083 A | 7/2003 |
| WO | WO 03/024110 A1 | 3/2003 |
| WO | WO 03/032503 A2 | 4/2003 |
| WO | WO 03/050000 A1 | 6/2003 |
| WO | WO 03/098378 A2 | 11/2003 |
| WO | WO 2004/003696 A2 | 1/2004 |
| WO | WO 2004/008277 A2 | 1/2004 |
| WO | WO 2004/047373 A2 | 6/2004 |
| WO | WO 2005/125207 A2 | 12/2005 |
| WO | WO 2006/062641 A2 | 6/2006 |
| WO | WO 2006/065381 A2 | 6/2006 |

OTHER PUBLICATIONS

Gratschew, S., Raitaniemi, J.; Ylinen, J.; Loula, P: "A Multimedia Messaging Platform For Content Delivering," Telecommunications, 2003, ICT 2003, 10th International Conference on 'Online! vol. 1, Feb. 23, 2003, pp. 431-435.
Yin-Earn Chen; Huale Huang; Jana, R.; John, S.; Jora, S.; Reibman, A.; Bin Wei: "Personalized Multimedia Services Using A Mobile Service Platform" Wireless Communications and Networking Conference, 2002 WCNC2002. 2002 IEEE, 'Online!, vol. 2, Mar. 17, 2002, pp. 918-925.
Chen Y. et al., Personalized Multimedia Services Using a Mobile Service Platform, 2002 IEEE, 0-7803-7376-6/02, pp. 918-925.
Gratschew, S., et al., A Multimedia Messaging Platform for Content Delivering, 2003 IEEE, 0-7803-7661-7/03, pp. 431-435.
Office Action, U.S. Appl. No. 09/952,629, Mar. 14, 2006.
Office Action, U.S. Appl. No. 09/952,629, Dec. 1, 2006.
Office Action, U.S. Appl. No. 09/952,629, Jun. 27, 2007.
Office Action, U.S. Appl. No. 09/952,629, Oct. 27, 2008.
Office Action, U.S. Appl. No. 09/952,629, Mar. 18, 2008.
Office Action, U.S. Appl. No. 09/952,629, Jun. 2, 2009.
Office Action, U.S. Appl. No. 09/811,317, Feb. 28, 2002.
Office Action, U.S. Appl. No. 09/811,317, Aug. 13, 2002.
Office Action, U.S. Appl. No. 09/811,317, Dec. 30, 2002.
Notice of Allowance and Fees due, U.S. Appl. No. 09/811,317, Jul. 14, 2003.
Office Action, U.S. Appl. No. 08/863,448, Sep. 24, 1997.
Office Action, U.S. Appl. No. 08/863,448, Apr. 27, 1998.
Notice of Allowance, U.S. Appl. No. 08/863,448, Feb. 17, 1999.
Office Action, U.S. Appl. No. 08/479,654, Jan. 24, 1997.
Office Action, U.S. Appl. No. 08/479,654, Aug. 21, 1995.
Office Action, U.S. Appl. No. 08/479,654, Mar. 1, 1996.
Office Action, U.S. Appl. No. 08/479,654, Aug. 5, 1997.
Office Action, U.S. Appl. No. 08/071,218, Dec. 7, 1994.
Office Action, U.S. Appl. No. 08/071,218, Apr. 20, 1995.
Notice of Allowance and Fees due, U.S. Appl. No. 08/071,218, Aug. 7, 1995.
Office Actions, U.S. Appl. 08/480,666, Feb. 9, 1996.
Notice of Allowance and Fees due, U.S. Appl. No. 08/480,666, Sep. 5, 1996.
Office Action, U.S. Appl. No. 08/480,666, Oct. 16, 1996.
Office Action, U.S. Appl. No. 08/480,666, Nov. 22, 1996.
Office Action, 2004-199893, Jul. 5, 2005.
Office Action, 2006-000840, Feb. 28, 2007.
Office Action, U.S. Appl. No. 08/363,228, Oct. 3, 1995.
Office Action, U.S. Appl. No. 08/363,228, Mar. 27, 1996.
Notice of Allowance and Fees due, U.S. Appl. No. 08/363,228, Apr. 9, 1996.

Office Action, U.S. Appl. No. 10/772,565, Mar. 4, 2009.
International Search Report, PCT/US2004/017666, Apr. 2, 2005.
Communication, App. No. 04754296.4-1241, Apr. 4, 2007.
First Report, App No. 2004251677, Sep. 26, 2008.
Office Action, U.S. Appl. No. 11/123,327, Dec. 11, 2008.
International Search Report, PCT/US2005/016513, Sep. 8, 2005.
International Preliminary Report, PCT/US2005/016513, Nov. 16, 2006.
Communication, App. No. 05 749 692.9-1525, Jun. 15, 2007.
Communication, App. No. 05 749 692.9-1525, Oct. 22, 2008.
Office Action, U.S. Appl. No. 11/154,749, Aug. 18, 2008.
Office Action, U.S. Appl. No. 11/154,749, Jan. 23, 2009.
International Search Report, PCT/US2005/021518, Jan. 3, 2006.
International Preliminary Report, PCT/US2005/021518, Jan. 4, 2007.
Communication, App. No. 05 762 201.1-2202, May 18, 2007.
Communication, App. No. 05 762 201.1-2202, Jul. 18, 2008.
Office Action, U.S. Appl. No. 11/379,360 Apr. 3, 2009.
International Search Report, PCT/US2006/014852, Dec. 4, 2006.
International Preliminary Report, PCT/US2006-014852, Nov. 1, 2007.
International Search Report, PCT/US2007/074367, Dec. 17, 2007.
International Preliminary Report, PCT/US2007/074367, Feb. 5, 2009.
International Search Report, PCT/US2007/075448, Jul. 4, 2008.
Office Action, U.S. Appl. No. 10/772,565, Jan. 4, 2011.
Office Action, U.S. Appl. No. 10/772,565, Jul. 7, 2010.
Office Action, U.S. Appl. No. 10/772,565, Nov. 24, 2009.
First Report, Appl. No. 200451677, Sep. 26, 2008.
Notice of Allowance and Fees Due, U.S. Appl. No. 11/277,896, Oct. 23, 2009.
Office Action, U.S. Appl. No. 11/123,327, Oct. 14, 2009.
Office Action, U.S. Appl. No. 11/123,327, Jul. 20, 2010.
Office Action, U.S. Appl. No. 11/154,749, Oct. 26, 2009.
Notice of Allowance and Fees Due, U.S. Appl. No. 11/154,749, Feb. 17, 2011.
Office Action, U.S. Appl. No. 11/154,749, Jun. 7, 2010.
Office Action, U.S. Appl. No. 11/379,360, Aug. 25, 2010.
Office Action, U.S. Appl. No. 11/379,360, Nov. 23, 2009.
Office Action, U.S. Appl. No. 11/828,193, Nov. 30, 2009.
Office Action, Appl. No. 200780029616.X, Aug. 6, 2010.
Office Action, Appl. No. 2007-516790, Apr. 5, 2011.

* cited by examiner

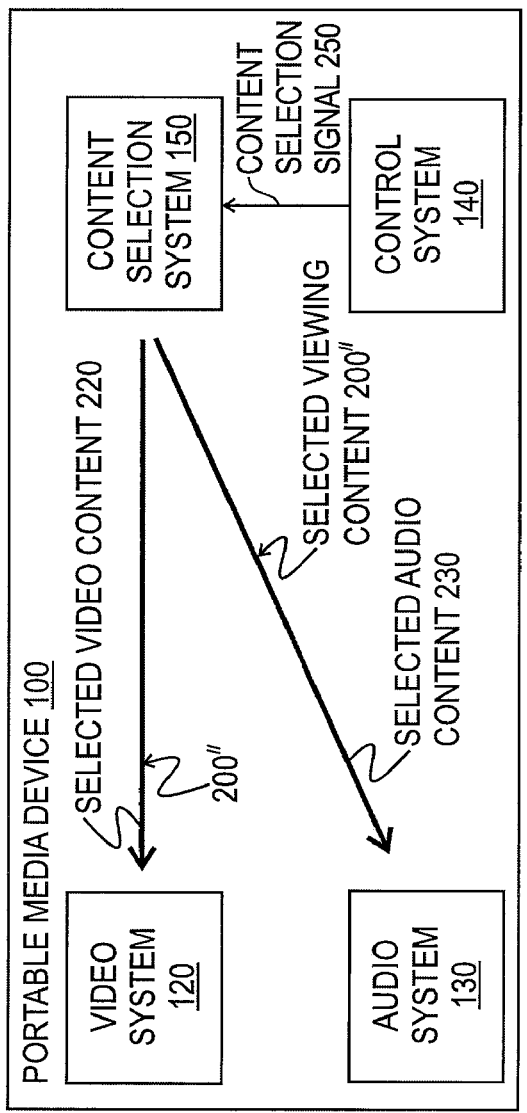
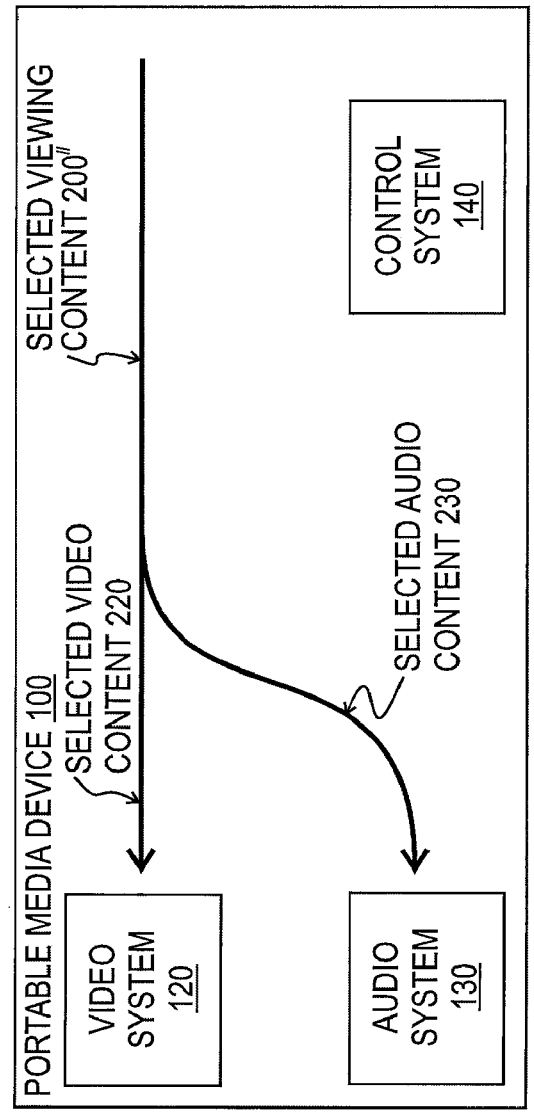
FIG. 2A
FIG. 2B

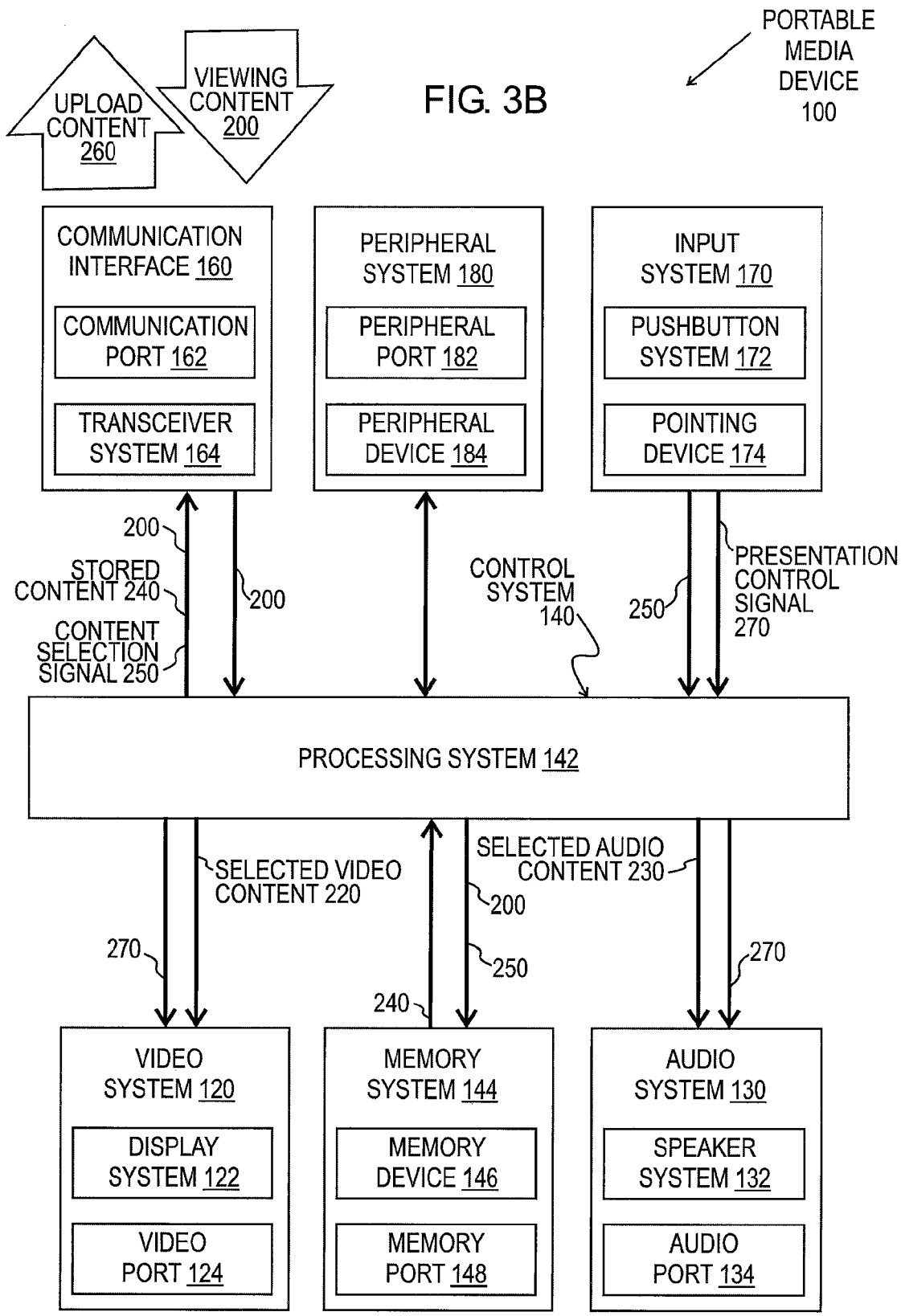

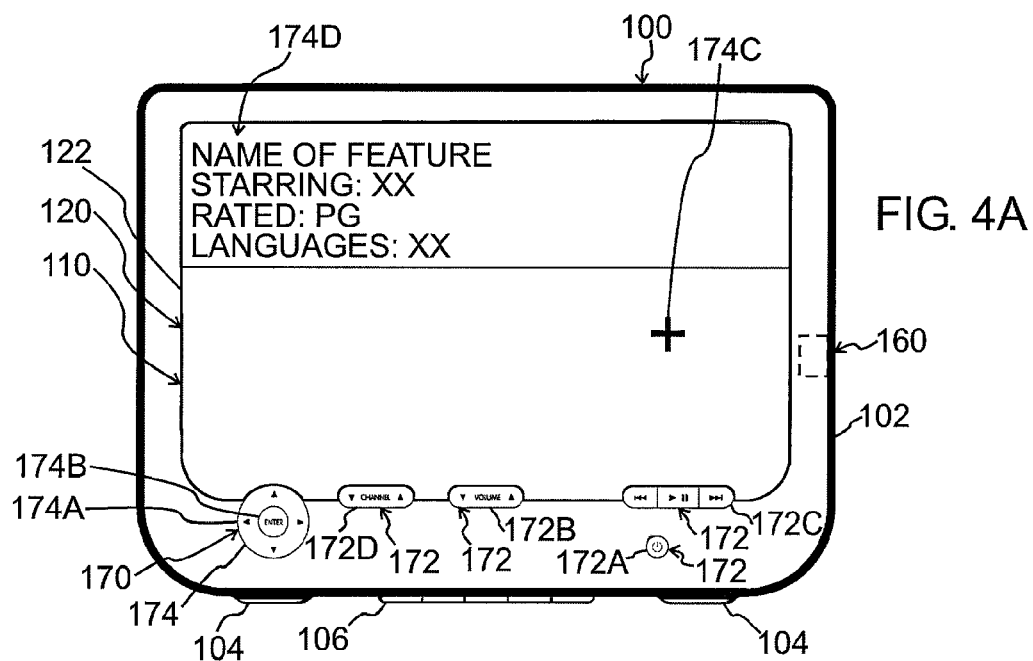
FIG. 4A
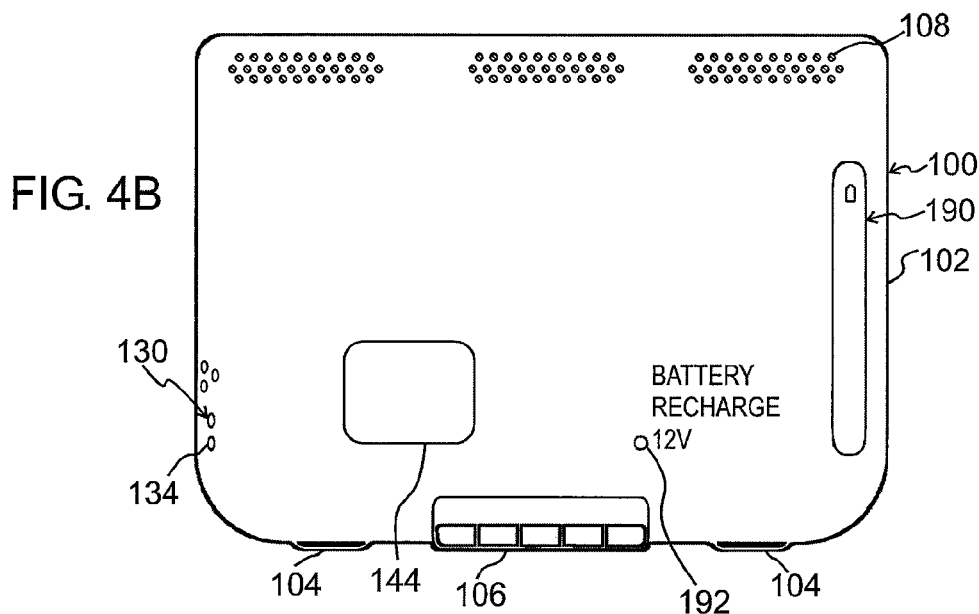
FIG. 4B
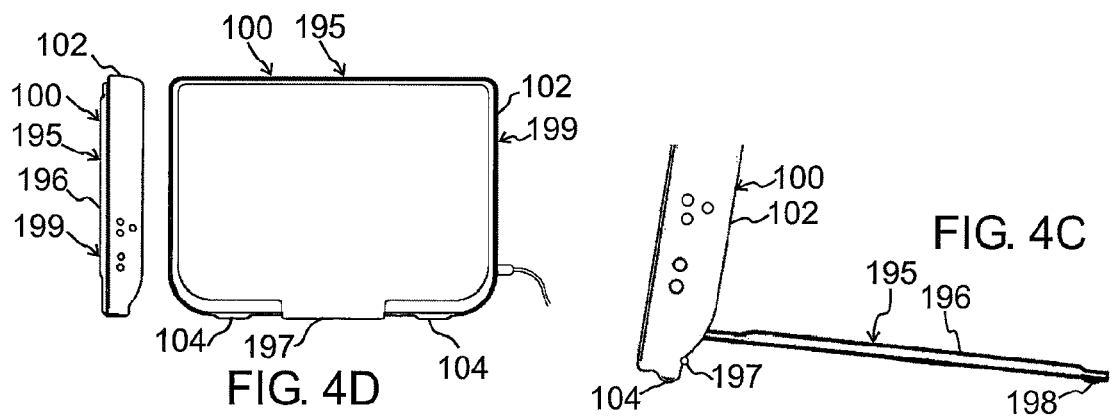
FIG. 4C
FIG. 4D

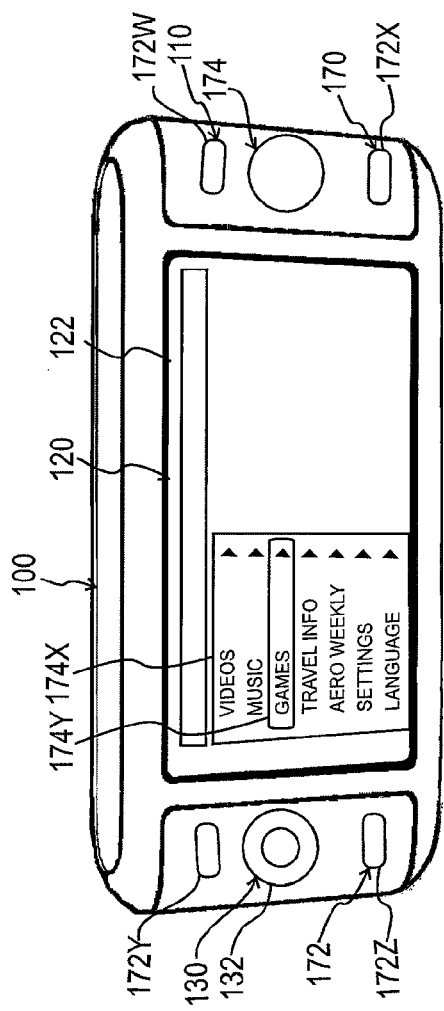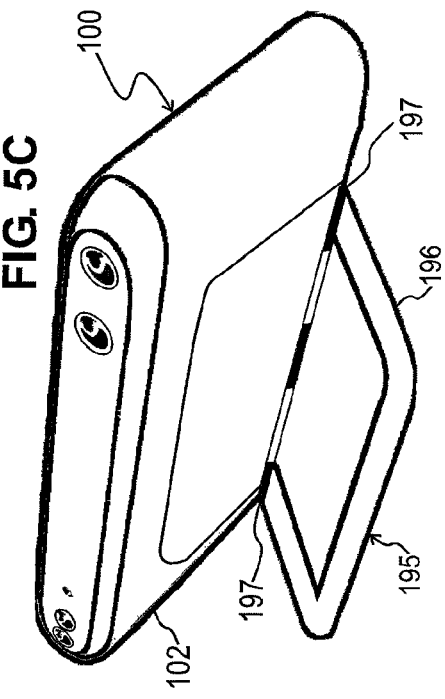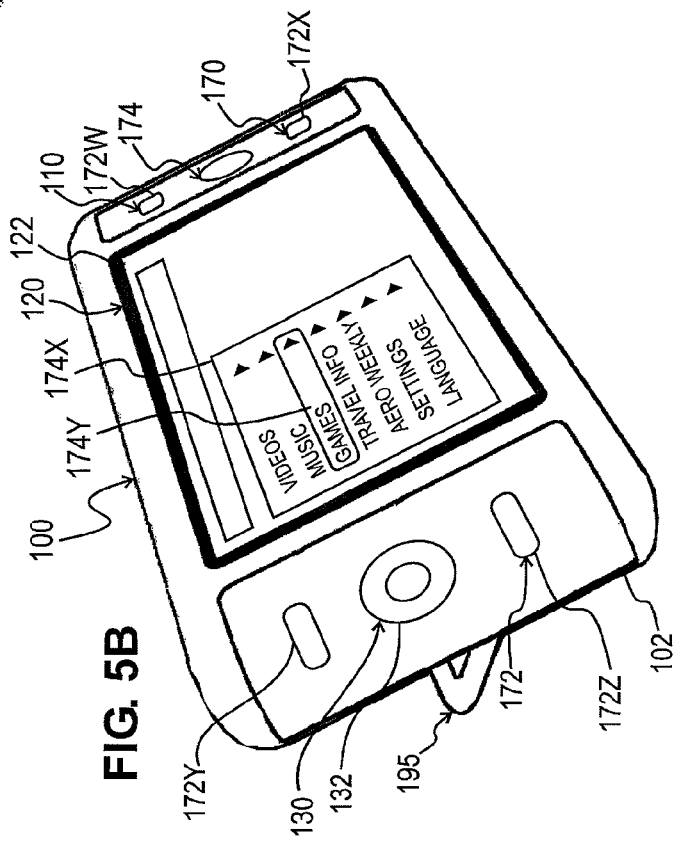

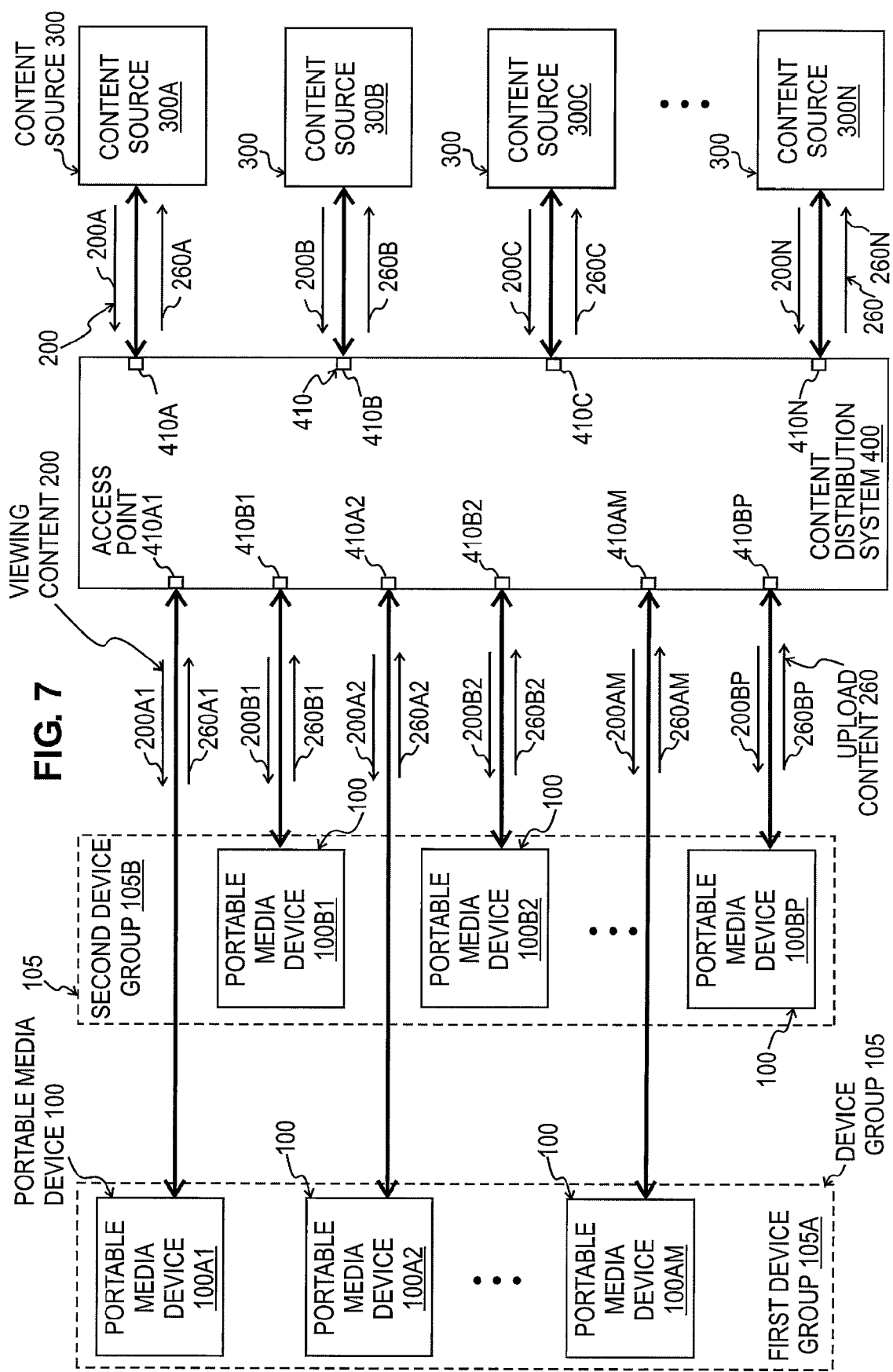

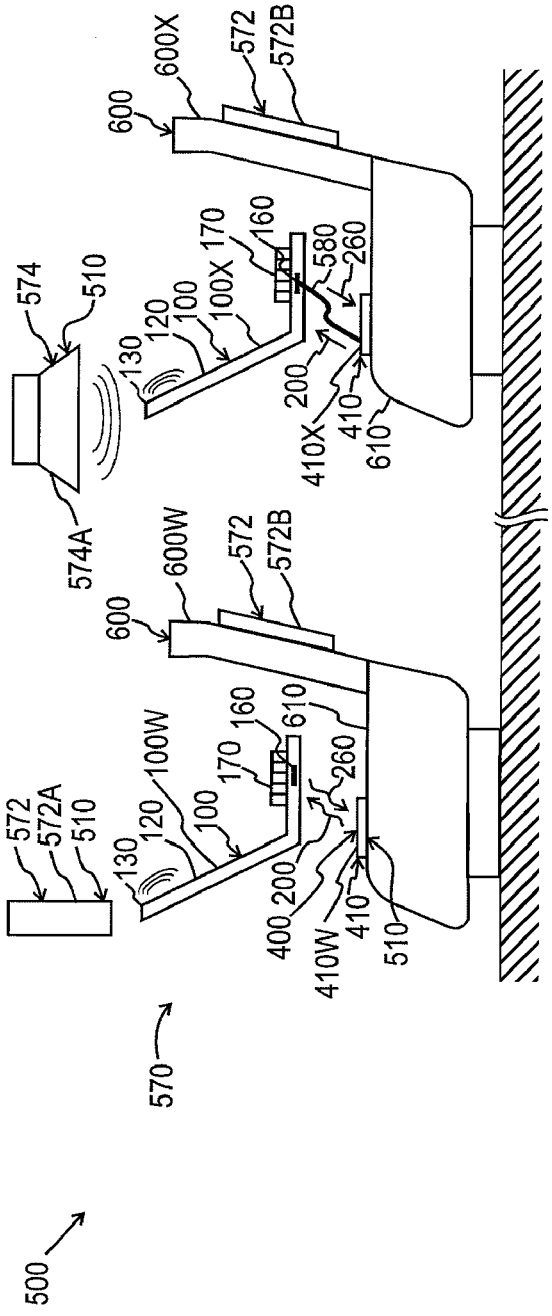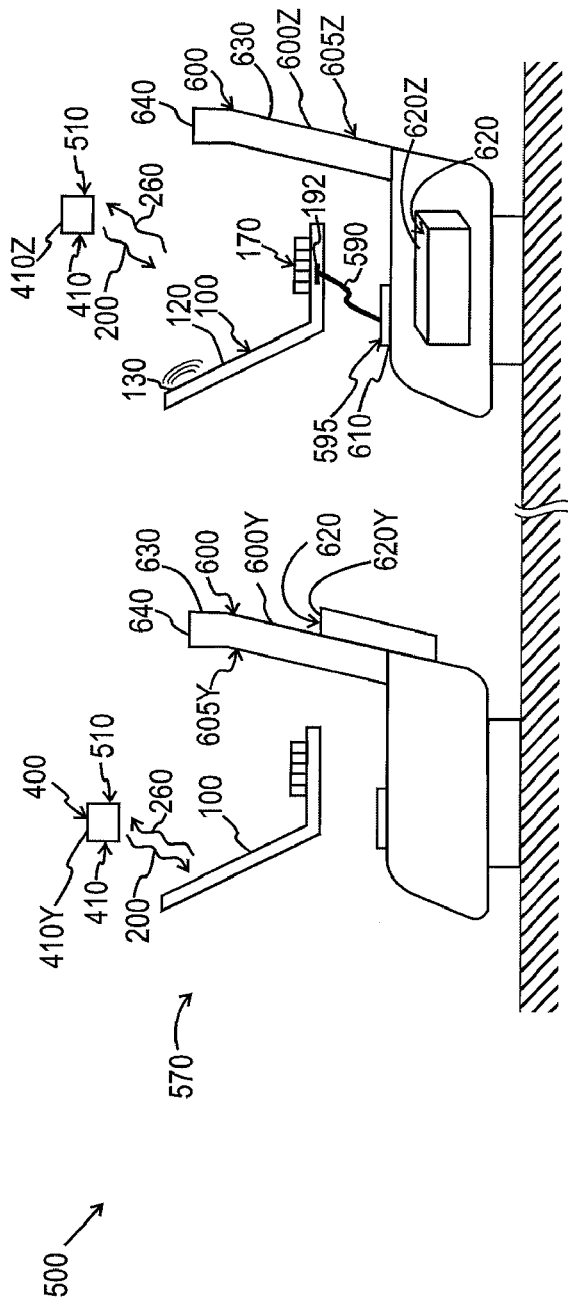
FIG. 9A
FIG. 9B

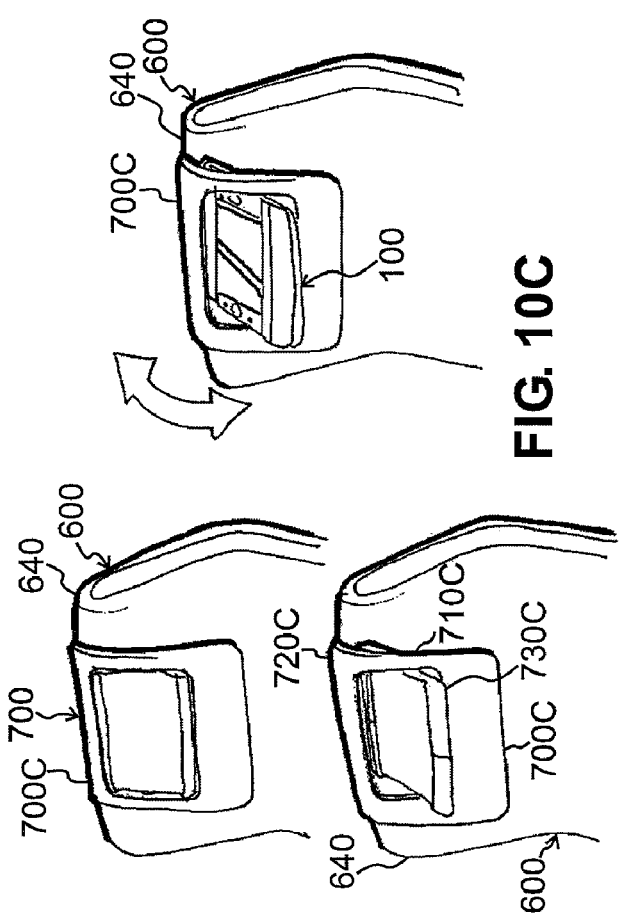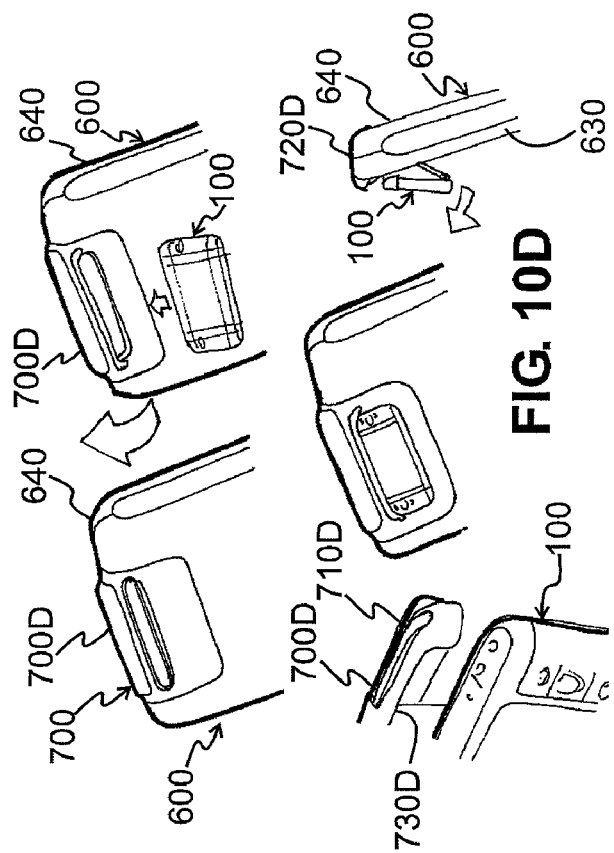

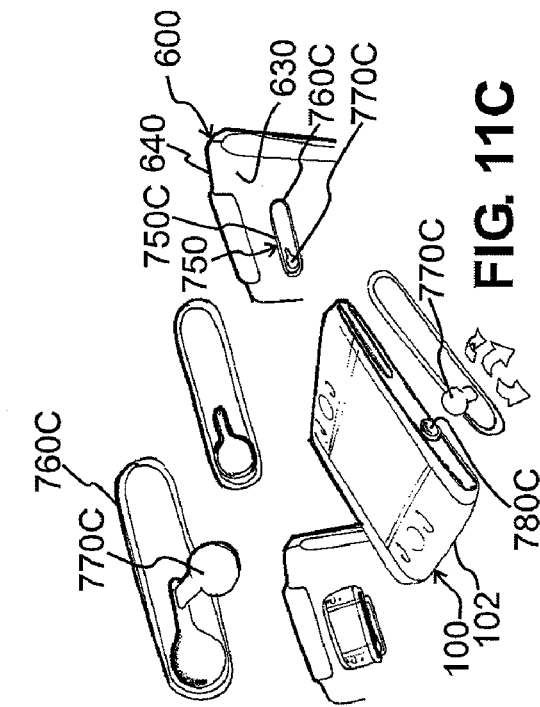
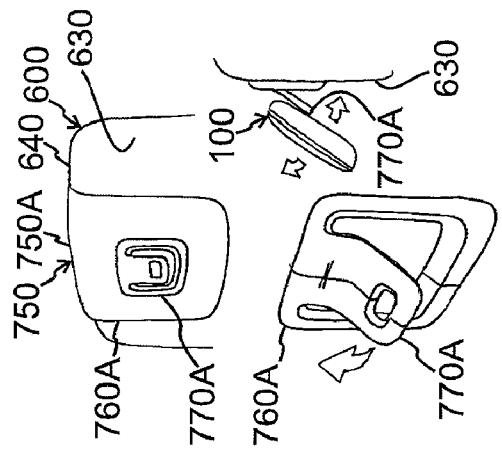
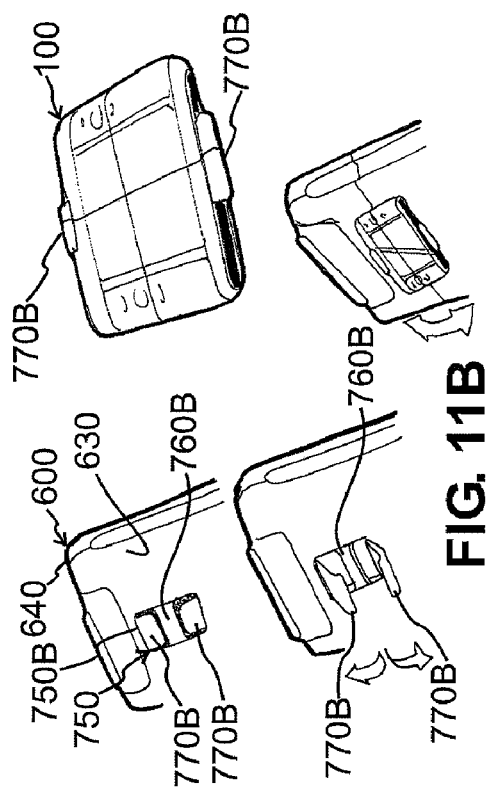
FIG. 11C
FIG. 11B
FIG. 11A

PORTABLE MEDIA DEVICE AND METHOD FOR PRESENTING VIEWING CONTENT DURING TRAVEL

CROSS-REFERENCE TO RELATED APPLICATIONS

This application is a divisional application of co-pending application Ser. No. 11/154,749, filed on Jun. 15, 2005, which claims the benefit of U.S. Provisional Application Ser. No. 60/580,099, filed on Jun. 15, 2004. Priority to each of the prior applications is expressly claimed, and the disclosures of the applications are hereby incorporated herein by reference in their entireties.

FIELD

The present disclosure relates generally to portable entertainment systems and more particularly, but not exclusively, to passenger entertainment systems for use in vehicles.

BACKGROUND

Vehicles, such as automobiles and aircraft, often provide entertainment systems to satisfy passenger demand for entertainment during travel.

Conventional passenger entertainment systems include overhead cabin viewing systems and/or seatback viewing systems with individual controls for selecting viewing content. The viewing content typically includes entertainment content, such as audio and/or video materials, and can be derived from a variety of content sources. For instance, pre-recorded viewing content, such as motion pictures and music, can be provided by internal content sources, such as audio and video systems, that are installed within the vehicle. External content sources likewise can transmit viewing content, including satellite television programming or satellite radio programming, to the vehicle via wireless communication systems.

Conventional passenger entertainment systems, however, suffer from numerous disadvantages. Some passengers therefore find the passenger entertainment systems to be complicated to operate and the viewing content difficult to enjoy. Selection of the viewing content, for example, can prove difficult due to the awkward placement and operation of the user controls. Similarly, the viewing systems are distally located, such as overhead and/or on an opposing seatback, and typically are not adjacent to the user controls. Also, some or all of the passengers will be inhibited from enjoying the viewing content if one or more viewing systems fails. Such system shortcomings are a frequent source of passenger complaints.

Passenger demand for entertainment likewise is continually evolving. Not only do passengers want to access the most current viewing content, such live television programming and the latest games, but they also require a more extensive selection of entertainment products and services, such as Internet access and in-transit shopping, to be available. Conventional passenger entertainment systems, however, are limited by their fixed hardware technology and cannot easily be adapted to accommodate changing passenger entertainment needs during travel.

In view of the foregoing, a need exists for an improved passenger entertainment system that overcomes the aforementioned obstacles and deficiencies of currently-available passenger entertainment systems.

SUMMARY OF THE PREFERRED EMBODIMENTS

The various embodiments disclosed herein are directed toward portable media devices for presenting viewing content during travel.

The portable media device is configured to communicate with one or more content sources for providing viewing content. Each of the content sources may be proximate to, and/or remote from, the portable media device. Preferably being configured to wirelessly communicate with the content sources, the portable media device can select viewing content from any available content source and can download and present the selected viewing content in any conventional manner. The selected viewing content can be streamed to the portable media device for contemporaneous presentation and/or stored by the portable media device for viewing at any time. As desired, the portable media device can be configured to support two-way communications with one or more of the content sources. The portable media device thereby can provide enhanced functionality, such as support for viewing content uploads and other passenger transactions, during travel.

Other aspects and features of the present disclosure will become apparent from consideration of the following description taken in conjunction with the accompanying drawings.

BRIEF DESCRIPTION OF THE DRAWINGS

FIG. 2A is an exemplary top-level block diagram illustrating an embodiment of the portable media device of FIG. 1, in which the portable media device presents selected viewing content from a content source.

FIG. 2B is an exemplary top-level block diagram illustrating an alternative embodiment of the portable media device of FIG. 2A, in which the selected viewing content is selectable at the content source.

FIG. 3B is an exemplary block diagram illustrating an alternative embodiment of the portable media device of FIG. 3A, in which the portable media device likewise includes a memory system for storing the selected viewing content and/or at least one peripheral system for supplementing the functionality of the portable media device.

FIG. 4A is a detail drawing illustrating a front view of one embodiment of the portable media device of FIGS. 3A-B, in which the portable entertainment device is in an open position.

FIG. 4B is a detail drawing illustrating a back view of the portable media device of FIG. 4A.

FIG. 4C is a detail drawing illustrating an alternative embodiment of the portable media device of FIGS. 4A-B, in which the portable entertainment device includes a viewing support.

FIG. 4D is a detail drawing illustrating another alternative embodiment of the portable media device of FIGS. 4A-B, in which the portable entertainment device includes a protective cover.

FIG. 5A is a detail drawing illustrating a front view of another embodiment of the portable media device of FIGS. 3A-B.

FIG. 5B is a detail drawing illustrating an alternative embodiment of the portable media device of FIG. 5A, in which the portable entertainment device includes a viewing support.

FIG. 5C is a detail drawing illustrating a back view of the portable media device of FIG. 5B.

FIG. 7 is an exemplary block diagram illustrating another alternative embodiment of the portable media device of FIG. 1, in which a plurality of the portable media devices is configured to communicate with a plurality of content sources via a content distribution system.

FIG. 9A is a detail drawing illustrating an alternative embodiment of the vehicle information system of FIGS. 8A-B, in which the vehicle information system provides access points adjacent to the passenger seats.

FIG. 9B is a detail drawing illustrating another alternative embodiment of the vehicle information system of FIGS. 8A-B, in which the access points are distributed throughout a passenger cabin of the vehicle.

FIGS. 10A-J are detail drawings illustrating alternative embodiments of a mounting system for mounting the portable media device of FIG. 1 on a headrest of a passenger seat.

FIG. 11A-F are detail drawings illustrating alternative embodiments of a mounting system for mounting the portable media device of FIG. 1 on a seatback of a passenger seat.

Figure 1:
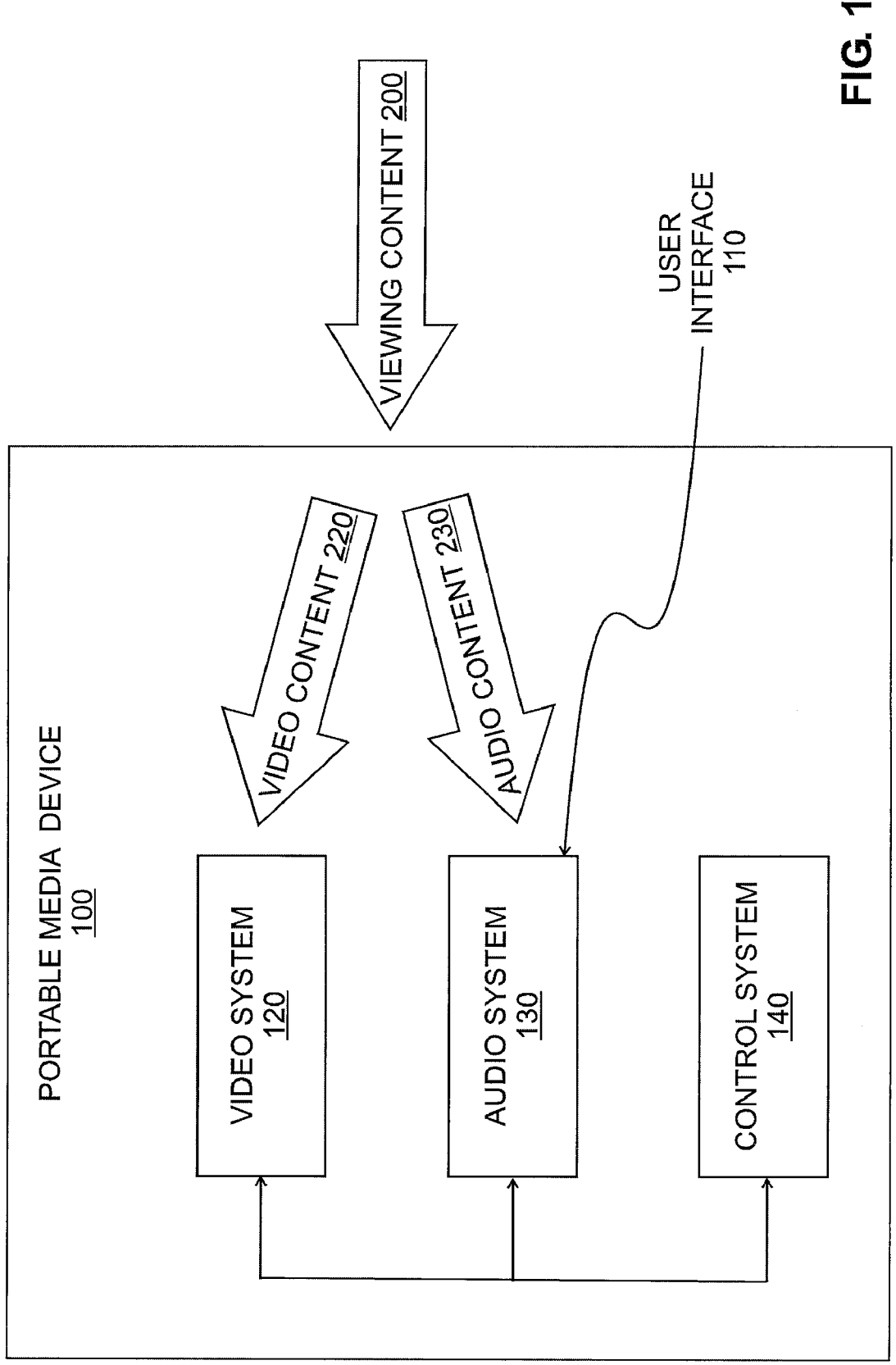
FIG. 1 is an exemplary top-level block diagram illustrating an embodiment of a portable media device for presenting viewing content.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not describe every aspect of the present disclosure and do not limit the scope of the disclosure.

DETAILED DESCRIPTION OF THE PREFERRED EMBODIMENTS

Since currently-available passenger entertainment systems are difficult to operate and have limited content presentation capabilities, a portable media device with an intuitive user interface for presenting selected viewing content from one or more available content sources during travel can prove desirable and provide a basis for a wide range of applications, such as passenger entertainment systems for use on aircraft and other types of vehicles. This result can be achieved, according to one embodiment disclosed herein, by employing a portable media device 100 as shown in FIG. 1.

Turning to FIG. 1, the portable media device 100 is provided as a portable, handheld media presentation system for receiving viewing content 200 and for presenting the received viewing content 200. By providing the portable media device 100 as a portable, handheld media presentation system, the weight, complexity, and power consumption of the portable media device 100 each can be reduced while increasing overall device reliability. The portable media device 100 can be provided in any conventional manner, such as via one or more hardware components and/or software components and includes an intuitive user interface 110. As illustrated in FIG. 1, the exemplary portable media device 100 comprises a video system 120 for visually presenting a video portion of the viewing content 200 (or video content 220) and/or an audio system 130 for audibly presenting an audio portion of the viewing content 200 (or audio content 230). The video system 120 and the audio system 130 are shown as being operable under the control of a control system 140. The portable media device 100 thereby can control the manner in which the viewing content 200 is received and/or presented.

The viewing content 200 can be provided by one or more content sources 300 as shown in FIGS. 2A-B. The content source 300 can be provided in any conventional manner, such as via one or more hardware components and/or software components, and can be disposed proximately to, and/or remotely from, the portable media device 100. For example, the content source 300 can be provided in the manner set forth in the co-pending U.S. patent applications, entitled "SYSTEM AND METHOD FOR DOWNLOADING FILES," Ser. No. 10/772,565, filed on Feb. 4, 2004, and "SYSTEM AND METHOD FOR MANAGING CONTENT ON MOBILE PLATFORMS," Ser. No. 11/123,327, filed on May 6, 2005, which are assigned to the assignee of the present application and the respective disclosures of which are hereby incorporated herein by reference in their entireties. The portable media device 100 and the content source 300 likewise can communicate in any conventional manner, including via wired and/or wireless communications. Thereby, when in communication with the content source 300, the portable media device 100 can receive and present viewing content 200 from the content source 300.

The viewing content 200 can comprise any suitable type of viewing content 200 in the manner set forth in the above-mentioned co-pending U.S. patent application, entitled "SYSTEM AND METHOD FOR DOWNLOADING FILES," Ser. No. 10/772,565, filed on Feb. 4, 2004. Preferably being provided in any conventional compressed digital format to facilitate transmission, the viewing content 200 may be provided in any appropriate analog format and/or digital format that may be compressed and/or uncompressed, as desired. To help ensure smooth presentation, the viewing content 200 preferably is buffered when transmitted from the content source 300 to the portable media device 100. The buffering can be provided in any conventional manner, including via, for example, the portable media device 100 and/or the content source 300. When configured to communicate by way of a content distribution system 400 (shown in FIG. 7), the buffering likewise can be associated with the content distribution system 400, as desired.

The viewing content 200, for example, can have entertainment content, including audio content, such as music or audio books, and/or video content, such as motion pictures, television programming, or any other type of audiovisual work. As desired, the viewing content 200 can comprise stored (or time-delayed) viewing content 200 and/or live (or real-time) viewing content 200, such as broadcast transmissions of live events or pre-recorded events. The content source 300 preferably provides the viewing content 200 substantially in real-time. Illustrative formats for the video content can include Audio Video Interleave (AVI) format, Joint Photographic Experts Group (JPEG) format, and Moving Picture Experts Group (MPEG) format; whereas, Waveform (WAV) format and MPEG Audio Layer 3 (MP3) format comprise exemplary formats for the audio content.

Streaming video content preferably is provided in MPEG-4 FGS (Fine Granularity Scalable) format to help ensure transmission efficiency; however, the video content can be streamed by the content source 300 in any suitable standard format. When configured to receive the streaming video content in MPEG-4 FGS format, the portable media device 100 can advantageously maintain compatibility with one or more other video formats, such as other Moving Picture Experts Group (MPEG) formats, including MPEG-1 format and MPEG-2 format. Audio content likewise can be streamed by the content source 300. The streamed audio content can be provided separately, such as with music, and/or in association with other viewing content 200, such as with a soundtrack to a motion picture. Preferably being provided in MPEG-4 BSAC (Bit Slice Arithmetic Coding) format and/or Advanced Audio Coding (AAC) format, the streamed audio content can be streamed by the content source 300 in any suitable standard format.

As desired, other types of viewing content 200, including application software, such as media player programs or games, and/or textual materials, such as forms, reference materials, or other documents, can be provided by the content source 300. Application software typically is provided in an executable (EXE) format, and exemplary formats for the textual viewing content 200 include document text file (DOC) format, Portable Document Format (PDF), and text file (TXT) format. Although selected formats have been discussed above with reference to the audio viewing content 200 and video viewing content 200 for purposes of illustration, the selected formats are merely exemplary and not exhaustive. It is understood that the viewing content 200 thereby can be provided in any suitable conventional format.

The viewing content 200 can be presented by the portable media device 100 in any conventional manner, preferably substantially in real-time. For example, the portable media device 100 can download the viewing content 200 in the manner disclosed in the aforementioned co-pending U.S. patent application, entitled "SYSTEM AND METHOD FOR DOWNLOADING FILES," Ser. No. 10/772,565, filed on Feb. 4, 2004. As desired, the portable media device 100 likewise can store the downloaded viewing content 200. The portable media device 100 thereby can present the viewing content 200 at any time regardless of whether communication with the content source 300 is maintained.

The viewing content 200 likewise can be streamed to the portable media device 100 from the content source 300. Stated somewhat differently, the viewing content 200 can be momentarily stored (or cached) by the portable media device 100. The viewing content 200 likewise can be streamed in any conventional manner. Content sources 300 for streaming the viewing content 200 can include terrestrial content sources 300 and/or satellite content sources 300. For example, live television programming can be streamed by one or more terrestrial content source 300, such as a broadcast television system (not shown), and/or by one or more satellite content source 300, such as a Direct Broadcast Satellite (DBS) system (not shown). If the portable media device 100 disposed in a vehicle 500 (shown in FIGS. 8A-B) in the discussed below with reference to FIGS. 8A-B, the viewing content 200 can be streamed to the portable media device 100 from a content source 300, such as a media server system 520 (shown in FIGS. 8A-B), installed aboard the vehicle 500.

By streaming the viewing content 200 to the portable media device 100, loss, such as by theft, of the portable media device 100 therefore does not also result in loss of the viewing content 200. To help further ensure the security of the viewing content 200, the viewing content 200 preferably is streamed to the portable media device 100 in an encrypted format and/or can be provided with one or more other digital rights management (DRM) controls. Thereby, the viewing content 200 can be protected against any unauthorized use, copying, and/or dissemination, and/or, even if intercepted or otherwise stolen, the encrypted viewing content 200 will not be readily usable. The viewing content 200 can be encrypted in any conventional manner, including the use of proprietary encryption techniques. By streaming the viewing content 200 from the content source 300, the quantity and complexity of the components comprising the portable media device 100 can be reduced. Thereby, the portable media device 100 can be provided as the portable, handheld media presentation system as discussed above. The weight, complexity, and power consumption of the portable media device 100 likewise can be reduced; whereas, the overall device reliability of the portable media device 100 can be increased.

The viewing content 200, such as stored (or time-delayed) viewing content 200, therefore can advantageously be provided from, or stored in, a central location. Thereby, management of the viewing content 200, including updating the viewing content 200, is facilitated, and the portable media device 100 can present viewing content 200 selected from extensive resources of the content source 300. Further, if the viewing content 200 comprises real-time viewing content 200, including, for example, live satellite television programming, live satellite radio programming, and/or real-time Internet access, the portable media device 100 can present the live viewing content 200 substantially in real-time. The portable media device 100 therefore is not limited to presenting viewing content 200 that can be stored within its resources, which can be limited in comparison with the extensive resources of the content source 300. As a result, the portable media device 100 can be configured to provide a wide variety of viewing content 200 choices, which can be selected and presented on demand.

As illustrated in FIGS. 2A-B, the portable media device 100 preferably can select viewing content 200 provided by the content source 300 and can present the selected viewing content 200 in the manner discussed above with reference to FIG. 1. If the content source 300 is configured to provide a catalogue of available viewing content 200, the portable media device 100 can select relevant viewing content 200 (or selected viewing content 200"), as desired, from the catalogue in any conventional manner. For example, the content source 300 can simultaneously transmit a plurality of viewing content 200 (or aggregate viewing content 200') from the catalogue as shown in FIG. 2A. The viewing content 200 can be transmitted on a predetermined communication channel and/or can include (or be encoded with) a unique identifier (or address).

The portable media device 100 of FIG. 2A includes a content selection system 150 for receiving the aggregate viewing content 200' and a content selection signal 250 from the control system 140. Based upon the content selection signal 250, the content selection system 150 thereby can identify the selected viewing content 200" from the aggregate viewing content 200', for example, by selecting the predetermined communication channel and/or the unique identifier associated with the selected viewing content 200". Upon selecting the select the selected viewing content 200" and, as necessary, providing payment and/or authorization information, the content selection system 150 can provide the selected video content 220 to the video system 120 and/or the selected audio content 230 to the audio system 130 for presentation as discussed above. Although shown and described as being separate from the control system 140 for purposes of illustration, the content selection system 150 can be at least partially integrated with the control system 140, as desired.

Alternatively, or in addition, the content source 300 can transmit the selected viewing content 200" to the portable media device 100 as shown in FIG. 2B. The portable media device 100 of FIG. 2B is illustrated as being configured to transmit (or upload) upload content 260, including viewing content 200 and/or communication signals, such as the content selection signal 250, to the content source 300. In other words, the portable media device 100 and the content source 300 can engage in two-way communications. Upon receiving the content selection signal 250, the content source 300 can identify the selected viewing content 200" associated with the content selection signal 250 and transmit the selected viewing content 200" to the portable media device 100. In the manner discussed above with reference to FIG. 2A, the content source 300 preferably transmits the elected viewing content 200" on a predetermined communication channel and/or can include (or be encoded with) a unique identifier (or address) associated with the portable media device 100. The portable media device 100 can receive the selected viewing content 200" and provide the selected video content 220 to the video system 120 and/or the selected audio content 230 to the audio system 130 for presentation as discussed above.

Figure 3A:
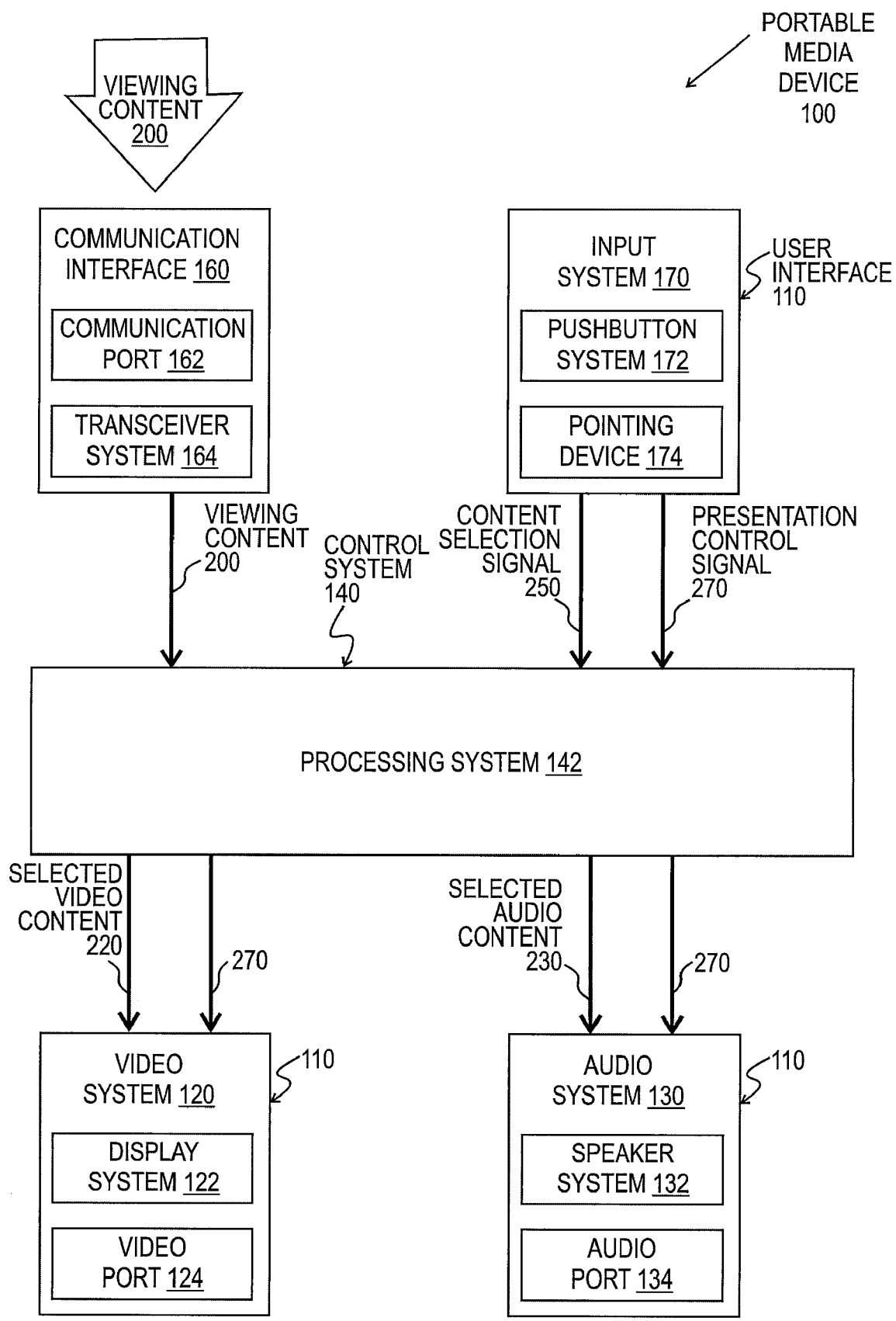
FIG. 3A is an exemplary block diagram illustrating an alternative embodiment of the portable media device of FIG. 1, in which the portable media device includes a communication interface for facilitating communication between the portable media device and the content source and an input system for selecting the viewing content and for controlling the presentation of the selected viewing content.

FIG. 3A is an exemplary block diagram illustrating one embodiment of the portable media device 100. As shown in FIG. 3A, the portable media device 100 includes a communication interface 160 for facilitating communication between the portable media device 100 and the content source 300 (shown in FIGS. 2A-B) and an intuitive user interface system 110 for permitting a user (or passenger) (not shown) to readily interact with the portable media device 100 and, therefore, the content source 300. The portable media device 100 and the content source 300 can be configured to communicate in any conventional manner. Preferably, the communication interface 160 is configured to support high-speed data communications between the portable media device 100 and the content source 300.

Illustrative high-speed data communication protocols can include any type of Fast Ethernet (such as 100Base-X and/or 100Base-T) protocol and/or Gigabit (such as 1000Base-X and/or 1000Base-T) Ethernet communication protocol, with a typical data transfer rate of at least approximately one hundred megabits per second (100 Mbps). In a wired environment, the high-speed data communications between the portable media device 100 and the content source 300 can be provided via one or more conventional copper communication connections and/or fiber optic communication connections. The fiber optic communication connections can be trunked, as desired. To achieve high data transfer rates in a wireless communications environment, free-space optics (or laser) technology, millimeter wave (or microwave) technology, and/or Ultra-Wideband (UWB) technology can be utilized to provide the high-speed data communications between the portable media device 100 and the content source 300. The portable media device 100 and the content source 300 likewise can communicate directly and/or indirectly via one or more intermediate systems, such as a content distribution system 400 (shown in FIG. 7). Illustrative embodiments of the content distribution system 400 are discussed in more detail below with reference to FIG. 7.

Being disposed substantially between the portable media device 100 and the content source 300, the communication interface 160 is configured to support any conventional type of communication, including wired communications and/or wireless communications. The communication interface 160, for example, can comprise a Ethernet adapter for wired communications via a computer network and/or a modem for wired communications via a telecommunications network. As shown in FIG. 3A, the communication interface 160 is illustrated as including a communication port 162 for communicating with the content source 300 and a compatible transceiver system 164 for receiving the viewing content 200. As desired, the communication interface 160 can be disposed substantially within, or separate from, the portable media device 100.

Comprising a conventional communication port, the communication port 162 can include a wired communication port for supporting wired communications and/or a wireless communication port for supporting wireless communications over one or more communication frequencies. Conventional wired communication port include a connector system (not shown) such as an Ethernet connector system, such as Registered Jack 45 (RJ-45) connector system, and/or a telecommunication connector system, such as Registered Jack 11 (RJ-11) connector systems and Registered Jack 12 (RJ-12) connector systems. The wireless communication port can comprise an antenna system (not shown) for receive viewing content 200 within a predetermined range of communication frequencies. Exemplary wireless communication ports can include radio-frequency (RF) communication ports and/or infrared (IR) communication ports.

The transceiver system 164 is coupled with, and configured to communicate with, the communication port 162. Upon receiving viewing content 200 from the content source 300, the communication port 162 can provide the received viewing content 200 to the transceiver system 164. The transceiver system 164 can be configured to process the viewing content 200 in any conventional manner. Illustrative conventional processes can include decoding, demodulating, and/or analog-to-digital converting the viewing content 200. Upon processing the viewing content 200, the transceiver system 164 can provide the processed viewing content 200 to the control system 140.

Since the portable media device 100 preferably is provided in the form of a laptop computer, a palmtop computer, a personal digital assistant (PDA), cellular telephone, and/or a MPEG Audio Layer 3 (MP3) device, the control system 140 typically includes at least one processing system 120 for processing the viewing content 200. Stated somewhat differently, the portable media device 100 can include the functionality underlying each of the above-mentioned devices, individually and/or in combination. The processing system 120 is illustrated in FIG. 3A as coupling, and facilitating communication among, the communication interface 160, the video system 120, and/or the audio system 130. The processing system 120 can comprise any appropriate number and type of conventional processing systems, such as one or more microprocessors (μPs), central processing units (CPUs), digital signal processors (DSPs), and/or coder/decoders (CODECs), and can process the viewing content 200 in accordance with user instructions (or commands), such as a content selection signal 250 and/or a presentation control signal 270.

If the viewing content 200 is provided to the portable media device 100 in an encrypted format as discussed in more detail with reference to FIGS. 2A-B, the processing system 142 can decrypt the encrypted viewing content 200 to restore the viewing content 200. The processing system 142 likewise can be configured to process the viewing content 200 in a suitable manner provide the video portion of the viewing content 200 (or video content 220) and/or the audio portion of the viewing content 200 (or audio content 230). Thereby, the processing system 120 can provide the selected video content 220 to the video system 120 for visual presentation and/or the selected audio content 230 to the audio system 130 for audible presentation.

In the manner discussed above, the video system 120 can be configured to visually present the selected video content 220. The video system 120 can be provided in any conventional manner and, as shown in FIG. 3A, includes a display system 122 and/or a video port 124 for coupling the video system 120 with one or more peripheral video presentation systems (not shown). Illustrative peripheral video presentation systems can include external video display systems with enhanced viewing features, such as larger viewable areas and/or higher image resolutions. As desired, the video port 124 likewise can be configured to communicate with peripheral video input devices, such as a still and/or motion picture camera system. The video system 120 preferably is suitable for presenting any conventional type of viewing content 200, including any viewing content 200 available via the portable media device 100, user instructions for accessing the content source 300, and/or a catalogue of the viewing content 200 available via the content source 300. For example, the display system 122 preferably has an appropriately-sized viewable area with sufficient resolution for visually presenting the viewing content 200.

Illustrative video resolutions for presenting viewing content 200, such as the movies and/or television programming, can include any color graphics adapter (CGA) resolution, enhanced graphics adapter (EGA) resolution, video graphics array (VGA) resolution, extended graphics array (XGA) resolution, super extended graphics array (SXGA) resolution, ultra extended graphics array (UXGA) resolution, and/or wide graphics array (WXGA) resolution. The video system 120 likewise can provide a graphical user interface (GUI) to facilitate interaction with the portable media device 100 and/or an interactive menu of the available viewing content 200, including viewing content 200 available via the content source 300 and/or viewing content 200, such as stored content 240 (shown in FIG. 3B), previously received by the portable media device 100. The user interface 110 thereby can provide an intuitive user interface for assisting the user in selecting viewing content 200 for presentation, for controlling the transmission of the selected viewing content 200, and/or for controlling the manner in which the selected viewing content 200 is presented by the portable media device 100.

The audio system 130 likewise can be provided in any conventional manner and is configured to audibly present the selected video content 220. As illustrated in FIG. 3A, includes one or more speaker systems 132 and/or audio ports 134 for coupling the audio system 130 with one or more peripheral audio presentation devices (not shown). Exemplary peripheral audio presentation devices can include headphones, speakers, and/or amplifiers. As desired, the audio port 134 likewise can be configured to communicate with peripheral audio input devices, such as a microphone and/or a compact disk player. The audio system 130 preferably is suitable for presenting any conventional type of viewing content 200, including any viewing content 200 available via the portable media device 100. For example, the audio system 130 preferably has an appropriate audio processing capabilities, such as filtering functionality and/or equalizing functionality, for audibly presenting the viewing content 200.

The portable media device 100 preferably has a plurality of audio ports 134 to permit the selected viewing content 200 to be audibly presented to more than one user. Multiple users thereby can simultaneously enjoy the audio portion of the selected viewing content 200 on individual sets of headphones. Further, each user can view the video portion of the selected viewing content 200 by sharing the display system 122. The audio ports 134 can be provided in any conventional manner, such as via one or more audio jacks for coupling external devices with the portable media device 100 in a wired manner. At least one of the audio ports 134 preferably is provided as a wireless communication port that is configured to support, for example, wireless audio peripheral presentation device, such as Bluetooth-capable wireless headphones in accordance with Institute of Electrical and Electronics Engineers (IEEE) Standard 802.15.1.

The audio system 130 likewise can process the audio portion of the selected viewing content 200 in any conventional manner. Illustrative processes by which the audio system 130 can process the selected viewing content 200 to enhance the sound quality can include three-dimensional audio processing to simulate surround sound. Thereby, the selected viewing content 200 can be audibly presented in surround sound via an ordinary speaker system and/or a set of ordinary headphones.

The audio system 130 likewise can provide noise cancellation processing of the audio portion to cancel any ambient noise from the audible presentation of the viewing content 200. The manner by which the audio system 130 processes the audio portion of the selected viewing content 200 preferably can be controlled by the user.

As shown in FIG. 3A, the user interface 110 can include an input system 170 for permitting the user (or passenger) to communicate with the portable media device 100. For example, the input system 170 can permit the user to enter one or more passenger instructions for controlling the operation of the portable media device 100. Illustrative instructions can include instructions for initiating communication with the content source 300, instructions for selecting viewing content 200 for presentation, and/or instructions for controlling the presentation of the selected viewing content 200. The input system 170 can convert each user entry into one or more communication signals, such as the content selection signal 250 and/or the presentation control signal 270, as illustrated in FIG. 3A. If a fee is required for accessing the viewing content 200, payment information likewise can be entered via the input system 170.

The input system 170 can be provided in any conventional manner and typically includes one or more switches (or pushbuttons) 172, such as a keyboard or a keypad, and/or a pointing device 174, such as a mouse, trackball, or stylus. As desired, the input system 170 can be at least partially integrated with, and/or separable from, the portable media device 100. The input system 170 likewise can include one or more input ports (not shown) for coupling a peripheral input device (not shown), such as a full-size computer keyboard, an external mouse, and/or a game pad, with the portable media device 100. As desired, the input system 170 can be at least partially combined with the video system 120 and/or the audio system 130.

For example, the switches 172 of the input system 170 and the display system 122 of the video system 120 can be at least partially combined in the form of a touch screen display system. Similarly, the display system 122 can be configured to provide visual feedback with reference to user instructions (or commands) entered via the input system 170. If selected audio properties, such as a volume level, a tone level, and/or a balance, of the audio system 130 can be controlled via the input system 170, for example, the display system 122 can visually present the current audio properties of the audio system 130. Conventional manners of presenting the audio properties of the audio system 130 include providing a separate "audio properties" window (or screen) and/or providing a series of bars in which the number of bars are presented in proportion with the current audio properties. The display system 122 can provide visual feedback for other types of user instructions (or commands), including user instructions for selected video properties, such as a brightness level and/or a contrast level, of the display system 122 and/or user instructions for controlling the transmission of the selected viewing content 200 from the content source 300.

Turning to FIG. 3B, the portable media device 100 is shown as including a memory system 144 for providing at least temporary storage of the viewing content 200 as stored content 240. The selected viewing content 200 from the content source 300 thereby can advantageously be buffered when the viewing content 200 is streamed to the portable media device 100 and/or can be stored as the stored content 240 for subsequent presentation, as discussed above, regardless of whether communication with the content source 300 is maintained. To help ensure the security of the viewing content 200, the viewing content 200 preferably is stored on the memory system 144 in an encrypted format in the manner discussed in more detail above with reference to FIGS. 2A-B. Thereby, even if the portable media device 100 and/or the memory system 144 is lost or stolen, the viewing content 200 will not be readily usable.

Being coupled with the processing system 130, the memory system 144 preferably includes at least one integrated memory device 146 for storing and providing other conventional types of information, including instruction code, such as software or firmware, intermediate calculation results, and other information associated with the processing system 120. For example, if the viewing content 200 includes application software, such as a game, the application software can be stored in the memory device 146 and provided to the processing system 120 for execution. Preferably comprising a non-volatile memory system, the memory system 144 can comprise any conventional type of memory system, such as any suitable electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind. Since the portable media device 100 preferably is provided as a portable, handheld media presentation system, the memory system 144 preferably comprises electronic memory media to help ensure that the physical dimensions and weight of the handheld system remain manageable. The portable media device 100 preferably is configured to permit viewing content 200 to be added to, modified, and/or deleted from the memory system 144 as desired.

As desired, the portable media device 100 can include one or more memory ports 148, such as a Personal Computer Memory Card International Association (PCMCIA) port, a secure digital data (SD) port, a secure multi media card (MMC) port and/or a CompactFlash (CF) port, for receiving a conventional removable memory system 144, such as a removable hard drive (HDD) system. The removable memory system 144 preferably comprises a personal memory device (PMD) for providing secure storage of the user's personal data and/or other predetermined information, including preselected viewing content. Exemplary personal memory devices can include a memory stick, a secure digital data (SD) device, a secure multi media card (MMC) device and/or a CompactFlash (CF) device.

Upon receiving the personal memory device (PMD), the portable media device 100 can readily access the personal data and/or other predetermined information. The portable media device 100 likewise can select viewing content 200 from among the preselected viewing content stored on the personal memory device (PMD) and can present the selected viewing content 200 in the manner discussed above. Advantageously, the personal memory device (PMD) can be removed from the memory port 148 after use of the portable media device 100 is complete. Media security can be further enhanced by enabling the use of existing, proven, and Motion Picture Association of America (MPAA) approved media distribution processes, including uploading processes and/or downloading processes, in combination with secure key methodologies.

The functionality of the portable media device 100 likewise can be enhanced by providing the portable media device 100 with one or more peripheral systems 180. As shown in FIG. 3B, the peripheral system 180 can include at least one conventional peripheral port 182 for removably coupling peripheral devices (not shown) with the portable media device 100. Illustrative conventional peripheral ports 182 can include Personal Computer Memory Card International Association (PCMCIA) ports, secure digital (SD) ports, and/or CompactFlash (CF) ports, for receiving the peripheral devices; whereas, a credit card reader system, a radio frequency identification (RFID) system, and/or a conventional camera system, including a moving picture camera system and/or a still picture camera system, are examples of conventional peripheral devices. Preselected peripheral devices 184, such as the credit card reader system and/or the camera system, likewise can be incorporated into the portable media device 100, as desired. If the peripheral system 180 comprises at output (or presentation) peripheral system, the portable media device 100 can provide the viewing content 200 or other relevant information to the peripheral system 180 for presentation in the manner set forth in more detail above with reference to the peripheral video presentation systems and/or the peripheral audio presentation systems. Similarly, the portable media device 100 can receive viewing content 200 or other relevant information from input peripheral systems 180, such as the peripheral video input devices and/or the peripheral audio input devices discussed above.

The portable media device 100 of FIG. 3B is shown as being configured to support two-way communications with the content source (shown in FIGS. 2A-B). The portable media device 100 thereby can transmit (or upload) upload content 260 as illustrated in FIG. 3B. Being provided in the manner discussed above with reference FIG. 2B, the upload content 260 can comprise viewing content 200, including selected viewing content 200 previously received from the content source 300, selected stored content 240 stored in the memory system 144, and/or selected new content, such as new content provided by the portable media device 100 and/or an associated peripheral system 180. The upload content 260 likewise can include one or more communication signals provided by the portable media device 100 and/or an associated peripheral system 180. Exemplary communication signals can include system communication signals (not shown), such as a system status signal, for the portable media device 100 and/or the associated peripheral system 180, and/or user communication signals, such as the content selection signal 250, as initiated by the user via the input system 170.

The transceiver system 164 can receive the upload content 260, such as the selected viewing content 200, the selected stored content 240, and/or the content selection signal 250 as shown in FIG. 3B, via the control system 140. In the manner discussed in more detail with reference to FIG. 3A, the transceiver system 164 can process the upload content 260 and can provide the processed upload content 260 to the communication port 162 for transmission. When the portable media device 100 and the content source 300 are in communication, the transceiver system 164 can transmit (or upload) the upload content 260 to the content source 300. The portable media device thereby can provide enhanced functionality, such as support for viewing content uploads and other passenger transactions, during travel.

One embodiment of the portable media device 100 is illustrated in FIGS. 4A-B. Being shown as a light-weight and thin entertainment portal the portable media device 100 includes a communication interface 160 and an ergonomic user interface 110 each being provided in the matter set forth in more detail above with reference to FIGS. 2A-B and 3A-B. Turning to FIGS. 4A-B, the user interface 110 permits a user (or passenger) (not shown) to intuitively interact with the portable media device 100 and, therefore, at least one content source 300 (shown in FIGS. 2A-B) and includes a video system 120, an audio system 130, and an input system 170 as discussed above. Being configured for selecting viewing content 200 (shown in FIG. 1) for presentation, for controlling the transmission of the selected viewing content 200, and/or for controlling the manner in which the selected viewing content 200 is presented, the input system 170 is illustrated as having a plurality of switches (or pushbuttons) 172 and a pointing device 174.

The switches (or pushbuttons) 172 are shown as including a main power switch 172A and at least one volume control switch 172B. For stored (or time-delayed) viewing content 200, a plurality of playback control switches 172C can be provided to intuitively control the presentation of the time-delayed viewing content 200. The illustrated playback control switches 172C can be used to provide rewind, play, stop (or pause), skip, and fast forward control functionality for the viewing content 200, as desired. Playback control switches 172D likewise are provided to control the presentation of live (or real-time) viewing content 200. If the real-time viewing content 200 comprises live satellite television programming and/or live satellite radio programming, for example, the playback control switches 172D can be configured to select the appropriate television channel and/or radio station. The switches 172A-D likewise can be configured to provide other preselected functions, including, for example, enhanced content presentation control functions, such as mixing, equalization, and/or muting functions, and/or content management functions, such as content transferring, editing, and/or deleting functions. As desired, the input system 410 can provide file and/or content editing functionality. The quantity, physical size, and arrangement of the switches 172A-D preferably are provided in an intuitive manner to facilitate use of the portable media device 100.

As discussed in more detail above, the pointing device 174 likewise can be provided in any conventional manner and preferably is provided in a manner that facilitates use of the portable media device 100. Being disposed on the portable media device 100, the pointing device 174 can be fixedly provided on the portable media device 100 as illustrated in FIG. 3A and/or can be removably coupled with the portable media device 100. The pointing device 174 is shown as comprising a plurality of control switches, including at least one directional switch 174A and at least one selection switch 174B. In the conventional manner, a cursor 174C and at least one selectable identifier 174D, such as a selectable icon, each can be presented via the video system 134B, and the directional switch 174A can be configured to move the cursor 174C in a selected direction on the video display 122 and toward the selectable identifier 174D of interest. When the cursor 174C is adjacent to the relevant selectable identifier 174D, the selection switch 174B can be activated to initiate the functionality associated with the relevant selectable identifier 174D. The user interface 110 thereby can be provided as a graphical user interface (GUI).

Although shown and described as comprising substantially separate switches 172 for purposes of illustration, the functions associated with the switches 172A-D can be reallocated, such as via further combining and/or separating, as desired. For example, the portable media device 100 can be configured to power up upon activation of at least one of the switches 172A-D and to automatically power down based upon any suitable predetermined criteria, such as a selected amount of time of non-use. The main power switch 172A thereby can be omitted from the portable media device 100 of FIG. 4A. The functions associated with the pointing device 174 likewise can be reallocated, such as via further combining and/or separating of the pointing device switches 174A-B, as desired. Stated somewhat differently, the functions associated with the input system 170 can be distributed among the switches 172 and/or the pointing devices 174 in any suitable manner.

As desired, additional control switches (not shown), such as a keyboard and/or a game pad, can be provided for use with the portable media device 100. The additional control switches can be disposed on the portable media device 100 in the manner set forth above with reference to the switches 172A-D among the plurality of switches (or pushbuttons) 172 and/or the directional switch 174A and the selection switch 174B of the pointing device 174. Similarly, the additional control switches can be configured to communicate with the portable media device 100 via one or more of the input ports and/or the peripheral ports 182 (shown in FIG. 3B) of the portable media device 100 in any conventional manner as discussed above. The additional control switches advantageously enable the portable media device 100 to be more flexibly configurable for use with a wide range of viewing content 200.

As discussed above, the portable media device 100 is shown in FIGS. 4A-B as including a video system 120 and an audio system 130. The video system 120 has a video display system 122, such as a high-resolution video display system, that is suitable for presenting the video portion of the selected viewing content 200. For example, the display system 122 can be a widescreen, active matrix liquid crystal display (LCD) system with at least video graphics array (VGA) resolution. The viewable area of the display system 122 typically has a minimum width that is between approximately seven inches and nine inches. Preferably, the display system 122 is a flat screen video display system to further enhance the presentation of the selected viewing content 200. As desired, the display system 122 can include a protective translucent cover (not shown). The protective translucent cover is configured to protect the viewing area of the display system 122 from damage and can be customized, for example, by tinting the cover, in whole and/or in part.

Being suitable for presenting the audible portion of the selected viewing content 200, the audio system 130 of the portable media device 100 can audibly present the audio portion (or selected audio content 230 as shown in FIGS. 3A-B) of the selected viewing content 200 in any conventional manner. The portable media device 100 can include one or more speaker systems 132 (shown in FIGS. 3A-B) and/or one or more audio ports 134 in the manner discussed in more detail above with reference to FIGS. 3A-B. As shown in FIG. 4B, the portable media device 100 preferably has a plurality of audio ports 134 to permit the selected viewing content 200 to be audibly presented to more than one user. Multiple users thereby can simultaneously enjoy the audio portion of the selected viewing content 200 on individual sets of headphones. Further, each user can view the video portion of the selected viewing content 200 (or selected video content 220 as shown in FIGS. 3A-B) by sharing the display system 122. Although shown in FIG. 4B as comprising audio jacks for coupling peripheral audio presentation devices with the portable media device 100 in a wired manner, the audio ports 134 can comprise any conventional type of audio port as discussed above. At least one of the audio ports 134 preferably is provided as a wireless audio port that is configured to support, for example, wireless peripheral audio presentation device, such as Bluetooth-capable wireless headphones in accordance with Institute of Electrical and Electronics Engineers (IEEE) Standard 802.15.1.

To help ensure a compact profile, the portable media device 100 preferably comprises a small number of components to present selected viewing content 200 streamed from the content source 300 (shown in FIGS. 2A-B). For example, the portable media device 100 can include a digital signal processing system (not shown) for facilitating presentation of the streamed viewing content 200. The digital signal processing system can be provided via the control system 140 (shown in FIG. 1) and/or the processing system 120 (shown in FIGS. 2A-B) and can include one or more microprocessors (Ups), central processing units (CPUs), digital signal processors (DSPs), and/or coder/decoders (CODECs).

The portable media device 100 likewise can include a memory system 144. Being provided in the manner set forth in more detail above with reference to FIG. 3B, the memory system 144 preferably has a program memory system, such as a FLASH memory system, for storing resident software applications as well as other types of application software, such as games, and data. The memory system 144 can include an optional hard drive (HDD) system. The portable media device 100 thereby can provide enhanced programming flexibility and redundant programming, such as protection against failure. As desired, viewing content 200 can be stored on the hard drive (HDD) system as stored content 240 (shown in FIG. 3B) such that the portable media device 100 is less reliant on the content source 300 for viewing content 200.

The portable media device 100 can be configured to operate from power provided via a battery system 190 and/or can include a power port 192 for coupling with, and receiving power from, an external power source (not shown). Although the battery system 190 can be provided in any conventional manner, including one or more separate batteries and/or battery packs, the battery system 190 can comprise a rechargeable battery system. Preferably having a short recharge time and a high charge cycle lifetime, the battery system 190 preferably is capable of providing sufficient power to operate the portable media device 100 for a long period of time. An exemplary rechargeable battery system 190 can include at least one lithium ion polymer battery that can provide a long, lasting charge of approximately eight hours or longer, that has a rapid recharge time of four hours or less, and that can be recharged over one thousand times. The life of the battery system 190 is extended by controlling the manner by which the battery system 190 is recharged and/or by providing the portable media device 100 with a small number of components as discussed above.

The battery system 190, if rechargeable, can be recharged externally from the portable media device 100 and/or while installed via the external power source regardless of whether the portable media device 100 is being used. As desired, the portable media device 100 can include a plurality of rechargeable battery systems 150, such that at least one of the battery systems 150 can be externally recharged while the portable media device 100 is in use. The external power source can be provided in any conventional manner, such as a power adapter, and is configured to provide alternating current (AC) power and/or direct current (D/C) power that is compatible for use with the portable media device 100. When the portable media device 100 is operating from power provided by the external power source, the rechargeable battery systems 150 likewise can provide backup power if the external power source fails. To determine whether the battery system 190 requires recharging, the portable media device 100 can include a battery power meter (not shown). The battery power meter can be provided in any conventional manner such that the status of the battery system 190 can be readily determined. For example, the battery power meter can be integrated with the main power switch 172A.

As illustrated in FIGS. 4A-B, the portable media device 100 can include one or more other features for facilitating its use. For example, the portable media device 100 can be disposed in an attractive housing 102 with any suitable color and/or texture. A plurality of feet 104 can be provided on the housing 102 of the portable media device 100. Being configured to help ensure the stability of the portable media device 100 when placed on a surface (not shown), the feet 104 can be disposed on the housing 102 in any suitable arrangement, number, and/or dimension. The feet 104 preferably are formed from a rubberized material and can grip the surface to enhance the stability the portable media device 100. To facilitate transport, the portable media device 100 can include a carrying handle 106 and, when not in use, can be disposed in a protective carry pouch (not shown). A plurality of openings 108 likewise can be formed in the housing 102 of the portable media device 100. The openings 108 can serve several purposes, including providing ventilation to help ensure a safe and reliable operating temperature and/or providing a convenient grip detail, for the portable media device 100.

Turning to FIG. 4C, the portable media device 100 is shown as including a viewing support 195. The viewing support 195 is configured to support the portable media device 100 such that the portable media device 100 can present the selected viewing content 200 in a hands-free manner. Preferably being adjustable, the viewing support 195 can support the portable media device 100 at any preselected viewing angle to accommodate users of various sizes and diverse viewing environments. The viewing support 195 is illustrated in FIG. 4C as including an extended member 196 that is adjustably coupled with the housing 102 of the portable media device 100. For example, the proximal end region of the viewing support 195 can be rotatably coupled with the housing 102 via a hinge assembly 197. The distal end region of the viewing support 195 can include one or more feet 198 to help ensure the stability of the portable media device 100 when the viewing support 195 is deployed. The feet 198 can be provided in any suitable manner, including the manner set forth in more detail above with reference to the feet 104 (shown in FIGS. 4A-B).

The portable media device 100 likewise can include a protective cover 199 as illustrated in FIG. 4D. Being configured to provide protection for the portable media device 100 when not in use, the protective cover 199 can cover the user interface 110 (shown in FIG. 4A), in whole or in part. As shown in FIG. 4D, for example, the protective cover 199 can be configured to removably cover the display system 122 (shown in FIG. 4A) of the input system 170 (shown in FIG. 4A) and the switches (or pushbuttons) 172 (shown in FIG. 4A) and the pointing device 174 (shown in FIG. 4A) of the input system 170 (shown in FIG. 4A). As shown in FIG. 4D, the protective cover 199 and the viewing support 195 preferably incorporated. The viewing support 195 thereby can support the portable media device 100 when deployed in the manner set forth above and can protect the portable media device 100 when the portable media device 100 is not in use.

FIG. 5A illustrates an alternative embodiment of the portable media device 100 with an ergonomic user interface 110 provided in the matter set forth in more detail above with reference to FIGS. 2A-B and 3A-B. A user (or passenger) (not shown) thereby can intuitively interact with the portable media device 100 and, therefore, at least one content source 300 (shown in FIGS. 2A-B). As shown in FIG. 5A, the portable media device 100 can include a video system 120, an audio system 130, and an input system 170 each being provided in the manner discussed in more detail above. Being configured for selecting viewing content 200 (shown in FIG. 1) for presentation, for controlling the transmission of the selected viewing content 200, and/or for controlling the manner in which the selected viewing content 200 is presented, the input system 170 is illustrated as having a plurality of switches (or pushbuttons) 172 and a pointing device 174.

The user interface 110 preferably is provided as a graphical user interface (GUI) as illustrated in FIG. 5A. As set forth above, the video system 120 can include a video display system 122, such as a high-resolution video display system, that is suitable for presenting the video portion of the selected viewing content 200. The video display system 122 likewise can present an interactive hierarchical menu structure 174X for identifying and selecting viewing content 200 (shown in FIG. 1) that is available for visual and/or audio presentation by the portable media device 100. The viewing content 200 can include viewing content 200 previously received from the content source 300, stored content 240 (shown in FIG. 3B) stored in the memory system 144 (shown in FIG. 3B), and/or selected new content, such as new content provided by the portable media device 100 and/or an associated peripheral system 180 (shown in FIG. 3B). The user interface 110 thereby can facilitate the selection of viewing content 200 to be presented via the portable media device 100.

As illustrated in FIG. 5A, viewing content 200 can be selected for presentation by making an appropriate menu selection 174Y via the switches (or pushbuttons) 172 and/or the pointing device 174. Being provided in the intuitive manner discussed above with reference to FIGS. 4A-D, the switches 172 and/or the pointing device 174 preferably are provided in an appropriate quantity, physical size, and arrangement to facilitate use of the portable media device 100. As shown in FIG. 5A, the switches 172 can include the switches (or pushbuttons) 172X, 172Y for making the appropriate menu selection 174Y for identifying the selected viewing content. The pointing device 174 likewise can be employed to identify the selected viewing content. The audio system 130 is illustrated as including a speaker system 132 and switches (or pushbuttons) 172Y, 172Z for providing volume control.

In the manner discussed above with reference to FIGS. 4A-B, the switches (or pushbuttons) 172 can be provided to intuitively control the presentation of the selected viewing content 200. One or more of the switches (or pushbuttons) 172 can be used to provide rewind, play, stop (or pause), and fast forward control functionality for the selected viewing content 200, as desired. If the viewing content 200 comprises satellite television programming and/or satellite radio programming, for example, the switches 172 can be configured to select the appropriate television channel and/or radio station. Although shown and described as comprising substantially separate switches 172 for purposes of illustration, the functions associated with the switches 172X-Z can be reallocated, such as via further combining and/or separating, as desired. In other words, the functions associated with the input system 170 can be distributed among the switches 172 and/or the pointing devices 174 in any suitable manner.

Turning to FIGS. 5B-C, the portable media device 100 is shown as including a viewing support 195. The viewing support 195 is configured to support the portable media device 100 such that the portable media device 100 can present the selected viewing content 200 in a hands-free manner in the manner discussed in more detail above with reference to FIG. 4C. Preferably being adjustable, the viewing support 195 can support the portable media device 100 at any preselected viewing angle to accommodate users of various sizes and diverse viewing environments. The viewing support 195 is illustrated in FIG. 5C as including an extended member 196 that is adjustably coupled with the housing 102 of the portable media device 100. For example, the proximal end region of the viewing support 195 can be rotatably coupled with the housing 102 via at least one hinge assembly 197. The distal end region of the viewing support 195 can include one or more feet (not shown) to help ensure the stability of the portable media device 100 when the viewing support 195 is deployed. The feet can be provided in any suitable manner, including the manner set forth in more detail above with reference to the feet 198 (shown in FIG. 4C).

Figure 6A:
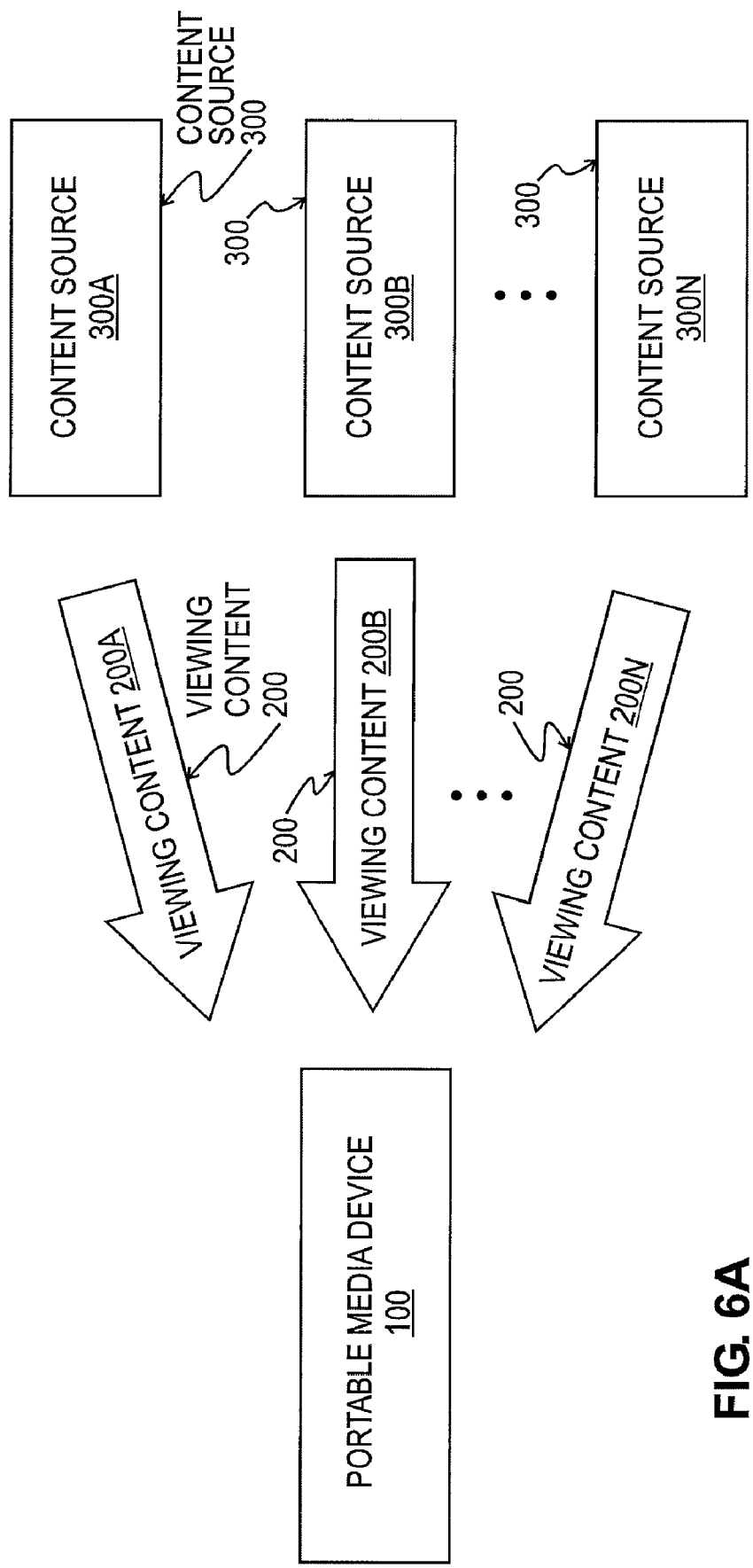
FIG. 6A is an exemplary top-level block diagram illustrating another alternative embodiment of the portable media device of FIG. 1, in which the portable media device can present selected viewing content from a plurality of content sources.

Turning to FIG. 6A, a portable media device 100 can be configured to present selected viewing content 200 provided by a plurality of content sources 300. The content sources 300A-N are shown as providing viewing content 200A-N, respectively, and can be proximate to and/or remote from, the portable media device 100. In the manner set forth in more detail above with reference to FIGS. 2A-B, the portable media device 100 can select the desired viewing content 200 from among the viewing content 200A-N for presentation and can present the selected viewing content 200. As desired, the portable media device 100 likewise can transmit upload content 260 (shown in FIG. 3B), such as viewing content 200 and/or system communication signals (not shown), to one or more of the content sources 300A-N as set forth above with reference to FIG. 3B. The portable media device 100 can communicate with any suitable number of content sources 300 and thereby can offer enhanced functionality by providing viewing content 200 from the plurality of content sources 300.

Figure 6B:
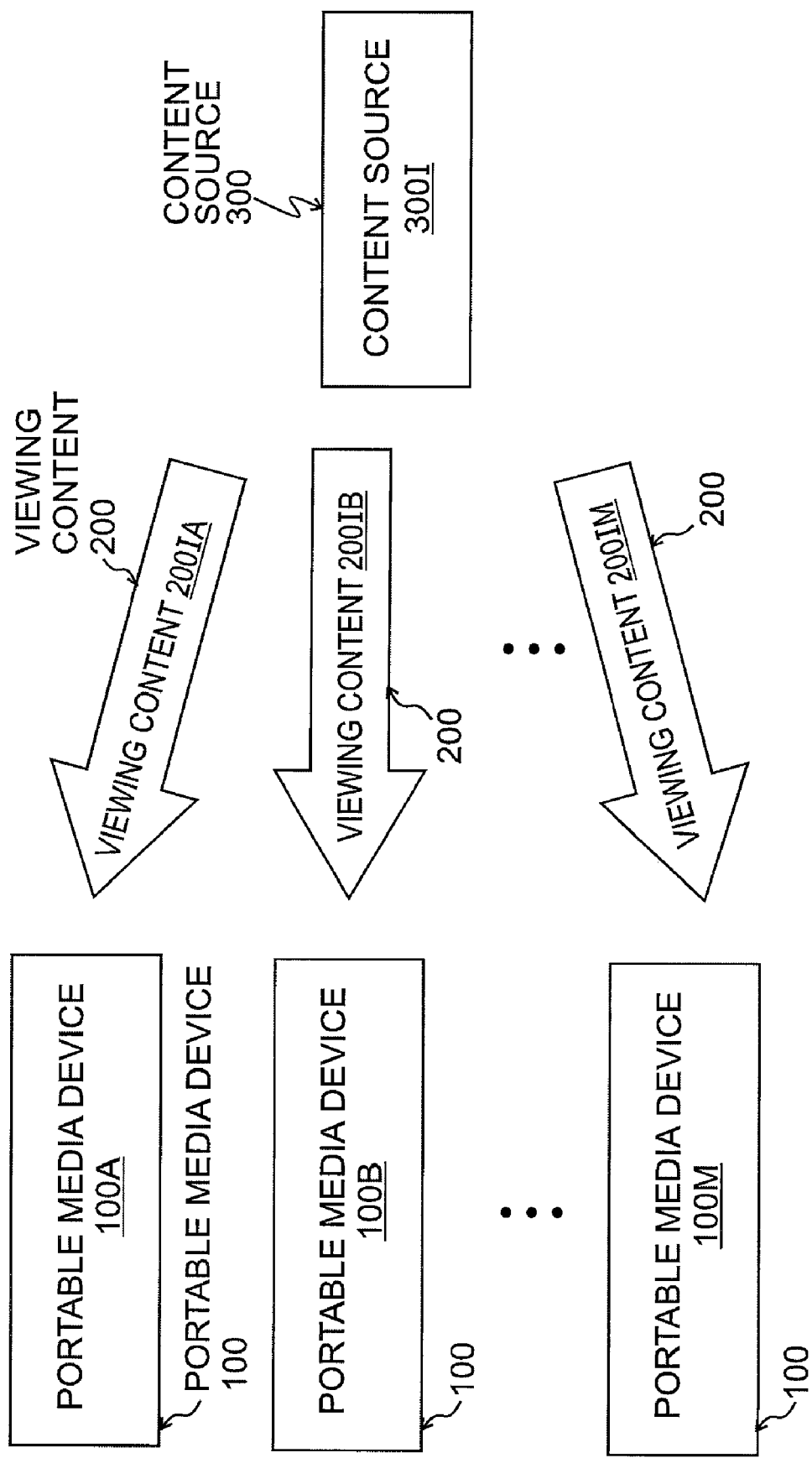
FIG. 6B is an exemplary top-level block diagram illustrating another alternative embodiment of the portable media device of FIG. 1, in which a plurality of the portable media devices is configured to communicate with a selected content source.

Analogously, a plurality of portable media device 100 each can be configured to present viewing content 200 provided by a selected content source 300. As shown in FIG. 6B, the selected content source 300I can provide viewing content 200IA to the portable media device 100A; whereas, the portable media devices 100B-M can receive respectively receive the viewing content 200IB-M. Being proximate to and/or remote from, the selected content source 300I, each of the portable media devices 100A-M can respectively select the desired viewing content 200IA-M from the selected content source 300I for presentation and can present the selected viewing content 200IA-M. One or more of the portable media devices 100A-M can transmit upload content 260 (shown in FIG. 3B), such as viewing content 200 and/or system communication signals (not shown), to the selected content source 300I as set forth above with reference to FIG. 3B.

The viewing content 200IA-M can be substantially uniform, and/or different, among the portable media devices 100A-M. For example, the viewing content 200IA available to the portable media device 100A can be based upon one or more appropriate predetermined criteria, such as a service subscription level. Based upon the service subscription level, one portion of the viewing content 200IA, such as standard viewing content 200, may be free of charge (or included with the service subscription level); whereas, other portions of the viewing content 200IA, such as premium viewing content 200, may be available only for an additional fee. If access to the premium viewing content 200 is desired, transaction information, including payment information, such as a credit card number, and/or authorization information, such as a personal identification number (PIN) or a password, can be provided by the portable media device 100. Preferably, the portable media device 100 includes a peripheral system 180 (shown in FIG. 3B), such as a credit card reader system, to facilitate the transaction and/or the payment in the manner discussed in more detail above with reference to FIG. 3B.

Further details and features relating to the structure, operation, and functionality of the portable media device 100 are disclosed in the co-pending U.S. patent application, entitled "IN-FLIGHT ENTERTAINMENT PASSENGER CONTROL UNIT," Ser. No. 09/952,629, filed on Sep. 11, 2001, which is assigned to the assignee of the present application and the disclosure of which is hereby incorporated herein by reference in its entirety.

The portable media device 100 and the content source 300 can be configured to communication in any conventional manner, including directly and/or indirectly via one or more wired and/or wireless communication networks (or systems). Turning to FIG. 7, for example, a plurality of portable media devices 100 are shown as communicating with a plurality of content sources 300 via a content distribution system 400. The content distribution system 400 includes a plurality of conventional access points 410 for providing wired and/or wireless access to the content distribution system 400 and/or the content sources 300. As shown in FIG. 7, the content sources 300A-N can access the content distribution system 400 via access points 410A-N; whereas, access points 410A1-M, 410B1-P are configured to provide the portable media devices 100A1-N, 100B1-P with access to the content distribution system 400. The content distribution system 400 thereby can receive viewing content 200 from a preselected content source 300 and can provide the viewing content 200, in whole and/or in part, to one or more predetermined portable media devices 100, as desired. The content distribution system 400 likewise can be configured to receive upload content 260, such as viewing content 200 and/or system communication signals (not shown), provided by a preselected portable media devices 100 in the manner set forth with reference to FIG. 3B and to provide the upload content 260, in whole and/or in part, to one or more predetermined content sources 300.

One or more of the content sources 300A-N can respectively transmit viewing content 200A-N to one or more of the portable media devices 100A1-M, 100B1-M as viewing content 200A1-M, 200B1-M, respectively, via the content distribution system 400. For example, viewing content 200A from the content source 300A can be provided to the content distribution system 400 and respectively distributed among the portable media devices 100A1-M as the viewing content 200A1-M in the manner set forth in more detail above with reference to FIG. 6B. The viewing content 200A1-M each can comprise the viewing content 200A, in whole and/or in part, and can be substantially uniform, and/or different, among the portable media devices 100A1-M. Each of the portable media devices 100A1-M can select the desired viewing content 200 from among the relevant viewing content 200A1-M, respectively, in the manner set forth in more detail above with reference to FIGS. 2A-B. Upon selecting the viewing content 200A1-M, the portable media devices 100A1-M can present the selected viewing content 200A1-M as desired.

Similarly, one or more of the portable media devices 100A1-M, 100B1-M can transmit upload content 260A1-M, 260B1-M to one or more of the content sources 300A-N as upload content 260A-N, respectively, via the content distribution system 400. The upload content 260A2, 260B1, and 260BM, for example, can be provided by the portable media devices 100A2, 100B1, and 100BM to the content distribution system 400 for distribution between the content sources 300B, 300C as the upload content 260B, 260C in the manner set forth in more detail above with reference to FIG. 6A. As discussed above, the upload content 260B, 260C can comprise a combination of one or more of the upload content 260A1-M, 260B1-M, in whole and/or in part, and can be substantially uniform, and/or different, between the content sources 300B, 300C. Each of the portable media devices 100A1-M, 100B1-M therefore can communicate with each of the content sources 300A-N, as desired, via the content distribution system 400.

The content distribution system 400 can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11, Bluetooth networks in accordance with Institute of Electrical and Electronics Engineers (IEEE) Standard 802.15.1, and/or wireless metropolitan-area networks (MANs), which also are known as WiMax Wireless Broadband, in accordance with IEEE Standard 802.16.

Preferably being configured to support high-speed data communications among the portable media devices 100A1-M, 100B1-M and the content sources 300A-N, the content distribution system 400 preferably comprises a high-speed Ethernet network, such as any type of Fast Ethernet (such as 100Base-X and/or 100Base-T) communication network and/or Gigabit (such as 1000Base-X and/or 1000Base-T) Ethernet communication network, with a typical data transfer rate of at least approximately one hundred megabits per second (100 Mbps). To achieve high data transfer rates in a wireless communications environment, free-space optics (or laser) technology, millimeter wave (or microwave) technology, and/or Ultra-Wideband (UWB) technology can be utilized to communicate with selected portable media devices 100 and/or selected content sources 300, as desired.

The content distribution system 400 likewise can be provided with any appropriate topology, protocol, and/or architecture. Comprising a geometric arrangement of portable media devices 100 and the content sources 300, common network topologies include mesh, star, bus, and ring network topologies. The topology of the content distribution system 400 likewise can comprise a hybrid of the common network topologies, such as a network tree topology. Network protocols define a common set of rules and signals by which the portable media devices 100 and the content sources 300 can communicate via the content distribution system 400. Illustrative types of network protocols include Ethernet and Token-Ring network protocols; whereas, peer-to-peer and client/server network architectures are examples of typical network architectures. It will be appreciated that the network system types, topologies, protocols, and architectures identified above are merely exemplary and not exhaustive.

As shown in FIG. 7, the portable media devices 100 can be separated into two or more device groups 105 based upon any appropriate predetermined criteria. The portable media devices 100 of FIG. 7 are shown as being separated into two device groups 105: first device group 105A; and second device group 105B. If the portable media devices 100 are associated with a vehicle 500 (shown in FIGS. 8A-B), for example, the portable media devices 100 in the first device group 105A can be associated with a first class section of the vehicle 500; whereas, the portable media devices 100 in the second device group 105B can be associated with a coach class section of the vehicle 500. Similarly, the device groups 105A, 105B may be respectively associated with the operator and passengers of the vehicle 500. The functionality of the portable media devices 100 in the first device group 105A can differ from the functionality of the portable media devices 100 in the second device group 105B. For example, the portable media devices 100 in the first device group 105A may be permitted to access premium content that is not available to the portable media devices 100 in the second device group 105B. The portable media devices 100 in the second device group 105B likewise might be required to make payment of a fee prior to permitting access to the content source 200; whereas, the portable media devices 100 in the first device group 105A may not require payment of the fee to access the content source 200.

The portable media devices 100 preferably are configured to communicate. For example, the portable media devices 100 can communicate via the content distribution system 400 such that viewing content 200 can be exchanged among two or more portable media devices 100 during travel. The portable media devices 100 can be configured to communicate with other portable media devices 100 within the same device group 105, and/or portable media devices 100 in different device groups 105 can communicate. Thereby, the upload content 260B2 transmitted by the portable media device 100B2 thereby can be provided as the viewing content 200A1 provided to the portable media device 100A1 and/or as the viewing content 200BP provided to the portable media device 100BP.

As desired, the portable media devices 100 can be initialized in any conventional manner. For example, the portable media devices 100 can be initialized by precharging the battery system 190 (shown in FIG. 4B) of each portable media device 100 to a full charge. The portable media devices 100 likewise can be initially provided with uniform viewing content 200. The uniform viewing content 200 can be provided to the portable media devices 100 in any conventional manner and preferably is stored by the memory systems 144 (shown in FIG. 3B) as stored content 240 (shown in FIG. 3B) in the manner discussed above with reference to FIG. 3B. Each of the portable media devices 100 can receive the same uniform viewing content 200 and/or the uniform viewing content 200 can vary among the device groups 105. The portable media devices 100 within each device group 105 thereby can receive uniform viewing content 200 associated with the relevant device group 105.

Figure 8A:
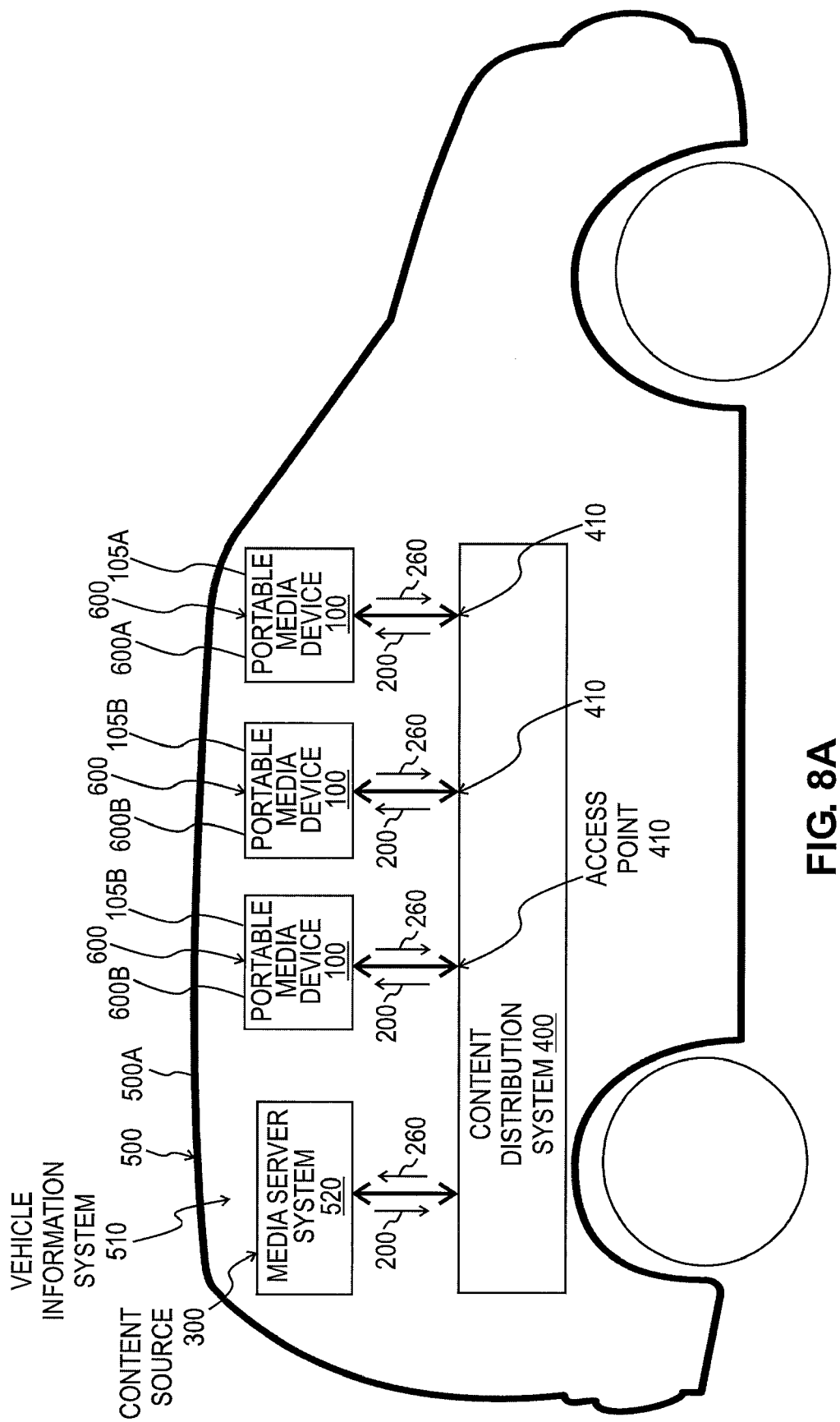
FIG. 8A is a detail drawing illustrating an alternative embodiment of the plurality of portable media devices of FIG. 7, in which the plurality of portable media devices and the plurality of content sources form a vehicle information system that is associated with an automobile.
Figure 8B:
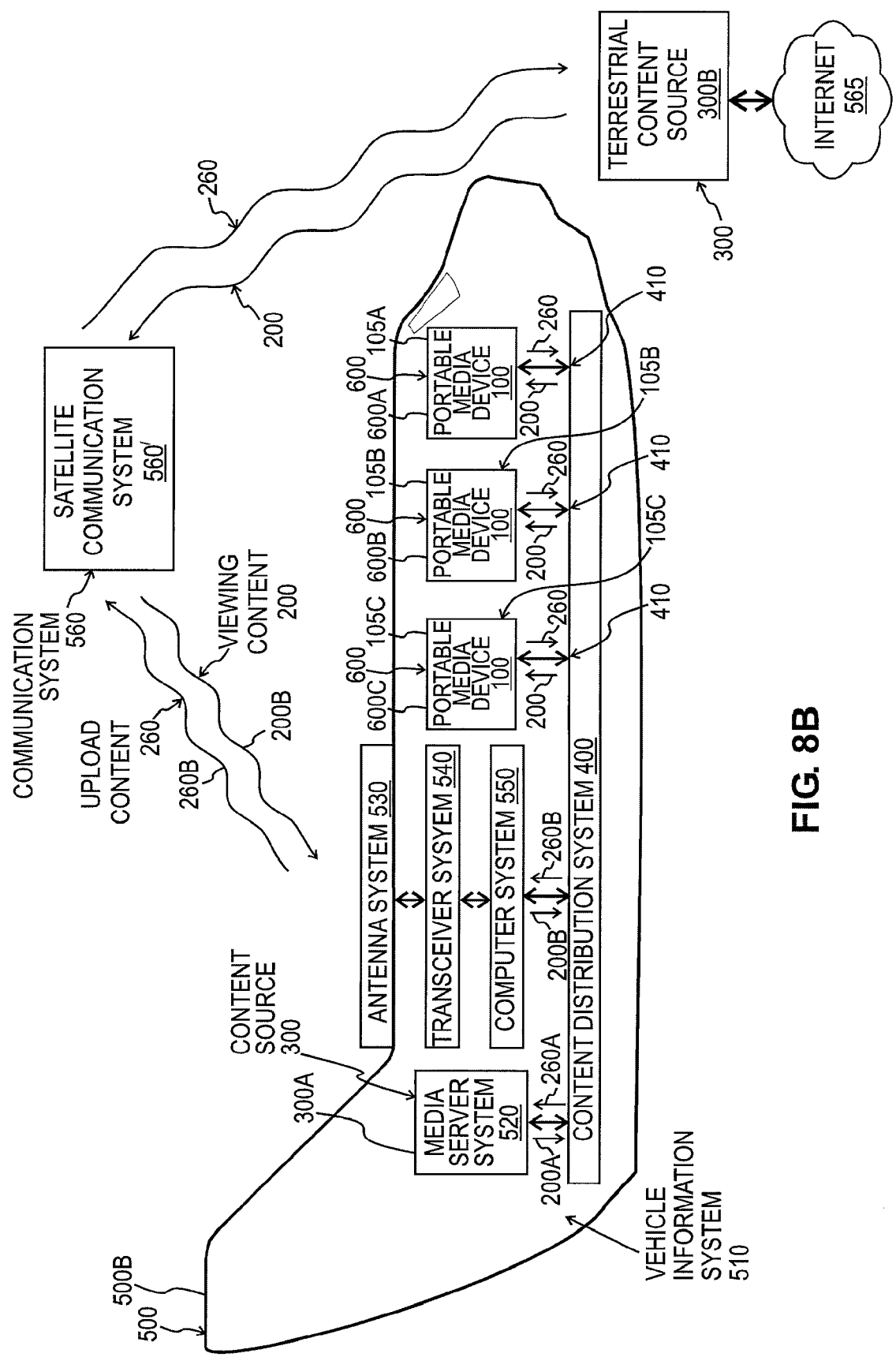
FIG. 8B is a detail drawing illustrating an alternative embodiment of the vehicle information system of FIG. 8A, in which the vehicle information system is associated with an aircraft.

Turning to FIGS. 8A-B, the portable media device 100 and the content source 300 can be associated with a vehicle 500 and can form a vehicle information system 510. In the manner set forth in more detail in the co-pending U.S. patent applications, entitled "SYSTEM AND METHOD FOR MANAGING CONTENT ON MOBILE PLATFORMS," Ser. No. 11/123,327, filed on May 6, 2005, and "SYSTEM AND METHOD FOR PRESENTING HIGH-QUALITY VIDEO TO PASSENGERS ON A MOBILE PLATFORM," Ser. No. 60/673,171, filed on Apr. 19, 2005, the respective disclosures of which are hereby incorporated herein by reference in their entireties, the vehicle information system 510 can comprise a conventional information system and can be configured to be installed in any suitable type of vehicle 500. Exemplary types of vehicles can include an automobile 500A (shown in FIG. 8A), an aircraft 500B (shown in FIG. 8B), a bus, a recreational vehicle, and/or a boat, without limitation. If installed on an aircraft 500B as illustrated in FIG. 8B, for example, the vehicle information system 510 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

The vehicle information system 510 of FIG. 8A is illustrated as being installed in an automobile 500A and as including a conventional media server system 520. In the manner set forth in more detail above with reference to FIG. 7, the media server system 520 is configured to communicate with one or more portable media devices 100 via a distribution system 400. The media server system 520 thereby can provide viewing content 200 to one or more of the portable media devices 100 as previously discussed with reference to the content source 300. Stated somewhat differently, the media server system 520 of the vehicle information system 510 can function as a content source 300. As desired, the media server system 520 likewise can receive upload content 260 from one or more of the portable media devices 100 as discussed above. By using the portable media devices 100, passengers traveling aboard the automobile 500A therefore can enjoy the viewing content 200 during travel.

As shown in FIG. 8A, the portable media devices 100 can be associated with passenger seats 600 in the automobile 500A. For example, a driver seat 600A is provided with a selected portable media device 100 that is associated with a first device group 105A; whereas, the remaining passenger seats 600B are provided with selected portable media devices 100 that are associated with a second device group 105B. In the manner discussed with regard to FIG. 7, the functionality and/or viewing content associated with the portable media device 100 in the first device group 105A can be substantially the same as, and/or differ from, the functionality and/or viewing content associated with the portable media devices 100 in the second device group 105B. Since the driver needs to pay attention to the road, for instance, the portable media device 100 in the first device group 105A likely does not include a video system 120 (shown in FIG. 3A-B); whereas, the portable media devices 100 in the second device group 105B can include video systems 120. Similarly, the input system 170 (shown in FIGS. 3A-B) for the portable media device 100 in the first device group 105A can be configured to mute the audio systems 130 (shown in FIGS. 3A-B) for each of the portable media devices 100 in the automobile 500A. Advantageously, the portable media devices 100 can present the selected viewing content 200 and/or to provide the upload content 260 without any additional equipment being installed at the passenger seats 600.

FIG. 8B illustrates the vehicle information system 510 as being installed in an aircraft 500B. As shown in FIG. 8B, the vehicle information system 510 includes a media server system 520 and a plurality of portable media devices 100 each being provided in the manner set forth in more detail above. Being disposed within the aircraft 500B, the media server system 520 is configured to function as a content source 300, such as content source 300A, and can communicate with one or more of the portable media devices 100 via a distribution system 400 as discussed above. In the manner set forth with reference to the media server 520 (shown in FIG. 8A), the media server system 520 of FIG. 8B can provide viewing content 200A to one or more of the portable media devices 100 as previously discussed with reference to the content source 300 and can receive upload content 260A from one or more of the portable media devices 100. Passengers traveling aboard the aircraft 500B thereby can enjoy the viewing content 200A provided by the media server system 520 during travel.

The vehicle information system 510 likewise can be configured to communicate with one or more content sources 300, such as a terrestrial content source 300B, that are external to, and/or remote from, the aircraft 500B. The vehicle information system 510 and the terrestrial content source 300B can communicate in any conventional wireless manner, including directly and/or indirectly via an intermediate communication system 560, such as a satellite communication system 560'. As desired, the terrestrial content source 300B can be configured to communicate with, and exchange with viewing content 200 and/or upload content 260 with, other terrestrial content sources (not shown). The terrestrial content source 300B is shown in FIG. 8B as providing access to the Internet 565. Although shown and described as comprising the satellite communication system 560' for purposes of illustration, it is understood that the communication system 560 can comprise any conventional type of wireless communication system, such as a cellular communication system (not shown) and/or an Aircraft Ground Information System (AGIS) communication system (not shown).

As shown in FIG. 8B, the vehicle information system 510 can include a conventional antenna system 530 and transceiver system 540 for communicating with the terrestrial content source 300B. In the manner discussed in more detail above with reference to the communication interface 160 (shown in FIGS. 3A-B), the antenna system 530 can receive viewing content 200B from the terrestrial content source 300B and provide the received viewing content 200B, as processed by the transceiver system 540, to a computer system 550 of the vehicle information system 510. Being in communication with the content distribution system 400, the computer system 550 can provide the received viewing content 200B to the media server system 520 and/or to one or more of the portable media devices 100, as desired. Although shown and described as being separate systems for purposes of illustration, the computer system 550 and the media server system 520 can be at least partially integrated.

The vehicle information system 510 is shown in FIG. 8B as being configured to transmit upload content 260B to the terrestrial content source 300B. In the manner set forth in more detail above with reference to the communication interface 160 (shown in FIG. 3B), one or more of the portable media devices 100 and/or the media server system 520 can provide upload content 260B to the computer system 550 and provide the upload content 260B, as processed by the transceiver system 540, to the antenna system 530. The antenna system 530 is illustrated as transmitting the upload content 260B to the satellite communication system 560', which relays the upload content 260B to the terrestrial content source 300B as discussed above. The portable media devices 100 thereby can modify, append, and/or delete content from the terrestrial content source 300B, as desired.

In the manner set forth above with reference to the portable media devices 100 (shown in FIG. 8A), the portable media devices 100 can be associated with passenger seats 600 in the aircraft 500B. Passenger seats 600A are shown as comprising seats reserved for the flight crew; whereas, passenger seats 600B, 600C comprise seats for other passengers, such as travelers. As shown in FIG. 8B, the portable media devices 100 can be separated into three device groups 105A, 105B, and 105C. For example, the passenger seats 600A reserved for the flight crew can be provided with at least one selected portable media device 100 that is associated with a first device group 105A. The remaining passenger seats 600B, 600C are separated into first class passenger seats 600B and coach class passenger seats 600C. The selected portable media devices 100 that are associated with the first class passenger seats 600B are associated with the second device group 105B; whereas, the selected portable media devices 100 that are associated with the coach class passenger seats 600C are associated with the third device group 105C in the manner set forth above.

The functionality and/or the viewing content 200 associated with the portable media devices 100 can be substantially uniform, and/or differ, among the device groups 105A, 105B, and 105C. In the manner set forth above with reference to FIG. 8A, the input system 170 (shown in FIGS. 3A-B) for the portable media devices 100 in the first device group 510A can be configured to mute the audio systems 130 (shown in FIGS. 3A-B) for each of the portable media devices 100 in the aircraft 500B. The functionality and/or the viewing content 200 associated with the portable media devices 100 in the second device group 105B likewise can be substantially uniform with, and/or differ from, the functionality and/or viewing content associated with the portable media devices 100 in the third device group 105C. In the manner discussed above, the portable media devices 100 in the second device group 105B can, for example, access premium content that is not available to the portable media devices 100 in the third device group 105C. The portable media devices 100 in the third device group 105C likewise can require a fee to be paid prior to permitting access to some, or substantially all, of the viewing content 200 available on one or more predetermined content sources 300; whereas, the portable media devices 100 in the second device group 105B may be able to access substantially all of the available viewing content 200 available on the content sources 300 without requiring payment of the fee.

As desired, the portable media devices 100 in one or more selected device groups 105A, 105B, and 105C may be configured to select and present viewing content 200 associated with geography, such as a destination of the vehicle 500 and/or other points of interest, that may, or may not, be related to the travel route of the vehicle 500. For example, passengers can select and view viewing content 200 relating to hotel accommodations and/or a map of the destination city. If the destination is an airport terminal, information, such as arrival and departure times and gate information, for other flights may be provided to assist the passenger with making his connecting flight or with meeting others who are arriving at the airport terminal on different flights.

FIGS. 9A-B provide a view of a passenger cabin 570 of a vehicle 500, such as the automobile 500A (shown in FIG. 8A) and/or the aircraft 500B (shown in FIG. 8B). The passenger cabin 570 is illustrated as including a plurality of passenger seats 600 and at least one access point 410 for access to one or more content sources 300 (shown in FIGS. 8A-B) via the content distribution system 400. Thereby, the portable media devices 100 of FIGS. 9A-B can present selected viewing content 200 from, and/or transmit upload content 260 to, the content sources 300 in the manner discussed in more detail above with reference to FIG. 7. The portable media devices 100 can function to supplement a video presentation system 572, such as an overhead cabin video system 572A and/or seatback viewing systems 572B, and an audio presentation system 574, such as an overhead speaker system 574A, of the vehicle information system 510 as shown in FIG. 9A and/or can be configured to replace the video presentation system 572 and/or an audio presentation system 574 as illustrated in FIG. 9B.

Being provided in the manner discussed in more detail above with reference to FIGS. 3A-B, 4A-D, and 5A-C, the portable media devices 100 are illustrated as including a video system 120, an audio system 130, and an input system 170. Each of the portable media devices 100 likewise includes a communication interface 160 for facilitating communication with at least one of the content sources 300 via a relevant access point 410. The access points 410 of the content distribution system 400 can be distributed throughout the passenger cabin 570 in any suitable manner such that each passenger seat 600 is within a coverage area of at least one access point 410. The entire passenger cabin 570 preferably is within a coverage area of one or more access points 410. Thereby, if the access points 410 comprise wireless access points, the portable media devices 100 can maintain communication with the content sources 300 when the portable media devices 100 are carried about the passenger cabin 570. Stated somewhat differently, the passenger cable 570 can comprise a wireless hot spot, such as wireless fidelity (Wi-Fi) hot spot and/or a Bluetooth hot spot.

Turning to FIG. 9A, for example, each passenger seat 600 is shown as including an individual access point 410. In particular, passenger seat 600W is associated with access point 410W; whereas, passenger seat 600X therefore is associated with access point 410X. The access points 410W, 410X is illustrated as being provided on arm rests 610 of the respective passenger seats 600W, 600X. The access point 410W is a wireless access point that is configured to communicate with a portable media device 100, such as portable media device 100W, that includes a wireless communication interface 160. The portable media device 100X is shown as having a wireless communication interface 160 that is coupled with, and configured to communicate with, the wired access point 410X via a communication cable 580. Although shown and described as being uniformly provided on the arm rests 610 of the passenger seats 600W, 600X for purposes of illustration, the access points 410 can be associated with the passenger seats 600 in any conventional manner, including in a manner that is uniform and/or different among the passenger seats 600.

Access points 410Y, 410Z of FIG. 9B each have coverage areas that include a plurality of passenger seats 600, including passenger seats 600Y, 600Z, respectively. Stated somewhat differently, the passenger cabin 570 and/or the passenger seats 600 can be divided into a plurality of seat zones (not shown) based upon any suitable predetermined criteria. If the seat zones are related to seat class, for example, the passenger seats 600, such as passenger seat 600Y, in a first seat group 605Y can be associated with a first class seat zone (or section) of the vehicle 500; whereas, the passenger seats 600, such as passenger seat 600Z, in a second seat group 605Z can be associated with a coach class seat zone (or section) of the vehicle 500. Therefore, the vehicle information system 510 can provide access to the content sources 300 (shown in FIG. 7) via the access point 410Y to the portable media devices 100, such as portable media device 100Y, that are used in the passenger seats 600, such as passenger seat 600Y, in the first seat group 605Y. Similarly, the portable media devices 100, such as portable media device 100Z, that are used in the passenger seats 600, such as passenger seat 600Z, in the second seat group 605Z receive access via the access point 410Z. The portable media devices 100 thereby can receive viewing content 200 in accordance with the associated seat group 605 in the manner discussed in more detail above with reference to the device groups 105 (shown in FIG. 7).

The passenger seats 600 likewise can provide in-seat power for the portable media devices 100. As shown in FIG. 9B, each passenger seat 500 can include a power port 595 for providing power, having a predetermined voltage level and/or a predetermined current level, that is suitable for the portable media device 100. Preferably being primarily powered by a battery system 190 (shown in FIG. 4B), the portable media devices 100 can receive in-seat power via a power cable 590 that couples the power port 595 with a power port 192 of the portable media device 100. Although shown and described as being provided on the arm rest 610 of the passenger seat 600Z for purposes of illustration, the power port 595 can be associated with the passenger seats 600 in any conventional manner, including in a manner that is uniform and/or different among the passenger seats 600.

The battery system 190 can be periodically replaced and/or recharged as necessary. For example, one or more selected cabin compartments (not shown) in the passenger cabin 570 can be designated for use with the portable media device 100. The cabin compartment can include a battery charging system (not shown) for recharging the battery system 190 of the portable media device 100 during periods of non-use. The battery charging system can be provided in any conventional manner, including the manner set forth above with reference to the battery charging system 834 (shown in FIGS. 13A, 14, and 15A-B). The passenger entertainment system 500 likewise can include two sets of portable media devices 100. The battery systems 190 of one set of portable media devices 100 can be recharged while the other set of portable media devices 100 is in use. In the manner discussed in more detail above with reference to FIGS. 4C-D, the portable media device 100 likewise can include a protective cover 199 (shown in FIG. 4D) that can flip back and serve as a viewing support 195 (shown in FIGS. 4C-D). The portable media device 100 thereby can function as a setback tray.

When no longer in use, the portable media device 100 can be stored at the passenger seat 600 and/or at an adjacent passenger seat 600. For example, the portable media device 100 can be placed in a storage pocket 620, such as storage pocket 620Z, formed in the passenger seat 600 as shown in FIG. 9B. The storage pocket 620 likewise can be provided on a seatback 630 and/or a headrest 640 of the adjacent passenger seat 600. The storage pocket 620Y is illustrated as being formed on the seatback 630 of the passenger seat 600Y.

As desired, the portable media device 100 likewise can be disposed on a mounting surface, such as the seatback 630 and/or the headrest 640, of the adjacent passenger seat 600 during use. When disposed on the mounting surface, the portable media device 100 preferably is supported by a mounting system 700, 750 (shown in FIGS. 10A-J and 11A-F). The mounting system 700, 750 can be provided in any conventional manner and preferably includes a main body member, a seat interface system for coupling the main body member with the mounting surface; and a device interface system for removably coupling the main body member with housing 102 of the portable media device 100. The mounting system 700, 750 preferably is configured to adjust a predetermined viewing angle formed between the portable media device 100 and the mounting surface of the passenger seat 600. The portable media device 100 thereby can be advantageously configured for hands-free operation.

Figure 10B:
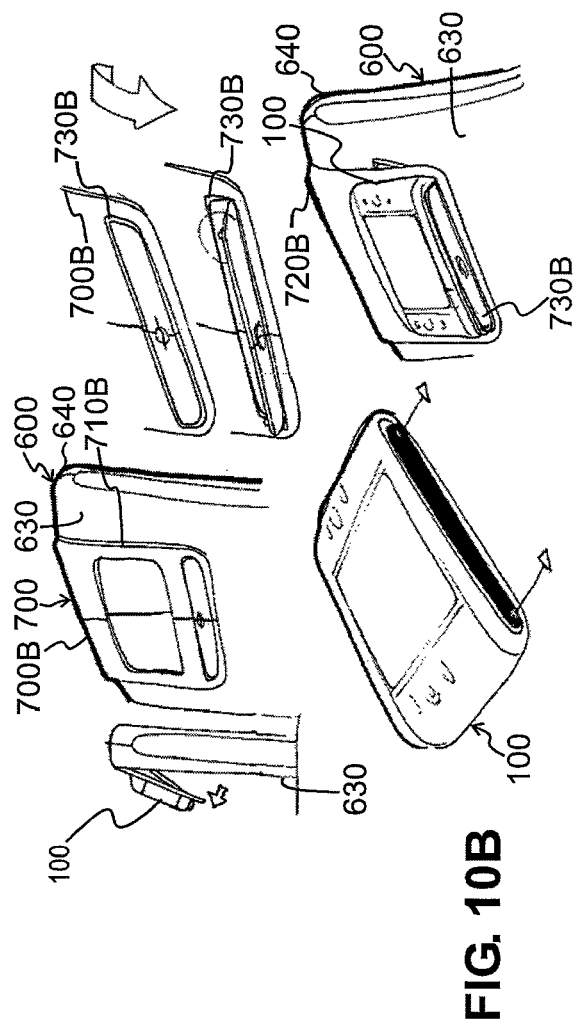
Figure 10A:
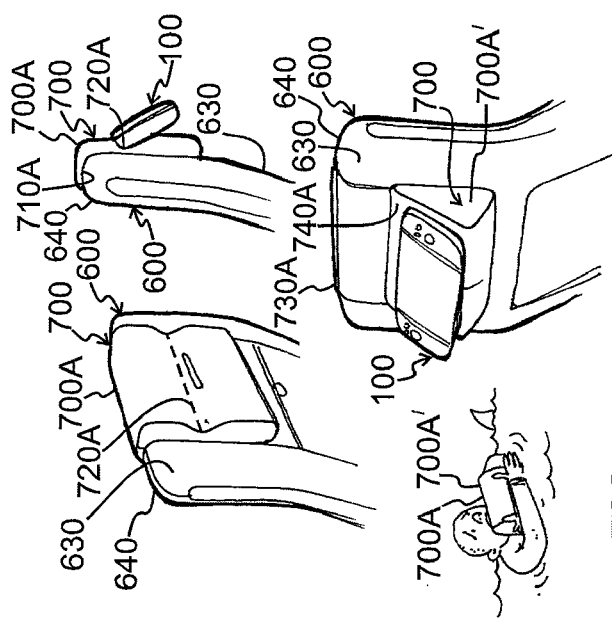

FIG. 10A, for example, shows an exemplary mounting system 700 for mounting a portable media device 100 on a headrest 640 (and/or a seatback 630) of a passenger seat 600. The mounting system 700 of FIG. 10A comprises a foam pad 700A with a first preformed channel 710A for receiving and engaging the headrest 640 and a second preformed channel 720A for receiving and engaging the portable media device 100. The mounting system 700 likewise can be provided as a foam wedge 700A' that can include a clip assembly 730A for engaging the headrest 640 and an inclined surface 720 for engaging the portable media device 100. Advantageously, the foam pad 700A and the foam wedge 700A' can be sufficiently buoyant for use as a floatation device in case of a water landing.

Turning to FIG. 10B, the mounting system 700 can be provided as a metal platform 700B. The metal platform 700B includes a main body member 710B for supporting the portable media device 100. The main body member 710B is coupled with a clip assembly 720B for engaging the headrest 640 of the passenger seat 600 and a support member 730B upon which the portable media device 100 can rest. The main body member 710B can support the portable media device 100 at an adjustable predetermined viewing angle relative to the seatback 630 of the passenger seat 600. The clip assembly 720B and the support member 730B are shown as being rotatably coupled with the main body member 710B such that the main body member 710B can be retracted when not in use.

The mounting system 700C of FIG. 10C has a main body member 710C that is coupled with a clip assembly 720C for engaging the headrest 640 and a rotating support member (or panel) 730C for receiving and engaging the portable media device 100. The rotating support member (or panel) 730C can rotate relative to the main body member 710C such that the portable media device 100 can be supported at an adjustable predetermined viewing angle relative to the seatback 630. FIG. 10D illustrates a mounting system 700D with a main body member 710D that is coupled with a clip assembly 720D for engaging the headrest 640. The main body member 710D forms a groove 730D for receiving and adjustably engaging the portable media device 100. The mounting system 700D thereby can support the portable media device 100 at an adjustable predetermined viewing angle relative to the seatback 630 as discussed above.

Figure 10G:
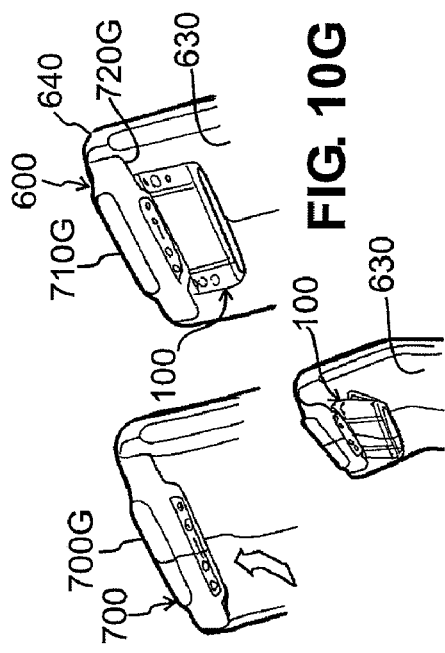
Figure 10F:
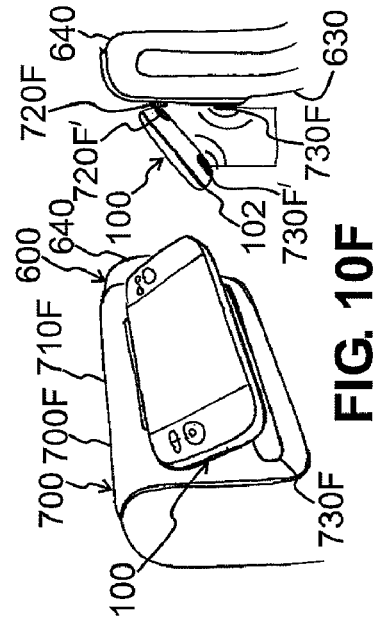
Figure 10E:
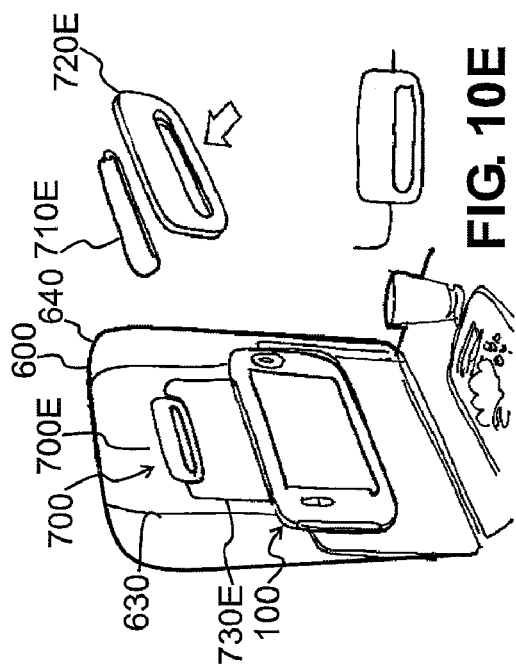

Turning to FIG. 10E, a mounting system 700E is shown that includes a first mounting member 710E for coupling with the seatback 630 and/or the headrest 640 of the passenger seat 600. A second mounting member 720E is configured to cooperate with, and engage, the first mounting member 710E and can couple with the portable media device 100. As shown in FIG. 10E, the second mounting member 720E can couple with the portable media device 100 via an intermediate member 730E, such as a soft hook device. The mounting system 700F of FIG. 10F has a main body member 710F that is pliable and can engage the seatback 630 and/or the headrest 640 of the passenger seat 600. The main body member 710F can include a plurality of magnetic structures 720F, 730F, and a plurality of corresponding magnetic structures 720F', 730F' can be disposed on the housing 102 of the portable media device 100. The magnetic structures 720F, 720F' are illustrated as being attracting magnetic structures with opposite polarities for supporting the portable media device 100; whereas, the magnetic structures 730F, 730F' are shown as being repelling magnetic structures with same polarities for providing the predetermined viewing angle formed between the portable media device 100 and the seatback 630.

FIG. 10G shows a mounting system 700G with a main body member 710G that can engage the headrest 640 of the passenger seat 600. The mounting system 700G likewise can form a gap 720G between the main body member 710G and the seatback 630 for receiving and adjustably engaging the portable media device 100 as illustrated in FIG. 10G. The mounting system 700G thereby can support the portable media device 100 at any adjustable predetermined viewing angle relative to the seatback 630 as discussed above. Turning to FIG. 10H, a mounting system 700H is shown that comprises a main body member 710G for engaging the headrest 640. The main body member 710G can form a channel 720H for receiving the portable media device 100. When the portable media device 100 is installed in the channel 720H, the user interface 110 of the portable media device 100 is accessible via an appropriately-sized opening formed in the main body member 710G. In the manner set forth above, the main body member 710G can be rotatable relative to the seatback 630 to provide any predetermined viewing angle.

Figure 10J:
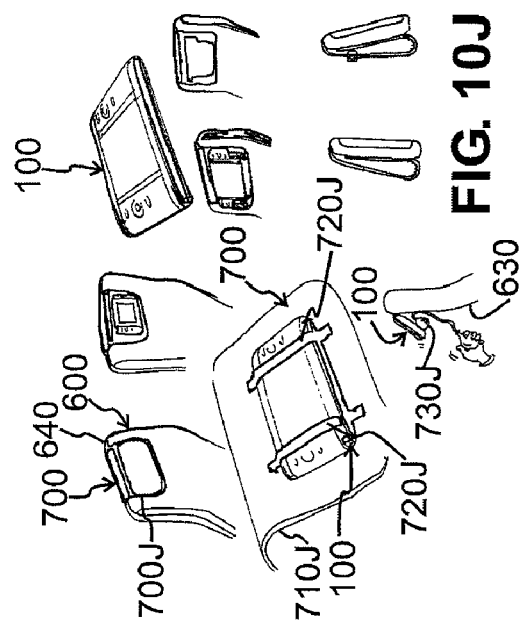
Figure 10I:
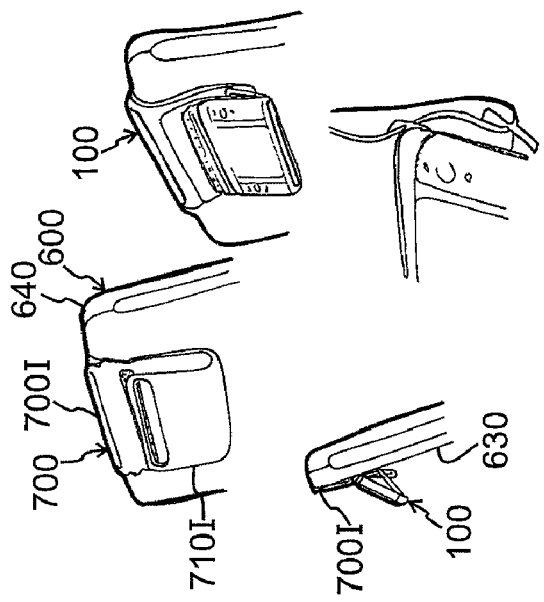
Figure 10H:
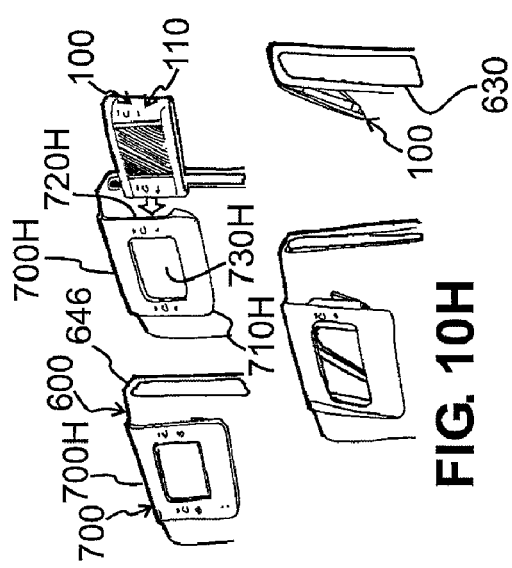

Turning to FIGS. 10I-J, the mounting systems 700I, 700J are shown as including respective main body members 710I, 710J. The main body members 710I, 710J are pliable and can engage the seatback 630 and/or the headrest 640 of the passenger seat 600. The main body member 710I is configured to support the portable media device 100 by wrapping itself around at least a portion of the portable media device 100; whereas, the main body member 710J is shown as being coupled with at least one support strap 720J for receiving and supporting the portable media device 100. As discussed above, the mounting systems 700I, 700J each can form a predetermined viewing angle formed between the portable media device 100 and the seatback 630 in any suitable manner. For example, the mounting system 700J is illustrated as including an inflatable member 730J, such as a balloon, for adjusting the predetermined viewing angle.

Similarly, exemplary mounting systems 750 for mounting a portable media device 100 on a seatback 630 (and/or a headrest 640) of a passenger seat 600 are illustrated in FIGS. 11A-F. The mounting system 750 of FIG. 11A comprises a main body member 760A for receiving and engaging the seatback 630 and/or the headrest 640 of the passenger seat 600. A support member 770A is formed by the main body member 760A and can engage and support the portable media device 100. Being formed from a pliable material, the support member 770A can bend relative to the main body member 760A to form an adjustable predetermined viewing angle formed between the portable media device 100 and the seatback 630.

Turning to FIG. 11B, a mounting system 750B is shown that includes a main body member 760B that is adjustably coupled with a plurality of opposing support members 770B. The main body member 760B can couple with the seatback 630 and/or the headrest 640 of the passenger seat 600. The support members 770B are configured to cooperatively engage the portable media device 100. As shown in FIG. 11B, the portable media device 100 can be disposed between pairs of the support members 770B, which can adjustably couple with the portable media device 100 to provide the predetermined viewing angle formed between the portable media device 100 and the seatback 630. The mounting system 750C of FIG. 11C has a main body member 760C for engaging the seatback 630 and/or the headrest 640 of the passenger seat 600. The main body member 760C is coupled with a support member 770C that can be received within, and engaged by, a cooperating opening 780C formed in the housing 102 of the portable media device 100. The portable media device 100 thereby can be supported by the mounting system 750C. By adjustably coupling the main body member 760C and the support member 770C, the predetermined viewing angle formed between the portable media device 100 and the seatback 630 can be adjustable.

Figure 11E:
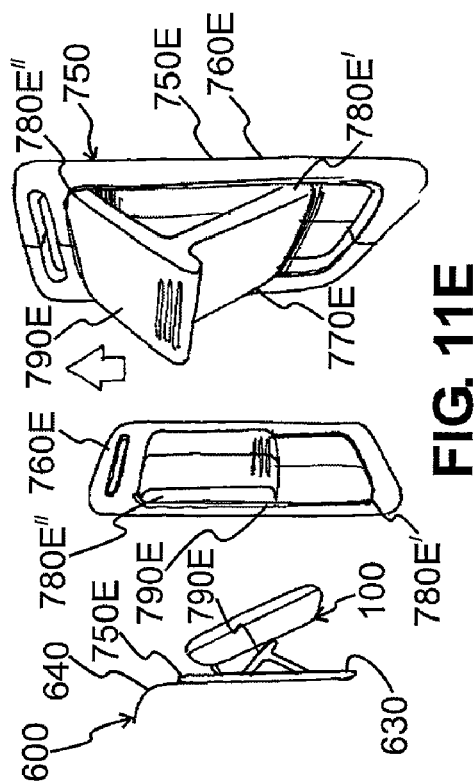
Figure 11F:
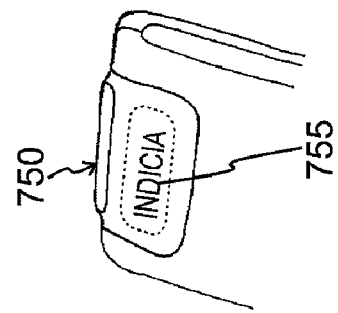
Figure 11D:
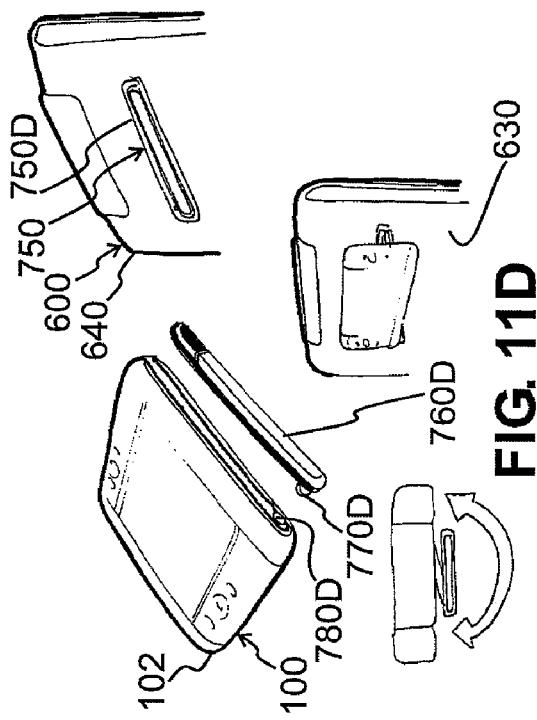

FIG. 11D shows a mounting system 750D with an elongate body member 760D that can engage the seatback 630 and/or the headrest 640 of the passenger seat 600. An end region of the elongate body member 760D includes a connector assembly 770D for coupling with a cooperating connector assembly 780 provided on the housing 102 of the portable media device 100. The mounting system 750D thereby can adjustably support the portable media device 100 in the manner set forth above. Turning to FIG. 11E, a mounting system 750E is shown that comprises a main body member 760E for engaging the seatback 630 and/or the headrest 640. The main body member 760E is coupled with a flexible body member 770E having opposite end regions 780E', 780E" and a central region 790E for coupling with the portable media device 100. As shown in FIG. 11E, one end region 780E' of the flexible body member 770E is adjustably coupled with the main body member 760E; whereas, the other end region 780E" is fixedly coupled with the main body member 760E. By adjusting a distance between the end regions 780E', 780E" of the flexible body member 770E, the predetermined viewing angle formed between the portable media device 100 and the seatback 630 can be adjusted.

Although exemplary embodiments have been shown and described with reference to FIGS. 10A-J and 11A-E for purposes of illustration, the portable media device 100 can be disposed on the seatback 630 and/or the headrest 640 of the adjacent passenger seat 600 in any conventional manner. As desired, the mounting system 700, 750 can include indicia, such as textual indicia 755, for providing advertising information. As shown in FIG. 11F, the textual indicia 755 can promote and/or encourage use of the portable media device 100. The indicia 755 can be provided on the mounting system 700, 750 in any suitable manner.

Figure 12:
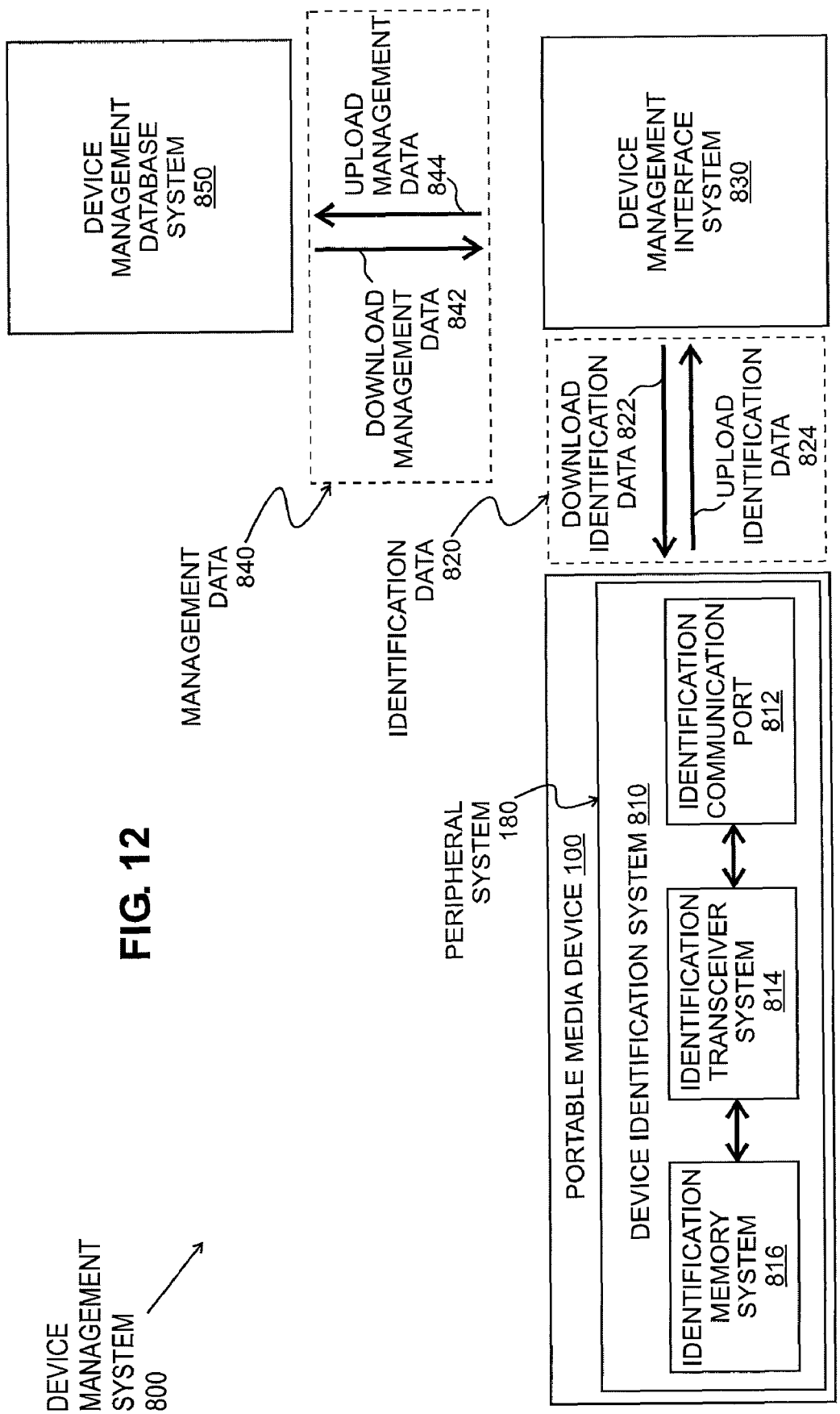
FIG. 12 is an exemplary block diagram illustrating an embodiment of a device management system for the portable media device of FIG. 1, in which the portable media device includes a device identification system for providing device identification data.

A device management system 800 for managing, and/or providing logistics support for, one or more of the portable media devices 100 is illustrated in FIG. 12. The device management system 800 can manage the portable media devices 100 in any conventional manner and can be provided in any conventional manner, such as via one or more hardware components and/or software components. As discussed above with reference to FIG. 3B, the portable media device 100 can include one or more peripheral systems 180 (shown in FIG. 3B). Advantageously, the portable media device 100 can be provided with a device identification system 810 for exchanging device identification data 820 with a device management interface 830, which, in turn, can exchange management data 840 with a device management database system 850, as shown in FIG. 12.

Various device parameters, such as location, status, contents, performance data, and/or usage statistics, of the portable media device 100 thereby can be monitored via the device management system 800. By monitoring the device parameters, the device management database system 850 can maintain a historical record for the portable media device 100 and can provide management data 840, such as one or more device configuration instructions, for configuring the portable media device 100 for future use. Stated somewhat differently, the device management system 800 can be configured to initialize the portable media device 100 for use in the manner discussed in more detail above.

The device identification system 810 can be provided in any conventional manner and is illustrated in FIG. 12 as including an identification communication port 812 for communicating with the device management interface 830, a compatible identification transceiver system 814 for receiving and/or transmitting the identification data 820, and an identification memory system 816 for storing the identification data 820. In the manner discussed in more detail above regarding the communication port 162 (shown in FIGS. 3A-B), the identification communication port 812 can comprise a wired communication port for supporting wired communications and/or a wireless communication port for supporting wireless communications over one or more communication frequencies. The identification transceiver system 814 can be provided in the manner set forth above with reference to the transceiver system 164 (shown in FIGS. 3A-B); whereas, the identification memory system 816 can be provided in the manner discussed above with regard to the memory system 144 (shown in FIG. 3B). The device identification system 810, in whole and/or in part, can be provided as a peripheral system 180 and/or can be at least partially incorporated into the portable media device 100. For example, the identification memory system 816 can be separate from, or at least partially incorporated with, the memory system 144.

In a preferred embodiment, the device management system 800 can be provided as a conventional radio frequency identification (RFID) system, wherein the device identification system 810 can comprise a RFID tag system, and the device management interface 830 can be provided as a RFID reader/computer system. If the device identification system 810 is provided as a passive RFID tag system, for example, the identification transceiver system 814 can comprise a radio frequency ID transponder, which conforms to the principles of RFID technology, and the identification communication port 812 can be provided as a tag antenna system. The identification communication port 812 can be coupled with the identification transceiver system 814 and typically comprises a microchip antenna system using well-known coil-on-chip technology in the conventional manner as set forth in more detail in U.S. Pat. No. 6,892,052, issued to Kotola et al., the disclosure of which is hereby incorporated herein by reference in its entirety.

The identification memory system 816 can include an erasable programmable read-only memory (EPROM) system that can be configured to store device identification data 820 associated with the portable media device 100. Illustrative device identification data 820 can include a serial number of the portable media device 100, a serial number of the battery system 190 (shown in FIG. 4B), an identity of the owner of the portable media device 100, and/or information regarding the media content 200 (shown in FIG. 7) stored by the portable media device 100. The device identification system 810 thereby can receive a download identification data 822, such as an interrogation signal, from the device management interface 830 and can separate the radio-frequency (RF) energy from the received download identification data 822. The energy captured by the identification communication port 812 can be processed by the identification transceiver system 814, which can respond by transmitting an upload identification data 824 to the device management interface 830 to initiate one or more device management system operations.

The device identification data 820 can comprise a wide range of information about the portable media device 100 and/or one or more individual components of the portable media device 100, such as the battery system 190. In addition to identifying the portable media device 100, the device identification data 820 can include status (and/or performance) information for the portable media device 100 and/or historical maintenance information, such as a date and/or a location where the portable media device 100 was last serviced. Similarly, status (and/or performance) information, such as a current battery charge level and/or a number of charging cycles, can be provided for the battery system 190. The device identification data 820 likewise can include information about the viewing content 200 stored by the portable media device 100. The device identification data 820 can include, for example, a date and/or a location where the current viewing content 200 was loaded onto the portable media device 100 and/or a date period and/or a catalogue (or content listing) of the current viewing content 200. One or more active content sets for the viewing content 200 can be identified and/or selected by the device identification data 820. As desired, the device identification data 820 likewise can include usage information, such as cycle usage and/or a date for any user data offloads, of the portable media device 100 and/or transactional information, such as any user billing information.

Being configured to facilitate communication between the portable media device 100 and the device management database system 850, the device management interface 830 can include a portable (or handheld) system and/or a substantially fixed system. When the portable media device 100 is in communication with the device management interface 830, the device management interface 830 can receive the upload identification data 824 transmitted by the portable media device 100. The upload identification data 824 can include current device configuration information, such as identification data 820 currently stored in the identification memory system 816 and/or upload content 260, such as status (or performance) information regarding the portable media device 100 and/or the viewing content 200 (or the stored content 240) (shown in FIG. 3B) currently stored in the memory system 144 (shown in FIG. 3B). The information about the viewing content 200 (or the stored content 240) currently stored in the memory system 144 can be provided as a current content catalogue (not shown) for the portable media device 100.

The device management interface 830 can provide the upload identification data 824 to the device management database system 850 as the upload management data 844 as illustrated in FIG. 12. In the manner set forth in more detail above, the device management interface 830 and the device management database system 850 can communicate in any conventional manner, including via wired and/or wireless communications. The device management database system 850 can maintain a historical record for each portable media device 100. The historical records of the device management database system 850 can include information derived from the identification data 820 from the device identification system 810 and/or the content catalogue from the memory system 144 of each portable media device 100 in the device management database system 850. Upon receiving the upload management data 844, the device management database system 850 can process the upload management data 844 to update (and/or append) the historical records for the portable media device 100 in accordance with the information provided with the upload management data 844.

For example, the device management database system 850 can process the upload management data 844 to determine whether the portable media device 100 is a new portable media device 100. For new portable media devices 100, the device management database system 850 can create new records; whereas, existing historical records associated with any portable media devices 100 that have been removed from the device management system 800 due, for example, to loss, theft, and/or obsolescence, can be maintained, archived, and/or deleted, as desired. The device management database system 850 likewise can update (and/or append) the historical records to include the current device configuration information, such as identification data 820 from the identification memory system 816 and/or the upload content 260, such as status (or performance) information regarding the portable media device 100 and/or the viewing content 200 (or the stored content 240) currently stored in the memory system 144. The device management database system 850 thereby can update (and/or append) the historical records to include the current device status and configuration of the portable media device 100.

The device management database system 850 likewise can provide download management data 842 that can include instructions for configuring the portable media device 100 for future use. Illustrative download management data 842 can include one or more device configuration instructions, such as at least one instruction for updating the identification data 820 stored in the identification memory system 816 and/or at least one instruction for updating the viewing content 200 (or the stored content 240) stored in the memory system 144. The device management database system 850 can transmit the download management data 842 to the device management interface 830. Upon receiving the download management data 842, the device management interface 830 can execute the device configuration instructions included with the received download management data 842. The portable media device thereby can be configured for future use in accordance with the device configuration instructions.

If the download management data 842 includes one or more instructions for updating the identification data 820 stored in the identification memory system 816, the device management interface 830 can provide the instructions for updating the identification memory system 816 to the portable media device 100 as the download identification data 822. The device identification system 810 can receive the download identification data 822 and update the identification memory system 816 in accordance with the download identification data 822. The download management data 842 likewise can include one or more instructions for updating the content catalogue stored in the memory system 144. Upon receiving the download management data 842, the device management interface 830 can process the download management data 842 and can transmit viewing content 200 to the portable media device 100 in accordance with the instructions for updating the content catalogue. The transmitted viewing content 200 can be stored via the memory system 144 in the manner discussed above. The portable media device 100 thereby can be configured for future use.

Figure 13A:
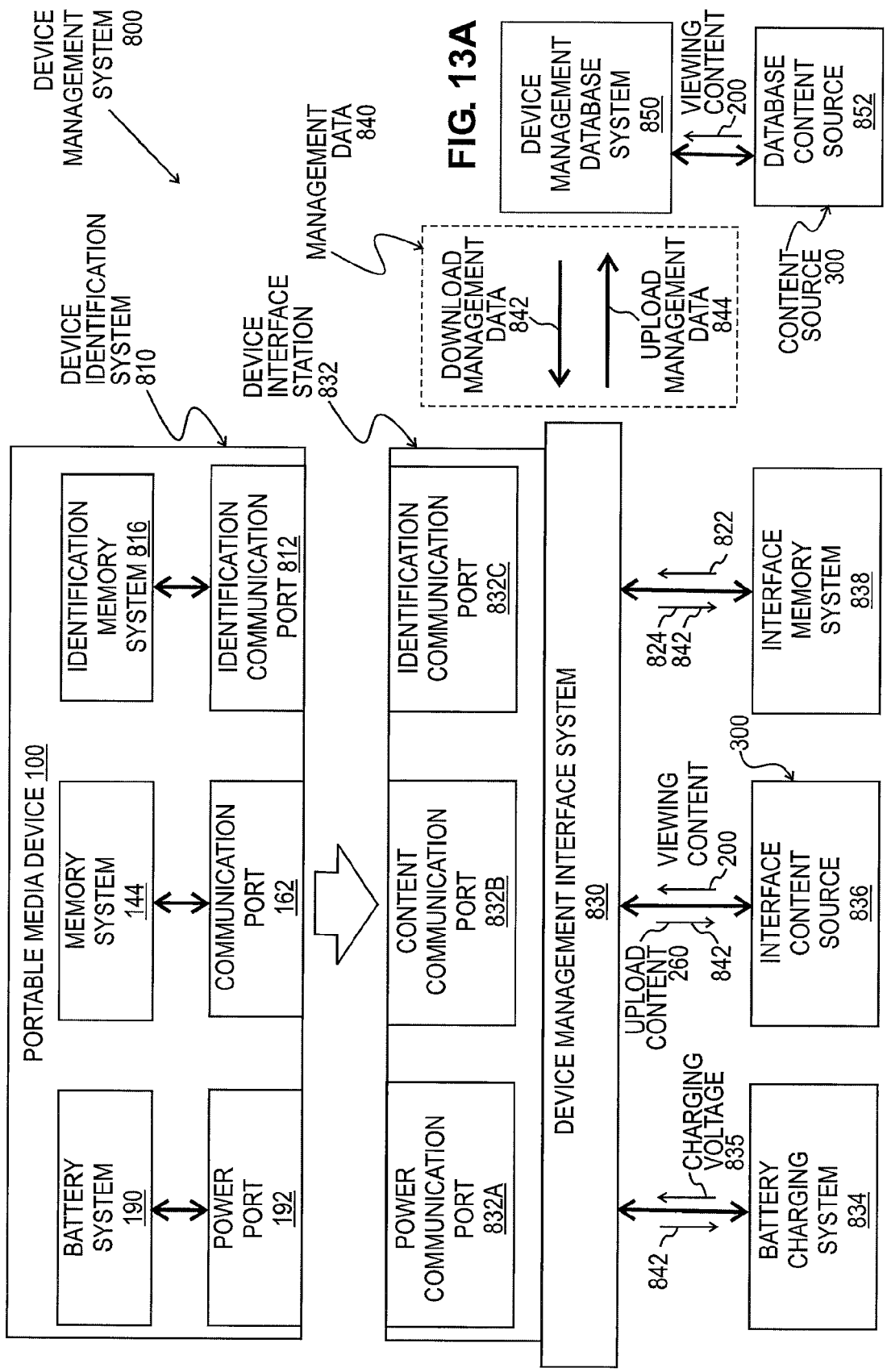
FIG. 13A is an exemplary block diagram illustrating an alternative embodiment of the device management system of FIG. 12, in which the device management system can maintain a historical record for the portable media device and can provide configuration instruction for configuring the portable media device for future use.

Turning to FIG. 13A, the device management system 800 is illustrated as including a device management interface 830 with a device interface docking station 832 for receiving a selected portable media device 100. Communications between the portable media device 100 and the device interface docking station 832 preferably are initiated automatically when the portable media device 100 is coupled with the device interface docking station 832. The device interface docking station 832 can include a power communication port 832A, a content communication port 832B, and/or an identification communication port 832C. Being provided in the manner discussed above with reference to the power port 595 (shown in FIG. 9B), the power communication port 832A is configured to cooperate with the power port 192 of the portable media device 100 and is in communication with a battery charging system 834. The battery charging system 834 can provide power 834, having predetermined voltage and/or current characteristics that are suitable for charging the battery system 190 of the portable media device 100.

The content communication port 832B of the device interface docking station 832 is configured to communicate with the communication port 162 of the portable media device 100 and can be provided in the manner set forth in more detail above with reference to the communication port 162 (shown in FIGS. 3A-B). Thereby, the device interface docking station 832 can receive upload content 260 from the memory system 144 and/or provide viewing content 200 to the memory system 144. The identification communication port 832C is configured to receive upload identification data 824 from, and/or provide download identification data 822 to, the device identification system 810 of the portable media device 100. Being provided in the manner discussed above with reference to the identification communication port 812 (shown in FIG. 12), the identification communication port 832C can communicate with the identification communication port 812 and, therefore, with the identification memory system 816 of the portable media device 100.

The device management interface 830 likewise can include an interface content source 836 and/or an interface memory system 838 as illustrated in FIG. 13A. The interface content source 836 can be provided in the manner set forth in more detail above with reference to the content source 300 (shown in FIGS. 2A-B); whereas, the interface memory system 838 can be provided in the manner discussed above with reference to the memory system 144 (shown in FIG. 3B). As desired, the interface memory system 838 can provide at least temporary storage for the download management data 842 and/or the download identification data 822, for example, while the device management interface 830 is processing the download management data 842. The interface memory system 838 likewise can provide at least temporary storage for the upload identification data 824 received from the device identification system 810 of the portable media device 100 pending transmission of the upload management data 844 to the device management database system 850. Stated somewhat differently, the interface memory system 838 can function a buffer system for the download identification data 822, the upload identification data 824, the download management data 842, and/or the upload management data 844.

Similarly, the interface content source 836 can provide a buffer system for viewing content 200 and/or upload content 260 to be exchanged between the portable media device 100 and the device management system 800. In the manner discussed above with reference to FIG. 12, the upload identification data 824 can include information about the content catalogue currently stored in the memory system 144 of the portable media device 100. The information about the stored content 240, including upload content 260, can be at least temporarily stored by the interface content source 836. The download management data 842 likewise can include one or more instructions for updating the content catalogue stored in the memory system 144. If the current content catalogue is to be updated with new viewing content 200, the interface content source 836 can provide at least temporary storage for the viewing content 200 prior to transmission of the viewing content to the memory system 144 in the manner set forth in more detail above.

If the download management data 842 includes instructions for updating the content catalogue of the memory system 144, the instructions can comprise instructions for providing the selected viewing content from the interface content source 836. Alternatively, and/or in addition, the instructions for updating the content catalogue can include the selected viewing content 200. As shown in FIG. 13A, for example, the device management database system 850 can be associated with a database content source 852 for providing the selected viewing content 200 for updating the content catalogue of the memory system 144. The database content source 852 can be provided in the manner set forth in more detail above with reference to the content source 300 (shown in FIGS. 2A-B). Preferably, if viewing content 200 is to be downloaded to a plurality of portable media devices 100, the database content source 852 can transfer a copy of the selected viewing content 200 to the interface content source 836 for downloading to each of the portable media devices 100. In other words, the database content source 852 can comprise a global content source 300; whereas, the interface content source 836 can comprise a local content source 300. Data transfer time thereby can be reduced. In the manner discussed above with reference to FIG. 3B, the upload content 260 provided by the portable media device 100 can be stored, in whole and/or in part, in the database content source 852 and/or in the interface content source 836.

Figure 13B:
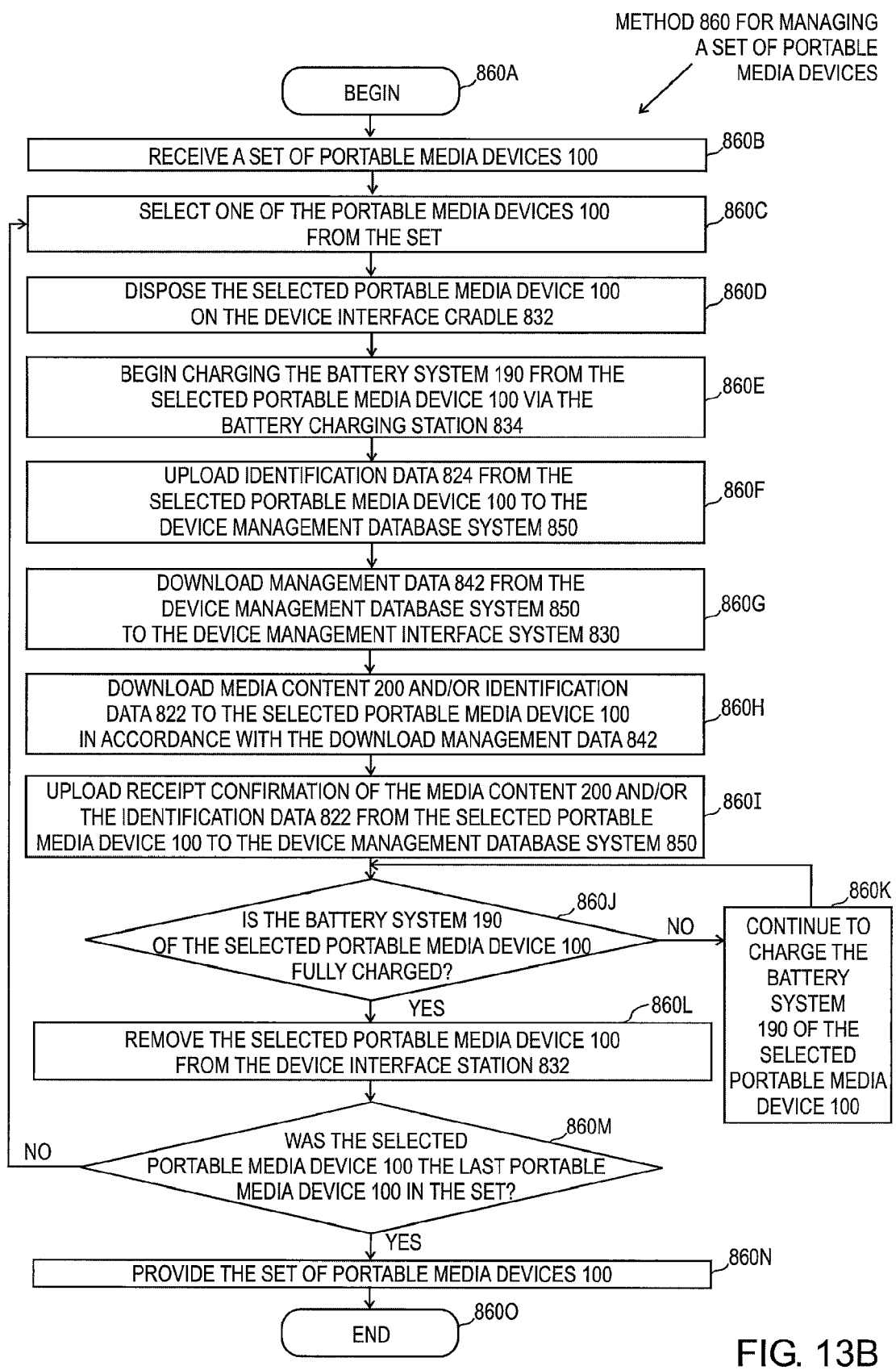
FIG. 13B is an exemplary flow chart illustrating an embodiment of a method by which the device management system of FIG. 13A can maintain the historical record for the portable media device and can provide configuration instruction for configuring the portable media device for future use.

The operation of the device management system 800 is discussed with reference to the exemplary method 860 for managing a set of portable media devices 100 as shown in FIG. 13B. Although shown and described as comprising as a selected sequence of operations 860A-O for purposes of illustration, the device management system 800 can manage the set of portable media devices 100 in any suitable manner. The exemplary method 860 begins at 860A. At 860B, the device management system 800 is shown as receiving the set of portable media devices 100. One of the portable media devices 100 is selected at 860C, and, at 860D, the selected portable media device 100 is disposed on the device interface docking station 832 in the manner discussed above.

When the selected portable media device 100 is disposed on the device interface docking station 832, the power port 192 of the selected portable media device 100 can couple with the cooperating power communication port 832A of the device interface docking station 832. The battery charging system 834 thereby can begin to charge the battery system 190 of the selected portable media device 100, at 860E. Although the battery system 190 can be charged in any conventional manner, the battery charging system 834 preferably quick-charges the battery system 190. The downtime of the selected portable media device 100 thereby can be reduced.

The communication port 162 and the identification communication port 812 of the selected portable media device 100 and the content communication port 832B and the identification communication port 832C of the device interface docking station 832 likewise can respectively communicate. Thereby, the selected portable media device 100 can provide one or more predetermined device parameters, including selected identification parameters, such as a device serial number, and/or selected device status (or performance) parameters, such as offload usage statistics, a current content catalogue, an active content catalogue, and/or a current charge level on the battery system 190, to the device management interface 830 in the manner set forth in more detail above with reference to FIG. 12. As set forth above, the device management interface 830 can provide the predetermined device parameters from the selected portable media device 100 to the device management database system 850 as the download management data 842, at 860F.

Upon receiving the download management data 842, the device management database system 850 can update the historical records for the selected portable media device 100 to include the information included in the download management data 842 as discussed above with regard to FIG. 12. The device management database system 850 likewise can provide download management data 842 that can include instructions for configuring the portable media device 100 for future use. At 860G, the device management database system 850 can provide the download management data 842 to the device management interface 830. The device management interface 830, in turn, can configure the selected portable media device 100 in accordance with the instructions associated with the download management data 842. In the manner discussed above, the download management data 842 likewise can include selected media content 200 for updating the content catalogue of the selected portable media device 100, which selected media content 200 can be at least temporarily stored via the interface content source 836.

The device management interface 830 therefore, at 860H, can provide the selected media content 200 to the selected portable media device 100 in accordance with the instructions associated with the download management data 842. In the manner discussed above, the device management interface 830 likewise can update the device identification system 810 by providing the download identification data 822. Upon receiving the selected media content 200 and/or the download identification data 822, the selected portable media device 100 can provide a confirmation of receipt to the device management database system 850, at 860I, in the manner set forth above. The confirmation of receipt can comprise a quality check to validate that the selected portable media device 100 has been loaded with the correct viewing content 200. As discussed above with reference to the predetermined device parameters, the confirmation of receipt likewise can include one or more predetermined device parameters, including selected identification parameters, such as a device serial number, and/or selected device status (or performance) parameters, such as a current content catalogue, an active content catalogue, a current charge level on the battery system 190, and/or a "device ready" status parameter. The device management database system 850 preferably updates the historical record for the portable media device to include at least a portion of the information included with the confirmation of receipt.

Since the confirmation of receipt preferably includes the current charge level on the battery system 190, the device management database system 850, at 860J, can determine whether the battery system 190 of the selected portable media device 100 has received a full charge. If the battery system 190 is not fully charged, the device management database system 850 can permit the battery system 190 to continue to charge, at 860K. The device management database system 850 thereafter can periodically request an updated current charge level on the battery system 190, at 860J, to determine whether the battery system 190 has received a full charge. Once the current charge level on the battery system 190 indicates that the battery system 190 is fully charged, the selected portable media device 100 is ready for future use and, at 860L, can be removed from the device interface docking station 832. At 860M, each portable media device 100 in the set can be processed and prepared for future use in the manner set forth above. Once processing is complete, the set of portable media devices 100 can be provided for use, at 860N, and the process ends at 860O.

Figure 14:
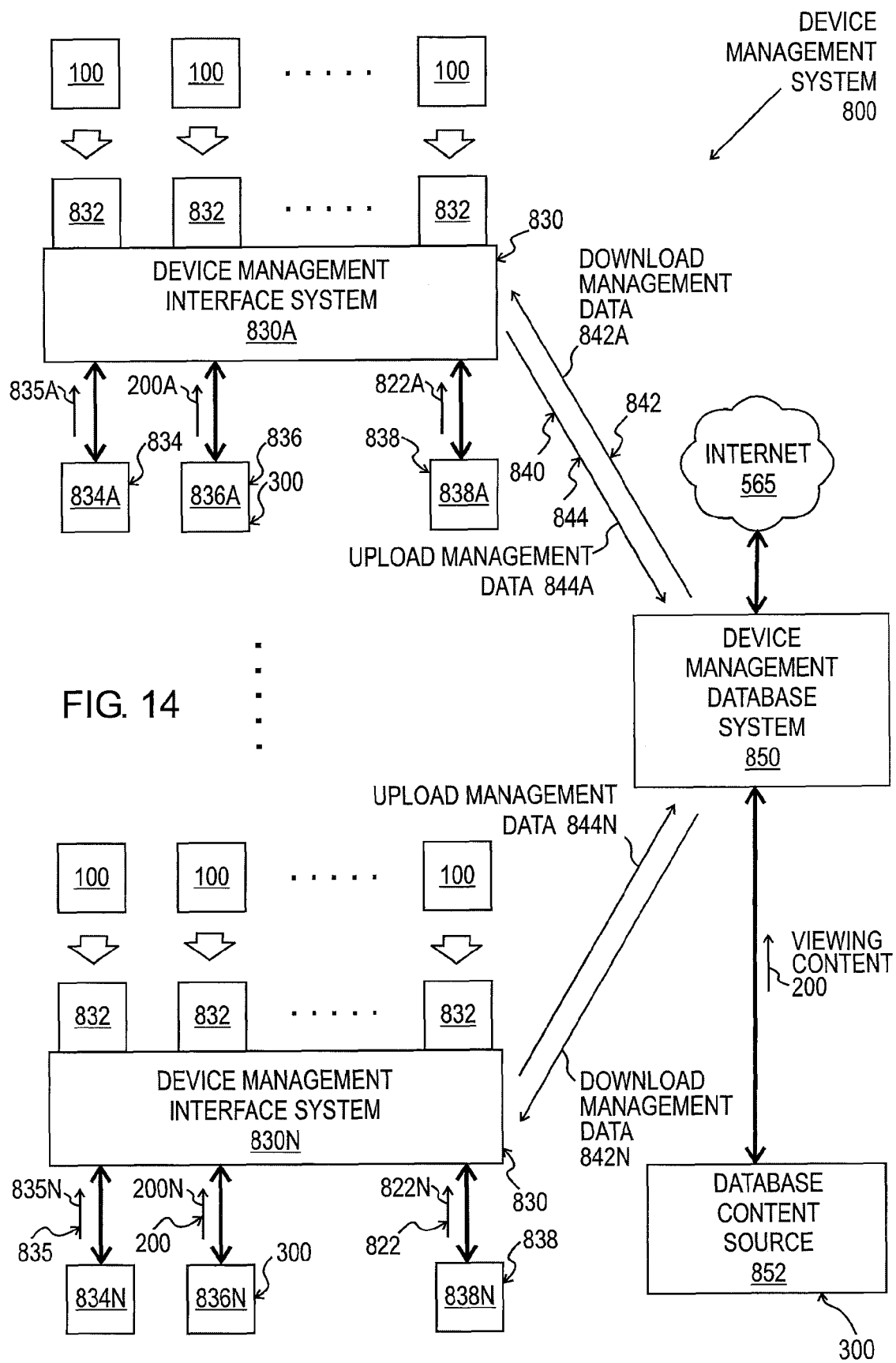
FIG. 14 is an exemplary block diagram illustrating an alternative embodiment of the device management system of FIGS. 13A-B, in which the device management system simultaneously process a plurality of portable media devices, maintaining historical records for each portable media device and providing instruction for configuring each portable media device for future use.

FIG. 14 illustrates a device management system 800 for simultaneously processing a plurality of portable media devices 100 in the manner set forth above with reference to FIGS. 13A-B. The device management system 800 is shown as including a plurality of device management interfaces 830 in communication with the device management database system 850. Each device management interface 830 likewise can include a plurality of device interface docking stations 832 for receiving a plurality of portable media devices 100. Thereby, the device management interface 830 can receive device identification data 820 from each relevant portable media device 100 and can transmit the device identification data 820, in whole and/or in part, to the device management database system 850 as management data 840 in the manner discussed above. The device management database system 850 can maintain historical records for each of the portable media devices and can provide configuration instruction for configuring each of the portable media devices for future use in the manner set forth above.

Each the device interface docking station 832 can update the portable media devices 100 in the manner set forth in more detail above with reference to FIGS. 12 and 13A-B. For example, a selected device interface docking station 832, such as device interface docking station 832A, can provide the updated viewing content 200 to the associated portable media devices 100 in a wired manner and/or in a wireless manner as set forth above with reference to FIG. 3A, preferably via high-speed data communications. If the portable media devices 100 receive the updated viewing content 200 via wireless data communications, the updated viewing content 200 can be distributed to one or more of the associated portable media devices 100 in any conventional manner. The selected device interface docking station 832, for instance, can sequentially update the associated portable media devices 100 and/or can update two or more of the associated portable media devices 100 in parallel. In other words, the selected device interface docking station 832 can provide the updated viewing content 200 to the associated portable media devices 100 on a one-by-one basis and/or can multicast the updated viewing content 200 to more than one, preferably all, of the associated portable media devices 100.

Although the device interface docking stations 832 for a selected device management interface 830, such as device management interface 830A, can be configured to process the portable media devices 100 in uniform and/or different manners, the device interface docking stations 832 preferably uniformly process the portable media devices 100. Stated somewhat differently, the portable media devices 100 associated with the selected device management interface 830 preferably are processed in a uniform manner, such that the portable media devices 100 are updated with uniform viewing content 200 and the device identification system 810 are uniformly updated with the device identification data 820. The memory systems 144 (shown in FIG. 13A) of the relevant portable media devices 100 thereby can store the same viewing content 200 (or stored content 240) (shown in FIG. 3B). The portable media devices 100 thereby can be uniformly updated for future use in a more rapid manner.

In the manner discussed in more detail above with reference to FIG. 7, the portable media devices 100 can be separated into two or more device groups 105 (shown in FIG. 7). The device management interfaces 830 therefore may be allocated in accordance with the device groups 105. For example, the device management interface 830A can be configured to process the portable media devices 100 associated with a first device group 105A (shown in FIG. 7); whereas, the portable media devices 100 associated with a second device group 105B (shown in FIG. 7) can be processed by the device management interface 830N. Thereby, the portable media devices 100 in each device group 105 can be simultaneously prepared for future use in a parallel manner.

Advantageously, each device management interface 830A-N is shown as respectively including a separate battery charging system 834A-N, interface content source 836A-N, and/or interface memory system 838A-N. The download management data 842A-N and/or the selected viewing content 200A-N can be locally stored at each device management interface 830A-N via interface content sources 836A-N and/or interface memory systems 838A-N. The device management database system 850 thereby is not required to repeatedly provide the selected viewing content 200A-N to each device management interface 830A-N. Instead, the selected viewing content 200A-N can be locally stored on the relevant interface content source 836A-N. Since the portable media devices 100 preferably are uniform, the power 834A-N provided by the battery charging systems 834A-N preferably is uniform. As desired, the device management database system 850 likewise can provide access to the Internet 565. The device management database system 850 thereby can communicate with one or more other device management database systems 850 and/or a central (or master) device management database system (not shown) for coordinating the historical records maintained by each of the device management database systems.

Figure 15A:
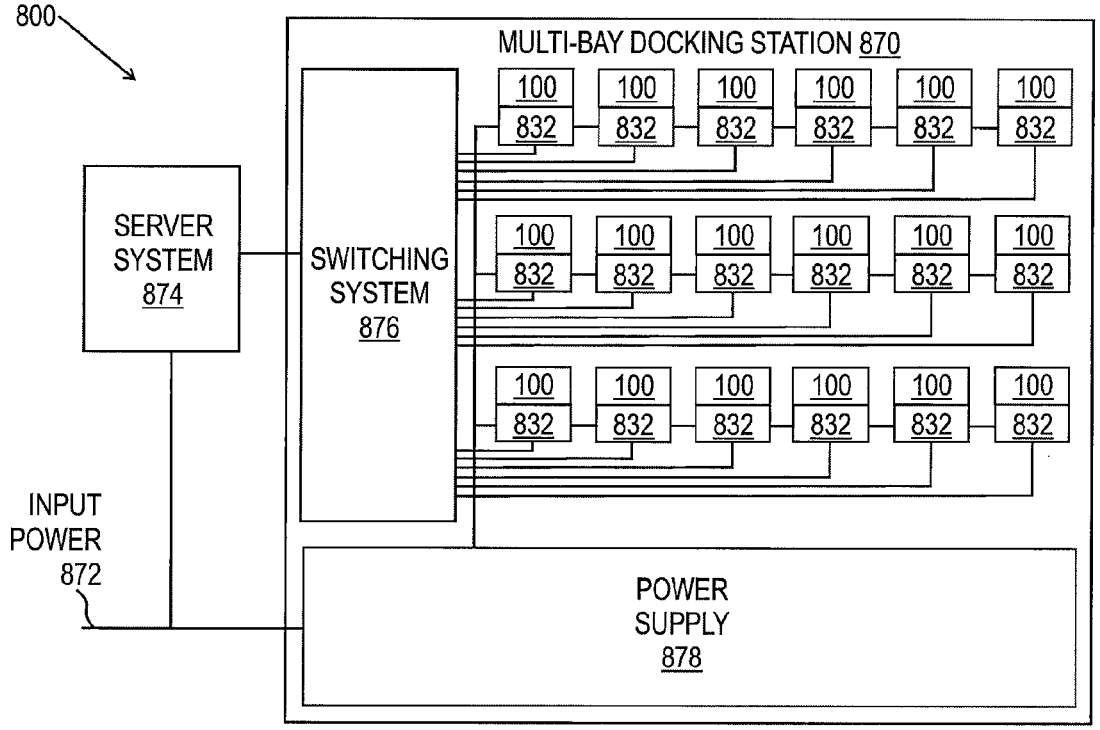
FIG. 15A is a detail drawing illustrating an embodiment of a docking station for the device management system of FIG. 14, in which the docking station is configured to interface with the plurality of portable media devices.

An illustrative embodiment of a multi-bay docking station 870 for the device management system 800 is shown in FIG. 15A. Receiving input power 872 from an external power source (not shown), the multi-bay docking station 870 includes a switching system 876 and a power supply 878 and is configured to communicate with a server system 874. The server system 874 can comprise a conventional computer server system and, as desired, can at least partially incorporate the interface content source 836 (shown in FIGS. 13A and 14) and/or the interface memory system 838 (shown in FIGS. 13A and 14). The server system 874 preferably can be configured to communicate with a plurality of docking stations 870 in the manner discussed above with reference to FIG. 14. The power supply 878 converts the input power 872 into power, having a predetermined voltage level and/or a predetermined current level, that is suitable for the battery systems 190 (shown in FIG. 4B) of the portable media devices 100.

The switching system 876 facilitates communications between the server system 874 and a plurality of device interface docking stations 832, each provided in the manner set forth in more detail above with reference to FIG. 13A. Preferably comprising a high speed switching system, the switching system 876 can be provided as any conventional type of switching (or routing) system in the manner set forth in the aforementioned co-pending U.S. patent application, entitled "SYSTEM AND METHOD FOR MANAGING CONTENT ON MOBILE PLATFORMS," Ser. No. 11/123,327, filed on May 6, 2005. If configured to support communications in accordance with the Gigabit (such as 1000Base-X and/or 1000Base-T) Ethernet standard, for example, the switching system 876 can negotiate appropriate communication data rates, including ten, one hundred, or one thousand megabits per second (10/100/1000 Mbps), and/or a duplex mode, such as a half duplex mode and/or a full duplex mode.

Thereby, when the plurality of portable media devices 100 is disposed in the device interface docking stations 832, the multi-bay docking station 870 can automatically begin to charge the battery systems 190 of the portable media devices 100. The multi-bay docking station 870 likewise can automatically initiate the download of the device identification data 820 (shown in FIG. 14), the update of the viewing content 200 (shown in FIG. 14), and/or the update of the device identification data 820 in the manner discussed above. The download of the device identification data 820 and the update of the viewing content 200 and the device identification data 820 can be controlled via a software application executed by the server system 874. In the manner discussed above, the server system 874 can provide the updated viewing content 200 to the portable media devices 100 on a one-by-one basis and/or can multicast the updated viewing content 200 to more than one, preferably all, of the associated portable media devices 100. The server system 874 likewise can extract any transaction information, such as credit card information, from the portable media devices 100 and can securely process the transaction information.

The multi-bay docking station 870 preferably provides at least one external indicator system (not shown) for each device interface docking station 832. The external indicator system can, for example, show the status of the relevant battery system 190. In addition to indicating whether the device interface docking station 832 is empty, the external indicator system can indicate whether the relevant battery system 190 is being charged, is fully charged, and/or is bad and requires replacement. A similar indicator system may be provided to indicate the status of the viewing content update and/or the device identification data update for each device interface docking station 832.

Figure 15B:
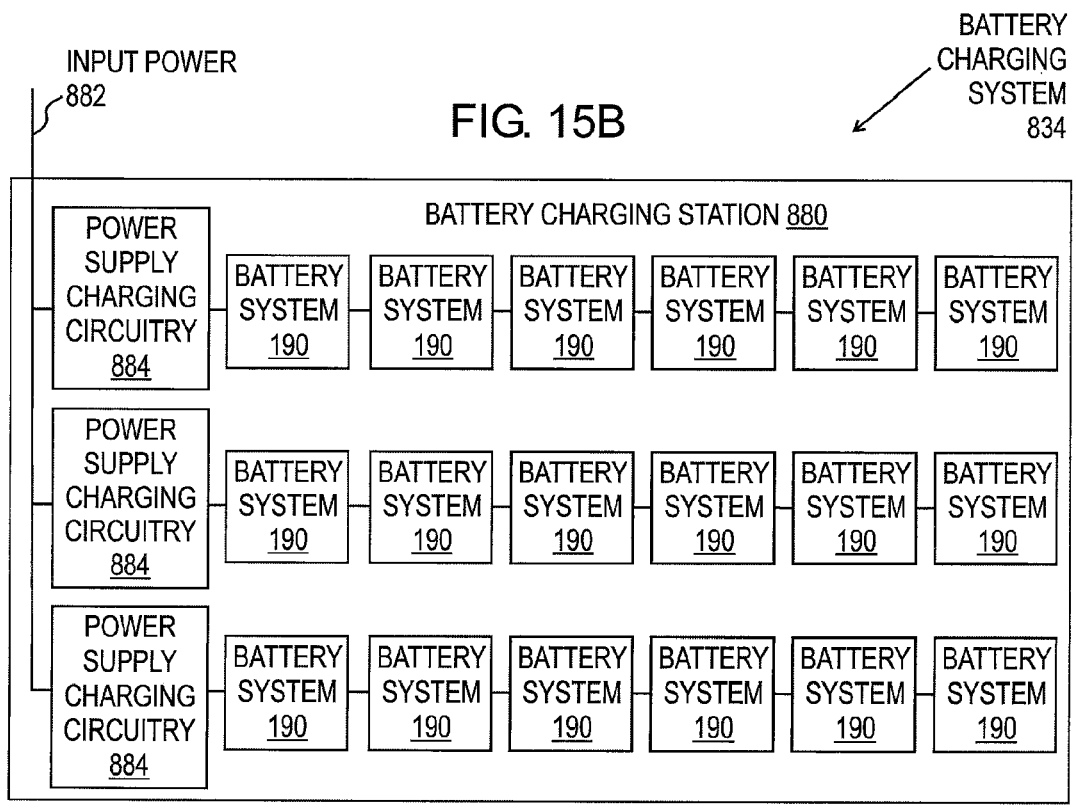
FIG. 15B is a detail drawing illustrating an embodiment of a battery charging system for the device management system of FIG. 14, in which the battery charging system is configured to simultaneously charge a plurality of battery systems.

As desired, the download of the device identification data 820 and/or the update of the viewing content 200 and/or the device identification data 820 can be performed separately from the charging of the battery systems 190. FIG. 15B illustrates a battery charging station 880 for charging battery systems 190 separately from the portable media devices 100 (shown in FIG. 15A). As desired, the battery charging station 880 likewise can be advantageously applied to charge spare battery systems 190 for the portable media devices 100. The battery charging station 880 is shown as including a plurality of power supply/charging circuit modules 884 each for receiving input power 882 and converting the input power 882 into power, having a predetermined voltage level and/or a predetermined current level, that is suitable for the battery systems 190 as discussed with reference to the power supply 878 (shown in FIG. 15A). Preferably, the battery charging station 880 can rapidly charge the battery systems 190. If the battery systems 190 have a eight hour battery life, for example, the battery charging station 880 can fully charge the battery systems 190 in approximately four to five hours. The battery charging station 880 preferably provides at least one external indicator system (not shown) to indicate the status of each battery system 190 in the manner set forth above.

Figure 16A:
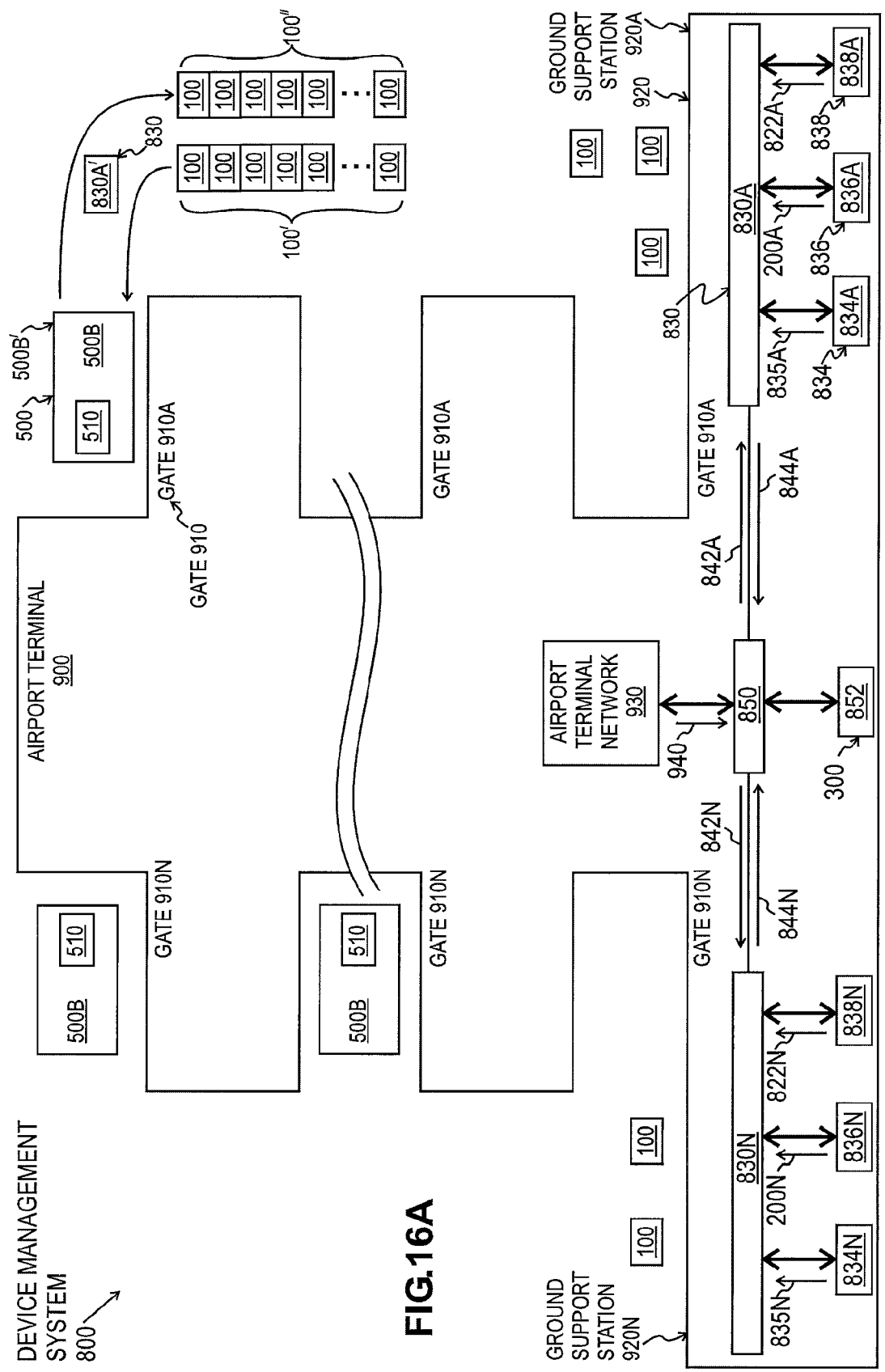
FIG. 16A is a detail drawing illustrating another alternative embodiment of the device management system of FIG. 14, in which the device management system is installed at an airport terminal.

In a typical application, the device management system 800 can be associated with an airport terminal 900 as illustrated in FIG. 16A. The airport terminal 900 includes a plurality of gates 910, which are divided into gate groups 910A-N. Each gate group 910A-N is associated with a ground support station (service station) 920A-N, respectively, for servicing aircraft 500B, including aircraft 500B with vehicle information systems 510. As illustrated in FIG. 16A, each of the ground support stations 920A-N includes at least one device interface docking station 832A-N for uniformly processing portable media devices 100 in the manner set forth in more detail above with reference to FIGS. 13A-B and 14.

The device management database system 850 is shown as being configured to communicate with the database content source 852 as set forth above and/or a airport terminal network 930 provided in the manner set forth in the aforementioned co-pending U.S. patent application, entitled "SYSTEM AND METHOD FOR MANAGING CONTENT ON MOBILE PLATFORMS," Ser. No. 11/123,327, filed on May 6, 2005. The device management system 800 thereby can configure the portable media devices 100 to include viewing content 200 from the database content source 852 and/or travel information content 940 from the airport terminal network 930 via the device management interfaces 830A-N in the manner discussed in more detail above. Exemplary travel information content 940 can include any conventional type of information regarding each flight, such as a flight number, an aircraft tail number, gate number, flight departure and arrival time data, and/or passenger data.

Having access to the travel information content 940 from the airport terminal network 930, the device management interface 830A at the ground support station 920A can prepare a first set 100' of portable media devices 100 for use, for example, on a selected future departing flight. In the manner discussed above, the portable media devices 100 can be configured to include uniform viewing content 200A, and the device management database system 850 can update its records for each portable media device 100 in the first set 100'. The records of the device management database system 850 thereby associate each of the portable media devices 100 in the first set 100' as identified, for example, by serial number, with the selected future departing flight as identified, for example, by flight number, gate number, and/or aircraft tail number.

Therefore, when the relevant aircraft 500B, such as aircraft 500B' as shown in FIG. 16A, lands at the airport terminal 900 and arrives at the appropriate gate 910 in the gate group 910A, the ground crew (not shown) can provide the first set 100' of portable media devices 100 to the aircraft 500B' and/or can retrieve a second set 100" of portable media devices 100, which were used during the incoming flight, from the aircraft 500B'. A portable (or handheld) device management interface 830A' can be provided at the aircraft 500B' to scan each portable media device 100 in the first set 100' loaded onto the aircraft 500B' and/or each portable media device 100 in the second set 100" retrieved from the aircraft 500B'. By scanning the portable media devices 100 at the aircraft 500B', the historical records maintained by the device management database system 850 thereby can be updated to reflect that each portable media device 100 in the first set 100' has been loaded onto the aircraft 500B' and/or that each portable media device 100 in the second set 100" has arrived at the airport terminal 900. For quality assurance purposes, the ground crew and a representative from the aircraft 500B each validate the number of portable media devices 100 and electronically sign for delivery and receipt.

The second set 100" of portable media devices 100 can be processed by the device management interface 830A as set forth above. The device management database system 850 thereby can update the historical records for the second set 100" of portable media devices 100 to include information regarding the return of the portable media devices 100 to the ground support station 920A and can provide configuration instructions for reconfiguring the portable media devices 100 in the second set 100", in whole and/or in part, for use on one or more subsequent flight as discussed above. As necessary, the historical records maintained by the device management database system 850 likewise can be updated to reflect any portable media devices 100 in the second set 100" that were identified as being on the aircraft 500B but that were not scanned when the second set 100" of the portable media devices 100 was retrieved from the aircraft 500B'. The missing portable media devices 100 in the second set 100" may not have been retrieved from the aircraft 500B' for a variety of reasons, including, for example, loss and/or theft. Electronic tracking therefore can facilitate the maintenance of a complete historical record for each portable media device 100. Thereby, the device management system 800 can advantageously provide logistical control and management of the portable media devices 100 and/or can provide the associated data to the operator of the aircraft 500B'.

Figure 16B:
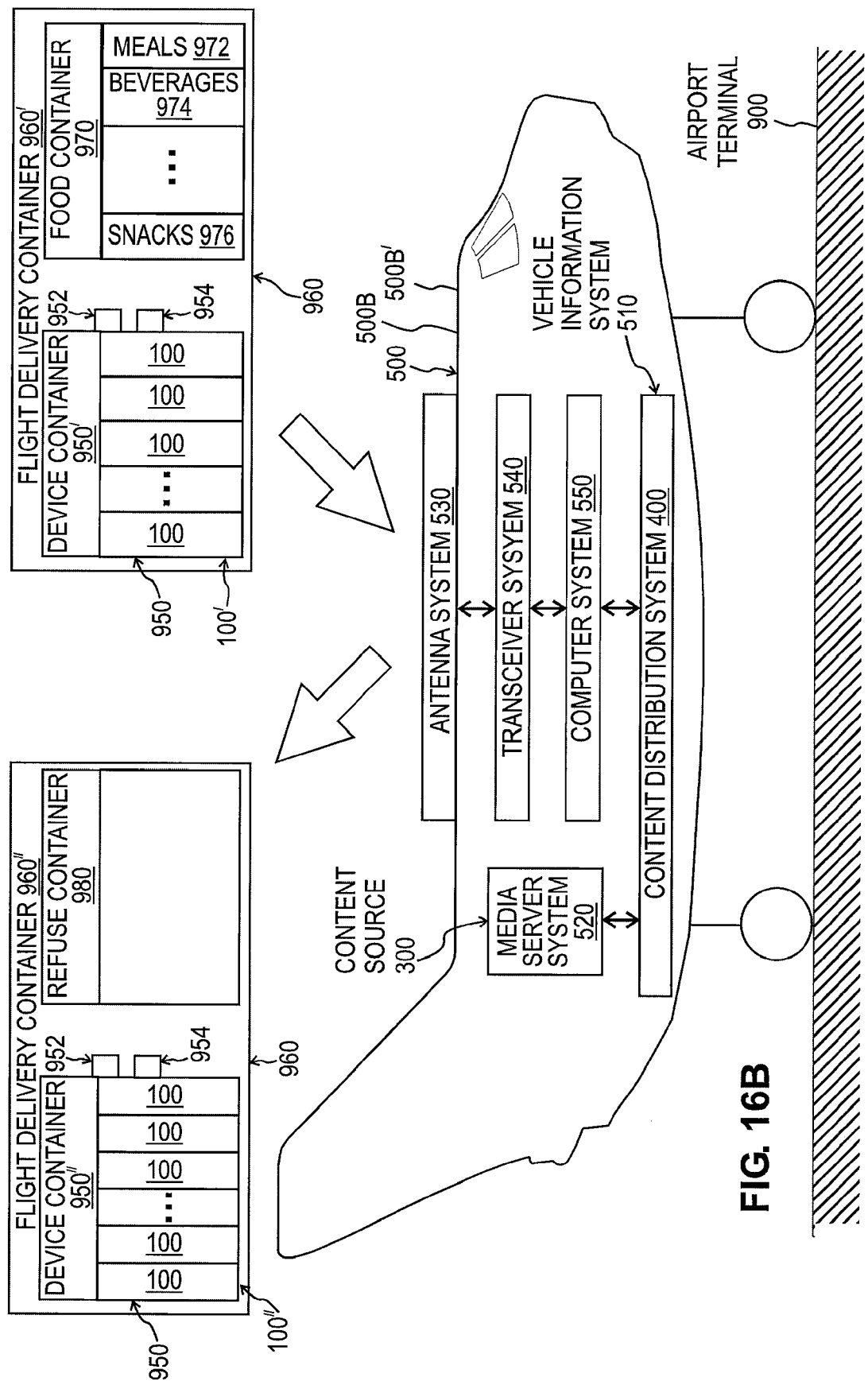
FIG. 16B is a detail drawing illustrating an alternative embodiment of the device management system of FIG. 16A, in which the portable media devices can be packaged in sealed containers for delivery to aircraft at the airport terminal.

To simplify chain of custody and to help ensure robust tracking of the portable media devices 100, the portable media devices 100 preferably are disposed within one or more device containers 950 in preparation for delivery to the aircraft 500B' as illustrated in FIG. 16B. The device containers 950 can be provided in any suitable manner. Preferably, the device containers 950 comprise tamper-evident containers that are appropriately sized for use with a standard aircraft galley cart (not shown), such as a half-size galley cart and/or a full-size galley cart. In other words, the device containers 950 can be provided as sealable containers and/or containers that include at least one security seal to evidence that the device containers 950 have been opened. The device containers 950 preferably are constructed such that the device identification systems 810 of the portable media devices 100 can communicate with a device management interface 830 when the portable media devices 100 are disposed within the sealed device containers 950.

Upon receiving the portable media devices 100 and being sealed, the device containers 950 can include indicia for readily identifying the contents sealed within. For example, a packing list 952 can be provided for identifying the contents of the device containers 950. As desired, a separate packing list 952 can be provided for each device container 950, and/or two or more device containers 950 can share a common packing list 952. The packing list 952 can include content information such as a number of the portable media devices 100 stored within the associated device container 950, a device serial number for each portable media device 100, and/or quality assurance information for each portable media device 100. Exemplary quality assurance information can include information, such as a date, location, and inspector name, related to the inspection and sealing of the associated device container 950. As desired, the packing list 952 likewise can include at least one section for comments, such as comments regarding the portable media devices 100. The comments section, for instance, can be used to identify any portable media devices 100 that have problems and to describe the problems. Information from the packing list 952 preferably can be provided to the device management database system 850 (shown in FIG. 16A) such that the historical record for each portable media device 100 can be updated, as needed.

In a preferred embodiment, each of the device containers 950 can include a container identification system 954. The container identification system 954 can be provided in the manner set for in more detail above with reference to the device identification system 810 (shown in FIG. 12) and can communicate with the device management interface 830 (shown in FIG. 12) and, therefore, the device management database system 850 in the manner discussed above. The container identification system 954 can provide content information, such as the content information discussed above with reference to the packing list 952. Preferably, the content information provided by the container identification system 954 includes a number of the portable media devices 100 stored within the associated device container 950, a device serial number for each portable media device 100, a serial number of the security seal, and/or information regarding the aircraft 500' to which the device container 950 is to be delivered.

As discussed above, the container identification system 954 can communicate with the device management interface 830 such that the content information can be provided to the device management database system 850, which can update the historical record for each portable media device 100. The container identification system 954 can be scanned by the device management interface 830 at each transfer to provide a chain of custody for the device containers 950 and, therefore, the portable media devices 100. For example, the device management interface 830 can scan the container identification system 954 of outgoing device containers 950 when the device container 950 is inspected and sealed, when the device container 950 leaves the ground support station 920A-N (shown in FIG. 16A), and when the device container 950 is provided to, and disposed aboard, the aircraft 500B'. Similarly, the container identification system 954 of incoming device containers 950 can be scanned by the device management interface 830 when the device container 950 is retrieved from the aircraft 500B', when the device container 950 arrives at the ground support station 920A-N, and when the device container 950 is opened and inspected. The device management system 800 thereby can monitor transfers of sealed device containers 950 rather than transfers of individual portable media devices 100.

After the device container 950 has been opened, the portable media devices 100 can be inspected for any damage and, as necessary, repaired. The portable media devices 100 then can be coupled with device interface docking station 832 (shown in FIG. 13A). While the battery systems 190 (shown in FIG. 4B) of the portable media devices 100 are being recharged, the device identification data 820 can be downloaded from the device identification systems 810 and provided to the device management database system 850. The device management database system 850 thereby can update the historical records of the portable media devices 100 and can provide configuration instruction for configuring the portable media devices 100 for future use in the manner set forth in more detail above. In accordance with the configuration instruction received from the device management database system 850, the device management interface 830 can configure each portable media device 100, updating the device identification data 820 stored by the device identification system 810 and/or updating the viewing content 200 stored by the memory system 144, as discussed above.

The sealed device containers 950 of portable media devices 100 can be delivered to the aircraft 500B in any conventional manner. As illustrated in FIG. 16B, for example, the first sealed device containers 950' is illustrated as including the first set 100' of portable media devices 100 provided in the manner set forth in more detail above with reference to FIG. 16A. The first sealed device containers 950' can be included in one or more larger flight delivery containers 960, such as first flight delivery containers 960', with other containers, such as food storage containers 970 for storing meals 972, beverages 974, and/or snacks 976. Similarly, the second set 100" of portable media devices 100 can be provided as discussed above and can be provided in second sealed device containers 950" for retrieval from the aircraft 500B'. In the manner set forth above, the second sealed device containers 950" can be included in one or more larger flight delivery containers 960, such as second flight delivery containers 960", with other containers, such as a refuse storage container 980. Thereby, the aircraft 500B' can be prepared for flight by retrieving the second flight delivery container 960" including items, such as the second set 100" of portable media devices 100, that were used during prior travel and by providing the first flight delivery container 960' including items, such as the first set 100' of portable media devices 100, for use during subsequent travel to the aircraft 500B'. Preferably, a fresh set of portable media devices 100 is provided for each flight of the aircraft 500B'.

In the manner discussed above, the portable media device 100 can be configured to facilitate commercial transactions, including commercial transactions initiated by passengers traveling aboard a vehicle 500 (shown in FIGS. 8A-B). Since commercial transactions typically require payment information, such as a credit card number, and/or authorization information, such as a personal identification number (PIN) or a password, the portable media device 100 includes an input system 170 (shown in FIGS. 3A-B) for entering such transaction information (not shown). The input system 170 can be provided as discussed above with reference to FIGS. 3A-B and typically comprises a keyboard and/or a mouse. Preferably, the portable media device 100 likewise includes a credit card reader system for providing payment information in the manner set forth in more detail above with reference to FIG. 3B.

Illustrative commercial transactions can include transactions for securing access to the portable media device 100 itself. For example, transaction information may be required to rent (and/or activate) the portable media device 100. The portable media device 100 likewise can require transaction information (or additional transaction information) to access selected functions of the portable media device 100, such as to access the viewing content 200 (shown in FIGS. 3A-B) stored on the memory system 144 (shown in FIG. 3B). Access to premium viewing content 200 can require additional transaction information. As discussed in more detail above, the portable media device 100 can store the transaction information on the memory system 144 and/or can transmit the transaction information as the upload content 260 (shown in FIGS. 3A-B). If stored on the memory system 144, the transaction information preferably is uploaded from the portable media device 100 and provided to the device management database system 850 for processing in the manner discussed in more detail above with reference to the device management system 800 (shown in FIGS. 12 and 13A-B).

If disposed on a vehicle 500 (shown in FIGS. 8A-B), such as an aircraft 500B (shown in FIG. 8B), for example, the portable media device 100 can be configured to communicate with a vehicle information system 510 (shown in FIGS. 8A-B) installed on the vehicle 500. Upon receiving the transaction information from the portable media device 100, the vehicle information system 510 can process the transaction information in any conventional manner, such as via a computer system 550 (shown in FIG. 8B) of the vehicle information system 510. For example, the vehicle information system 510 can process the transaction information in real time by instantly downloading the transaction information to a terrestrial payment system (not shown) via a communication system 560 (shown in FIG. 8B), such as a satellite communication system 560' (shown in FIG. 8B). The vehicle information system 510 likewise can process the transaction information in a time-delayed manner by storing the transaction information for downloading to the terrestrial payment system at a later time, such as arrival the destination of the vehicle 500. To help ensure security, the transaction information preferably is stored and/or transmitted in an encrypted format.

The commercial transactions can comprise any conventional type of commercial transactions, including commercial transactions performed via the Internet 565 (shown in FIG. 8B). In a preferred embodiment, the commercial transactions can include commercial transactions involving merchandise (not shown), such as duty-free merchandise in the case of international travel, and/or services that are available via the vehicle 500. Information regarding the merchandise and/or services can be visually and/or audibly presented via the portable media device 100 and can include textual information and/or graphical information describing the merchandise and/or services. The portable media device 100 likewise can one or more relevant Internet links and/or present various merchandise options, such as available sizes and/or colors, and/or service options. The desired merchandise and/or services can be selected for purchase via the portable media device 100 by entering the transaction information. If stored on the vehicle 500, the merchandise can be made available upon receipt of the transaction information; otherwise, the merchandise can be provided upon arrival at the destination and/or shipped to a selected location.

The portable media device 100 likewise can be configured to present advertisement information for selected products and/or services. Uniform advertisement information can be presented by each portable media device 100, and/or the advertisement information can be selectably presented by the portable media devices 100 based upon any suitable criteria. Preferably, the advertisement information comprises directed advertisement information based, for example, upon a passenger's usage of the portable media device 100. The advertisement information can be visually and/or audibly presented via the portable media device 100 and can include textual information and/or graphical information describing the product and/or service. As desired, the portable media device 100 likewise can one or more relevant Internet links for viewing additional advertising information. The portable media device 100 can provide transaction information to purchase the advertised product and/or service in the manner discussed above.

The crew of the vehicle 500 likewise can be provided with one or more portable media devices 100 (or the crew media devices) for assisting passengers with their commercial transactions. Each crew media device can be provided in the manner set forth above with reference to the portable media device 100 (shown in FIGS. 3A-B) and preferably are configured to receive transaction information as discussed above. Preferably, the crew media device include a credit card reader system for providing payment information in the manner set forth in more detail above with reference to FIG. 3B. The crew media device likewise can include additional functionality, such as a bar code scanner system, a still and/or motion picture camera system, voice recording functionality, and voice-to-text conversion functionality.

The crew media device can support any conventional type of commercial transactions, including the above-mentioned commercial transactions, such as rental of portable media devices 100 by passengers and/or merchandise (and/or services) purchases, that are supported by the portable media devices 100 for passenger usage. As desired, additional commercial transactions likewise may be supported. For example, the crew media device can be used to enter orders for food and/or beverages for delivery during travel.

To facilitate distribution of the purchased merchandise, the crew media device can be associated with one or more merchandise bins (not shown) for storing merchandise available on the vehicle 500. The merchandise bins can be provided in any suitable manner, including as stationary merchandise bins and/or portable merchandise bins. For example, one or more selected cabin compartments (not shown) in the passenger cabin 570 (shown in FIGS. 8A-B) can be designated for merchandise storage. The crew media device likewise can include one or more drawers for merchandise storage and/or can be associated with a aircraft galley cart (not shown), such as a half-size galley cart and/or a full-size galley cart, with one or more drawers for merchandise storage.

In a preferred embodiment, the crew media device can provide an inventory control system for the merchandise available for purchase on the vehicle 500. The crew media device preferably provides the inventory control system in cooperation with one or more computer systems (not shown), such as the vehicle information system 510. As desired, the computer systems can be disposed onboard the vehicle 500 and/or external to, or remote from, the vehicle 500.

As discussed in more detail above with regard to the portable media device 100, the crew media device can store the transaction information on the memory system 144 and/or can transmit the transaction information as the upload content 260 (shown in FIGS. 3A-B). If stored on the memory system 144, for example, the transaction information preferably is uploaded from the crew media device and provided to the device management database system 850 for processing in the manner discussed in more detail above with reference to the device management system 800 (shown in FIGS. 12 and 13A-B). The crew media device likewise can be configured to communicate with the vehicle information system 510 as discussed above with reference to the portable media device 100. Upon receiving the transaction information from the portable media device 100, the vehicle information system 510 can process the transaction information in any conventional manner, including in real time and/or in a time-delayed manner, in the manner set forth in more detail above. To help ensure security, the transaction information preferably is stored and/or transmitted in an encrypted format.

In the manner discussed above with reference to the communication system 560 (shown in FIG. 8B), the vehicle information system 510 of the aircraft 500B and the terrestrial content source 300B (shown in FIG. 8B) can communicate in any conventional wireless manner. For example, an Aircraft-Ground Information Services—Cellular Modem (AGIS-CM) system for providing two-way data communications between an XMLRPC server system, such as the server system 520 (shown in FIG. 8B), installed on the aircraft 500B and an Aircraft-Ground Information Services (AGIS) server at a ground station while the aircraft 500B is on the ground. The server on board the aircraft 500B includes a Cabin Memory Extension Unit (CMEU2 (AGIS-Air/AGIS-Link)) hard drive array with a communication port that is coupled with a General Packet Radio Service (GSM/GPRS) cellular transmitter/receiver via an RS-232 connection. After the aircraft 500B lands, the server on board the aircraft 500B is configured to dial a telephone number to contact the ground server. The server on board the aircraft 500B and the ground server then can negotiate to form a communication channel using Internet connectivity in accordance with the XMLRPC protocol. Neither the dialing event nor the negotiation event will be triggered by opening a door to the aircraft 500B.

The servers are configured to exchange data while the aircraft 500B is on the ground, regarding of whether the aircraft 500B is stationary or in motion. The data transferred from the server on board the aircraft 500B comprises operational information regarding an in-flight entertainment (IFE) system that is installed on the aircraft 500B. The operational information can include, for example, passenger usage information as well as information regarding any system failures. The ground server can transfer program content, such as movies or television programs, for display during subsequent flight. Prior to forming the communication channel, both servers can store pending data transfers, which are immediately exchanged once the communication channel has been established. Since the server on board the aircraft 500B can store and transmit the pending data transfers, on-board applications, which generate the pending data transfers, are not individually required to provide a data transfer mechanism.

A communication system for providing two-way communications between a cellular telephone on an aircraft 500B and the public telephone network while the aircraft 500B is in flight. The communication system is mounted in an aircraft 500B and is configured for use with standard cellular telephones used by passengers on the aircraft 500B. Being in wireless communication with the cellular telephones, the communication system includes an internal antenna system for exchanging cellular communication signals with the cellular telephones. The internal antenna system can comprise a plurality of antennas distributed throughout the passenger compartment of the aircraft 500B, such as an antenna disposed at each passenger seat, and is coupled with a central transceiver system.

The central transceiver system is configured to receive outgoing cellular communication signals from the internal antenna system and to convert the outgoing cellular communication signals into outgoing satellite communication signals, which are compatible with satellite communications. Coupled with an external antenna system, the central transceiver system is configured to transmit the outgoing satellite communication signals to a satellite system via the external antenna system. The satellite system, in turn, relays the outgoing satellite communication signals to a terrestrial receiving station that is in communication with the public telephone network. The terrestrial receiving station can convert the outgoing satellite communication signals into outgoing telephone signals, which are compatible with the public telephone network, and provides the outgoing telephone signals to the public telephone network. The central transceiver system likewise can receive incoming satellite communication signals the terrestrial receiving station and convert the incoming satellite communication signals into cellular communication signals via a reverse process. Thereby, passengers can make cellular telephone calls during flight.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the disclosure is to cover all modifications, equivalents, and alternatives falling within the spirit and scope of the claims.

What is claimed is:

1. A portable media device for presenting selected viewing content, comprising:
    a communication interface for receiving viewing content streamed from a vehicle information system installed aboard a passenger vehicle;
    a user interface for providing a content selection instruction and a content presentation instruction;
    an audio system for audibly presenting an audio portion of the selected viewing content;
    a video system for visually presenting a video portion of the selected viewing content;
    a control system for selecting the selected viewing content from among a catalogue of viewing content available from the vehicle information system in accordance with the content selection instruction and for controlling the audio and video presentation of the selected viewing content in accordance with the content presentation instruction;
    an identification memory system for storing device identification data including device status information and transactional information for a device user; and
    a device identification system for providing the device identification data for said portable media device,
    wherein a device management database system for maintaining a historical record for said portable media device updates the historical record in accordance with the device identification data and provides device configuration instructions for configuring said portable media device for future use, and
    wherein a device management interface system provides the device identification data received from said portable media device to said device management database system and updates the device status information stored by said device identification system in accordance with the device configuration instructions provided by said device management database system.

2. The portable media device of claim 1, wherein said portable media device comprises a personal digital assistant.

3. The portable media device of claim 1, wherein the received viewing content includes entertainment content.

4. The portable media device of claim 3, wherein the entertainment content includes entertainment content selected from a group of entertainment content types consisting of satellite television programming and satellite radio programming.

5. The portable media device of claim 4, wherein the satellite television programming comprises live satellite television programming.

6. The portable media device of claim 1, wherein the viewing content includes encrypted viewing content, said portable media device decrypting selected encrypted viewing content selected from said encrypted viewing content for presentation.

7. The portable media device of claim 1, wherein said communication interface comprises a wireless communication interface for supporting wireless communications.

8. The portable media device of claim 7, wherein said wireless communication interface supports wireless communications having a protocol type selected from a group of protocol standards consisting of Bluetooth, wireless fidelity (Wi-Fi), Ultra-Wideband (UWB), and IEEE 802.11.

9. The portable media device of claim 1, wherein said user interface comprises a graphical user interface.

10. The portable media device of claim 1, wherein said user interface includes a touchscreen.

11. The portable media device of claim 1, wherein said audio system includes a speaker system.

12. The portable media device of claim 1, wherein said audio system includes at least one audio port.

13. The portable media device of claim 1, wherein said audio system processes the audio portion of the selected viewing content to enhance a sound quality of said audio portion.

14. The portable media device of claim 13, wherein said audio system provides three-dimensional audio processing of the audio portion to simulate surround sound.

15. The portable media device of claim 13, wherein said audio system provides noise cancellation processing of the audio portion to cancel ambient noise.

16. The portable media device of claim 1, further comprising a device memory system for storing stored viewing content, wherein said audio system can audibly present an audio portion of the stored content, said video system can visually present a video portion of the stored content, and said control system can select the stored content in accordance with the content selection instruction and can control the audio and video presentation of the stored content in accordance with the content presentation instruction.

17. The portable media device of claim 16, wherein said memory system comprises a removable memory system.

18. The portable media device of claim 16, wherein said memory system comprises a personal memory device.

19. The portable media device of claim 16, wherein said device management interface system updates said stored viewing content stored on said device memory system in accordance with the at least one device configuration instruction received from said device management database system.

20. The portable media device of claim 1, further comprising a camera system for providing video content, wherein said video system can visually present the video content, and said control system can select the video content in accordance with the content selection instruction and can control the video presentation of the video content in accordance with the content presentation instruction.

21. The portable media device of claim 20, wherein said camera system comprises a moving picture camera system.

22. The portable media device of claim 1, wherein the vehicle information system is installed aboard an aircraft.

23. A method for managing portable media devices, comprising:
providing a portable media device for presenting selected viewing content, the selected viewing content being streamed from a vehicle information system installed aboard a passenger vehicle, the selected viewing content being selected from a catalogue of viewing content available from the vehicle information system, said portable media device having an identification memory system for storing device identification data including device status information and transactional information for a device user, a device identification system for providing the device identification data for said portable media device, and a video system for visually presenting a video portion of the selected viewing content;
updating a historical record maintained for said portable media device in accordance with the device identification data;
providing at least one device configuration instruction for configuring said portable media device for future use; and
in accordance with the at least one device configuration instruction,
updating the viewing content stored on said device memory system; and
updating the device status information stored by said device identification system.

24. The method of claim 23, further comprising decrypting the selected viewing content for presentation.

25. The method of claim 23, wherein said step of providing said portable media device includes providing said portable media device that includes an audio system for audibly presenting an audio portion of the selected viewing content.

26. The method of claim 25, further comprising enhancing a sound quality of the audio portion via said audio system.

27. The method of claim 26, wherein said enhancing the sound quality of the audio portion includes performing at least one of three-dimensional audio processing of the audio portion to simulate surround sound and noise cancellation processing of the audio portion to cancel ambient noise.

28. A device management system for portable media devices configured for deployment on an aircraft, the system comprising:
a plurality of portable media devices, each portable media device for presenting selected viewing content and having an identification memory system for storing device identification data including device status and tracking information and transactional information for a device user and a device identification system for providing the device identification data for said portable media device, the selected viewing content being streamed from a vehicle information system installed aboard a passenger vehicle, the selected viewing content selected from a catalogue of viewing content available from the vehicle information system;
a device management database system for maintaining a historical record for each said portable media device, said device management database system updating the historical record in accordance with the device identification data and providing at least one device configuration instruction for configuring said portable media device for future use;
a device management interface system for providing the device identification data received from said portable media device to said device management database system, said device management interface system updating the viewing content stored on said device memory system and updating the device status information stored by said device identification system each in accordance with the at least one device configuration instruction received from said device management database system; and
a device container configured to contain the plurality of portable media devices, the device container constructed such that the device identification system of each portable media device can communicate with the device management interface system when disposed within the device container, said device container comprising a container identification system configured to communicate with the device management interface system to provide information relating to each portable media device contained therein, wherein said device management interface system and said device management database system are deployed at an airport terminal.

29. The device management system of claim 28, wherein the viewing content stored on said device memory system includes encrypted viewing content, said portable media device decrypting selected encrypted viewing content selected from the encrypted viewing content for presentation.

30. The device management system of claim 28, wherein said device memory system comprises a personal memory device for providing secure storage for the viewing content.

31. The device management system of claim 28, wherein said device identification system provides the device identification data to said device management interface system via a wireless communication channel.

32. The device management system of claim 31, wherein said device identification system comprises a radio frequency identification (RFID) tag system, and said device management interface system comprises a RFID reader/computer system.

33. The device management system of claim 32, wherein said device identification system comprises a passive RFID tag system.

34. The device management system of claim 28, further comprising a device interface docking station for preparing a selected portable media device for deployment aboard a passenger vehicle, said device interface docking station including a battery charging system for charging an internal battery system of said portable media device when said portable media device is received by said device interface docking station.

35. The device management system of claim 34, wherein said battery charging system charges said battery system while said device management interface system updates the viewing content and the device status information.

36. The device management system of claim 28, wherein said device management system supports commercial transactions initiated via said portable media device.

37. The device management system of claim 36, wherein payment information for the commercial transactions can be provided via said portable media device.

38. The device management system of claim 37, wherein said portable media device includes a credit card reader system, the payment information being provided via said credit card reader system or a user interface system.

39. The device management system of claim 36, wherein the commercial transactions are selected from a group of commercial transactions consisting of activation of said portable media device, access to selected functionality of said portable media device, and access to the viewing content stored on said device memory system.

40. The device management system of claim 36, wherein the viewing content stored on said device memory system includes advertisement information for merchandise available for purchase and the commercial transactions include purchases of the merchandise.

41. A method for managing portable media devices configured for deployment on an aircraft, the method comprising:

a plurality of portable media devices, each portable media device for presenting selected viewing content and having an identification memory system for storing device identification data including device status and tracking information and transactional information for a device user and a device identification system for providing the device identification data for said portable media device, the selected viewing content being streamed from a vehicle information system installed aboard a passenger vehicle, the selected viewing content being selected from a catalogue of viewing content available from the vehicle information system;

containing the plurality of portable media devices in a device container, the device container constructed such that the device identification system of each portable media device can communicate with a device management interface system when disposed within the device container, the device container comprising a container identification system configured to communicate with the device management interface system to provide information relating to each portable media device contained therein;

updating a historical record maintained by the device management interface system for each portable media device in accordance with the device identification data;

providing at least one device configuration instruction by the device management interface system for configuring said portable media device for future use; and in accordance with the at least one device configuration instruction, updating the viewing content stored on said device memory system; and updating the device status information stored by said device identification system, wherein said device management interface system and said device management database system are deployed at an airport terminal.

42. The method of claim 41, further comprising storing encrypted viewing content on said device memory system and decrypting selected encrypted viewing content selected from said encrypted viewing content for presentation.

43. The method of claim 41, further comprising providing said device memory system as a removable personal memory device for providing secure storage for the viewing content.

44. The method of claim 41, further comprising providing the device identification data from said device identification system to said device management interface system via a wireless communication channel.

45. The method of claim 44, wherein said providing said device memory system includes providing said device identification system that comprises a radio frequency identification (RFID) tag system, and wherein said containing the plurality of portable media devices in said device container includes providing said device management interface system that comprises a RFID reader/computer system.

46. The method of claim 45, wherein said providing said device identification system includes providing a passive RFID tag system.

47. The method of claim 45, wherein said providing said device identification system includes providing a device identification memory system for storing the device status information.

48. The method of claim 41, further comprising supporting commercial transactions initiated via said portable media device.

49. The method of claim 48, wherein said supporting commercial transactions initiated via said portable media device includes providing payment information for the commercial transactions via said portable media device.

50. The method of claim 49, wherein said supporting commercial transactions initiated via said portable media device includes providing the payment information via a credit card reader system or a user interface system.

51. The method of claim 48, wherein said supporting commercial transactions initiated via said portable media device includes supporting selection of the commercial transactions from the group of commercial transactions consisting of activation of said portable media device, access to selected functionality of said portable media device, and access to the viewing content stored on said device memory system.

52. The method of claim 48, wherein said providing said plurality of portable media devices includes storing within said device memory system advertisement information for merchandise available for purchase and the commercial transactions include purchases of the merchandise.

53. An aircraft, comprising:
- a fuselage and a plurality of passenger seats arranged within the fuselage; and
- a vehicle information system, said vehicle information system coupled with said fuselage and comprising:
  - a headend system for providing overall system control functions for the vehicle information system and for communicating with a content source;
  - a content distribution system for distributing viewing content from the content source throughout said vehicle information system; and
  - a portable media device for presenting selected viewing content and for communicating with said headend system via said content distribution system, said portable media device including:
    - a communication interface for receiving the viewing content streamed from the vehicle information system;
    - a user interface for providing a content selection instruction and a content presentation instruction;
    - an audio system for audibly presenting an audio portion of the selected viewing content;
    - a video system for visually presenting a video portion of the selected viewing content;
    - a control system for selecting the selected viewing content from among a catalogue of viewing content available from the vehicle information system in accordance with the content selection instruction and for controlling the audio and video presentation of the selected viewing content in accordance with the content presentation instruction;
    - an identification memory system for storing device identification data including device status information and transactional information for a device user; and
    - a device identification system for providing the device identification data for said portable media device, wherein a device management database system for maintaining a historical record for said portable media device updates the historical record in accordance with the device identification data and provides device configuration instructions for configuring said portable media device for future use, and wherein a device management interface system provides the device identification data received from said portable media device to said device management database system and updates the device status information stored by said device identification system in accordance with the device configuration instructions provided by said device management database system.

* * * * *